(12) United States Patent
Choi et al.

(10) Patent No.: US 12,125,986 B2
(45) Date of Patent: Oct. 22, 2024

(54) BATTERY AND CURRENT COLLECTOR APPLIED THERETO, AND BATTERY PACK AND VEHICLE INCLUDING THE SAME

(71) Applicant: LG ENERGY SOLUTION, LTD., Seoul (KR)

(72) Inventors: Su-Ji Choi, Daejeon (KR); Kwang-Su Hwangbo, Daejeon (KR); Do-Gyun Kim, Daejeon (KR); Geon-Woo Min, Daejeon (KR); Min-Ki Jo, Daejeon (KR); Jae-Won Lim, Daejeon (KR); Hak-Kyun Kim, Daejeon (KR); Je-Jun Lee, Daejeon (KR); Ji-Min Jung, Daejeon (KR); Hae-Jin Lim, Daejeon (KR); Jae-Woong Kim, Daejeon (KR); Jong-Sik Park, Daejeon (KR); Yu-Sung Choe, Daejeon (KR); Byoung-Gu Lee, Daejeon (KR); Duk-Hyun Ryu, Daejeon (KR); Kwan-Hee Lee, Daejeon (KR); Jae-Eun Lee, Daejeon (KR); Bo-Hyun Kang, Daejeon (KR); Jin-Hak Kong, Daejeon (KR); Soon-O Lee, Daejeon (KR); Kyu-Hyun Choi, Daejeon (KR); Pil-Kyu Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/131,677

(22) Filed: Apr. 6, 2023

(65) Prior Publication Data
US 2023/0246243 A1 Aug. 3, 2023

Related U.S. Application Data

(63) Continuation of application No. 17/592,597, filed on Feb. 4, 2022.

(30) Foreign Application Priority Data

Feb. 19, 2021 (KR) .................. 10-2021-0022881
Feb. 19, 2021 (KR) .................. 10-2021-0022891
(Continued)

(51) Int. Cl.
*H01M 10/0587* (2010.01)
*H01M 4/64* (2006.01)
(Continued)

(52) U.S. Cl.
CPC ......... *H01M 10/0587* (2013.01); *H01M 4/64* (2013.01); *H01M 4/70* (2013.01);
(Continued)

(58) Field of Classification Search
CPC ........... H01M 10/0587; H01M 50/107; H01M 50/567; H01M 50/559; H01M 50/531;
(Continued)

(56) References Cited

U.S. PATENT DOCUMENTS 3,761,314 A  9/1973 Cailley
5,576,113 A  11/1996 Hirofumi et al.
(Continued)

FOREIGN PATENT DOCUMENTS

CN  1170782 A  1/1998
CN  1407642 A  4/2003
(Continued)

OTHER PUBLICATIONS

European Search Report mailed in EP 22 15 2207 on Jul. 22, 2022 (9 pages).
(Continued)

*Primary Examiner* — Brian R Ohara
*Assistant Examiner* — Emily Elizabeth Freeman
(74) *Attorney, Agent, or Firm* — Birch, Stewart, Kolasch & Birch, LLP

(57) ABSTRACT

A battery includes an electrode assembly including a first electrode, second electrode, and a separator between the first electrode and the second electrode, the first electrode includ-
(Continued)

ing a first region coated with an active material and a second region at a first side and adjacent to the first region, the second region being exposed beyond the separator, and at least part of the second region is an electrode tab; a housing including a first end with a first opening, the housing accommodating the electrode assembly; a first current collector including an edge portion on the electrode assembly, a second region coupling portion extending from the edge portion and coupled with the second region, and a terminal coupling portion spaced apart from the second region coupling portion; and a terminal coupled with the terminal coupling portion.

30 Claims, 28 Drawing Sheets

(30) Foreign Application Priority Data

| Date | | Number |
|---|---|---|
| Feb. 19, 2021 | (KR) | 10-2021-0022894 |
| Feb. 19, 2021 | (KR) | 10-2021-0022897 |
| Feb. 23, 2021 | (KR) | 10-2021-0024424 |
| Mar. 8, 2021 | (KR) | 10-2021-0030291 |
| Mar. 8, 2021 | (KR) | 10-2021-0030300 |
| Apr. 9, 2021 | (KR) | 10-2021-0046798 |
| May 4, 2021 | (KR) | 10-2021-0058183 |
| Jun. 14, 2021 | (KR) | 10-2021-0077046 |
| Jun. 28, 2021 | (KR) | 10-2021-0084326 |
| Oct. 1, 2021 | (KR) | 10-2021-0131205 |
| Oct. 1, 2021 | (KR) | 10-2021-0131207 |
| Oct. 1, 2021 | (KR) | 10-2021-0131208 |
| Oct. 1, 2021 | (KR) | 10-2021-0131215 |
| Oct. 1, 2021 | (KR) | 10-2021-0131225 |
| Oct. 14, 2021 | (KR) | 10-2021-0137001 |
| Oct. 15, 2021 | (KR) | 10-2021-0137856 |
| Oct. 22, 2021 | (KR) | 10-2021-0142196 |
| Nov. 9, 2021 | (KR) | 10-2021-0153472 |
| Nov. 19, 2021 | (KR) | 10-2021-0160823 |
| Nov. 24, 2021 | (KR) | 10-2021-0163809 |
| Nov. 26, 2021 | (KR) | 10-2021-0165866 |
| Dec. 3, 2021 | (KR) | 10-2021-0172446 |
| Dec. 10, 2021 | (KR) | 10-2021-0177091 |
| Dec. 31, 2021 | (KR) | 10-2021-0194572 |
| Dec. 31, 2021 | (KR) | 10-2021-0194593 |
| Dec. 31, 2021 | (KR) | 10-2021-0194610 |
| Dec. 31, 2021 | (KR) | 10-2021-0194611 |
| Dec. 31, 2021 | (KR) | 10-2021-0194612 |
| Jan. 5, 2022 | (KR) | 10-2022-0001802 |

(51) Int. Cl.

| | |
|---|---|
| H01M 4/70 | (2006.01) |
| H01M 50/107 | (2021.01) |
| H01M 50/152 | (2021.01) |
| H01M 50/179 | (2021.01) |
| H01M 50/183 | (2021.01) |
| H01M 50/213 | (2021.01) |
| H01M 50/242 | (2021.01) |
| H01M 50/507 | (2021.01) |
| H01M 50/509 | (2021.01) |
| H01M 50/531 | (2021.01) |
| H01M 50/533 | (2021.01) |
| H01M 50/536 | (2021.01) |
| H01M 50/559 | (2021.01) |
| H01M 50/567 | (2021.01) |

(52) U.S. Cl.
CPC ........ *H01M 50/107* (2021.01); *H01M 50/152* (2021.01); *H01M 50/179* (2021.01); *H01M 50/183* (2021.01); *H01M 50/213* (2021.01); *H01M 50/242* (2021.01); *H01M 50/507* (2021.01); *H01M 50/509* (2021.01); *H01M 50/531* (2021.01); *H01M 50/533* (2021.01); *H01M 50/536* (2021.01); *H01M 50/559* (2021.01); *H01M 50/567* (2021.01); *H01M 2220/20* (2013.01)

(58) Field of Classification Search
CPC ............ H01M 50/152; H01M 50/242; H01M 50/533; H01M 50/509; H01M 50/507; H01M 50/183; H01M 50/179; H01M 50/213; H01M 50/536; H01M 4/64; H01M 4/70; H01M 2220/20
See application file for complete search history.

(56) References Cited

U.S. PATENT DOCUMENTS

| | | |
|---|---|---|
| 5,665,483 A | 9/1997 | Saito et al. |
| 5,849,431 A | 12/1998 | Kita et al. |
| 6,399,237 B1 | 6/2002 | Souliac et al. |
| 6,451,473 B1 | 9/2002 | Saito et al. |
| 6,653,017 B2 | 11/2003 | Satoh et al. |
| 6,677,082 B2 | 1/2004 | Thackeray et al. |
| 6,680,143 B2 | 1/2004 | Thackeray et al. |
| 7,273,678 B2 | 9/2007 | Akita et al. |
| 8,007,549 B2 | 8/2011 | Ligeois et al. |
| 9,496,539 B2 | 11/2016 | Tyler et al. |
| 9,496,557 B2 | 11/2016 | Fuhr et al. |
| 10,840,555 B2 | 11/2020 | Iwama et al. |
| 2001/0004505 A1 | 6/2001 | Kim et al. |
| 2001/0051297 A1 | 12/2001 | Nemoto et al. |
| 2001/0053477 A1 | 12/2001 | Kitoh et al. |
| 2002/0061435 A1 | 5/2002 | Hisai |
| 2002/0110729 A1* | 8/2002 | Hozumi ............... H01G 11/70 429/211 |
| 2003/0035993 A1 | 2/2003 | Enomoto et al. |
| 2003/0049536 A1 | 3/2003 | Wiepen |
| 2003/0064285 A1 | 4/2003 | Kawamura et al. |
| 2004/0023108 A1 | 2/2004 | Nakanishi et al. |
| 2005/0048365 A1 | 3/2005 | Miyahisa et al. |
| 2005/0058184 A1 | 3/2005 | Paul et al. |
| 2005/0118499 A1 | 6/2005 | Kim |
| 2005/0158620 A1 | 7/2005 | Kim et al. |
| 2005/0181272 A1 | 8/2005 | Kim |
| 2005/0214640 A1 | 9/2005 | Kim |
| 2005/0238951 A1 | 10/2005 | Yoo et al. |
| 2005/0260487 A1 | 11/2005 | Kim et al. |
| 2005/0260489 A1 | 11/2005 | Kim |
| 2005/0287428 A1 | 12/2005 | Cheon et al. |
| 2005/0287432 A1 | 12/2005 | Cheon et al. |
| 2006/0024574 A1 | 2/2006 | Yim et al. |
| 2006/0063063 A1 | 3/2006 | Mori et al. |
| 2006/0204841 A1 | 9/2006 | Satoh et al. |
| 2008/0026293 A1 | 1/2008 | Marple et al. |
| 2008/0038629 A1 | 2/2008 | Okabe et al. |
| 2008/0057394 A1 | 3/2008 | Rigobert et al. |
| 2008/0145756 A1 | 6/2008 | Taniguichi |
| 2008/0182159 A1 | 7/2008 | Mitani et al. |
| 2009/0104520 A1 | 4/2009 | Marple |
| 2009/0208830 A1 | 8/2009 | Okabe et al. |
| 2009/0208836 A1 | 8/2009 | Fuhr et al. |
| 2009/0239133 A1 | 9/2009 | Kosugi |
| 2009/0280406 A1 | 11/2009 | Kozuki |
| 2009/0311583 A1 | 12/2009 | Wu |
| 2010/0081052 A1 | 4/2010 | Morishima et al. |
| 2010/0129716 A1 | 5/2010 | Kato et al. |
| 2010/0151317 A1 | 6/2010 | Kim et al. |
| 2010/0216001 A1* | 8/2010 | Byun ................... H01M 50/538 429/185 |
| 2010/0266893 A1 | 10/2010 | Martin et al. |

(56) References Cited

U.S. PATENT DOCUMENTS

| | | |
|---|---|---|
| 2010/0316897 A1 | 12/2010 | Kozuki et al. |
| 2010/0330414 A1 | 12/2010 | Mori |
| 2011/0027644 A1 | 2/2011 | Kiyama |
| 2011/0067227 A1 | 3/2011 | Sohn |
| 2011/0171508 A1 | 7/2011 | Kim |
| 2011/0256433 A1 | 10/2011 | Fuhr et al. |
| 2012/0058375 A1 | 3/2012 | Tanaka et al. |
| 2012/0094169 A1 | 4/2012 | Kim et al. |
| 2012/0231641 A1 | 9/2012 | Sugai et al. |
| 2012/0297611 A1 | 11/2012 | Ma |
| 2013/0136977 A1 | 5/2013 | Masuda |
| 2013/0183556 A1 | 7/2013 | Kim |
| 2013/0273401 A1 | 10/2013 | Lee et al. |
| 2013/0323574 A1 | 12/2013 | Tsunaki et al. |
| 2014/0079971 A1 | 3/2014 | Huang |
| 2014/0113185 A1 | 4/2014 | Mori et al. |
| 2014/0162097 A1 | 6/2014 | Fuhr et al. |
| 2014/0205868 A1 | 7/2014 | Phillips |
| 2014/0212695 A1 | 7/2014 | Lane et al. |
| 2014/0234676 A1 | 8/2014 | Tyler et al. |
| 2014/0255748 A1 | 9/2014 | Jan et al. |
| 2015/0104694 A1 | 4/2015 | Okuda et al. |
| 2015/0140379 A1 | 5/2015 | Yau |
| 2015/0155532 A1 | 6/2015 | Harayama et al. |
| 2016/0043373 A1 | 2/2016 | Arishima et al. |
| 2016/0099451 A1 | 4/2016 | Murai et al. |
| 2016/0141589 A1 | 5/2016 | Kang et al. |
| 2016/0155998 A1 | 6/2016 | Wakimoto et al. |
| 2016/0181577 A1 | 6/2016 | Kajiwara et al. |
| 2016/0226056 A1 | 8/2016 | Masson et al. |
| 2016/0329542 A1 | 11/2016 | Tyler et al. |
| 2017/0018750 A1 | 1/2017 | Wintner |
| 2017/0047575 A1 | 2/2017 | Tsuji et al. |
| 2017/0062789 A1 | 3/2017 | Sim et al. |
| 2017/0149042 A1 | 5/2017 | Koo et al. |
| 2017/0200935 A1 | 7/2017 | Hong et al. |
| 2017/0187068 A1 | 8/2017 | Morisawa et al. |
| 2017/0256769 A1 | 9/2017 | Wynn et al. |
| 2017/0372848 A1 | 12/2017 | Yoon et al. |
| 2018/0123143 A1 | 5/2018 | Sato et al. |
| 2018/0130995 A1 | 5/2018 | Nemoto et al. |
| 2018/0182560 A1 | 6/2018 | Khakhalev |
| 2018/0205044 A1 | 7/2018 | Urushihara |
| 2018/0219208 A1 | 8/2018 | Dewulf et al. |
| 2018/0247773 A1 | 8/2018 | Lee |
| 2018/0375162 A1 | 12/2018 | Wakimoto et al. |
| 2019/0006639 A1 | 1/2019 | Ito |
| 2019/0148683 A1 | 5/2019 | Kwon et al. |
| 2019/0221791 A1 | 6/2019 | Wakimoto |
| 2019/0296283 A1 | 9/2019 | Chen et al. |
| 2019/0379019 A1 | 12/2019 | Fukuda et al. |
| 2019/0379028 A1 | 12/2019 | Lim et al. |
| 2019/0386272 A1 | 12/2019 | Shin et al. |
| 2020/0044289 A1 | 2/2020 | Pasma et al. |
| 2020/0083492 A1 | 3/2020 | Koshiol et al. |
| 2020/0119328 A1 | 4/2020 | Zheng et al. |
| 2020/0127249 A1 | 4/2020 | Yoon et al. |
| 2020/0144581 A1 | 5/2020 | Thunot |
| 2020/0144676 A1 | 5/2020 | Tsuruta et al. |
| 2020/0203773 A1* | 6/2020 | Fujita ............... H01M 10/0525 |
| 2020/0212374 A1 | 7/2020 | Gaugler |
| 2020/0235369 A1 | 7/2020 | Jeong et al. |
| 2020/0295341 A1 | 9/2020 | Kim et al. |
| 2020/0388856 A1 | 12/2020 | Hayashi |
| 2021/0039195 A1 | 2/2021 | Jost et al. |
| 2021/0075051 A1 | 3/2021 | Zhou |
| 2021/0167467 A1 | 6/2021 | Yang et al. |
| 2021/0210792 A1* | 7/2021 | Mukai ................. H01M 50/559 |
| 2021/0257652 A1 | 8/2021 | Ko et al. |
| 2021/0273298 A1 | 9/2021 | Babinot et al. |
| 2021/0278479 A1 | 9/2021 | Park et al. |
| 2021/0280835 A1 | 9/2021 | Peng et al. |
| 2021/0344033 A1 | 11/2021 | Park et al. |
| 2021/0376333 A1 | 12/2021 | Shiozaki et al. |
| 2022/0037712 A1 | 2/2022 | Kritzer et al. |
| 2022/0069335 A1 | 3/2022 | Kim |
| 2022/0123444 A1 | 4/2022 | Liu et al. |
| 2023/0123195 A1 | 4/2023 | Fang et al. |

FOREIGN PATENT DOCUMENTS

| | | |
|---|---|---|
| CN | 1426609 A | 6/2003 |
| CN | 1444303 A | 9/2003 |
| CN | 1495943 A | 5/2004 |
| CN | 2681364 Y | 2/2005 |
| CN | 1700495 A | 11/2005 |
| CN | 1832228 A | 9/2006 |
| CN | 1309105 C | 4/2007 |
| CN | 101010818 A | 8/2007 |
| CN | 100349321 C | 11/2007 |
| CN | 101083317 A | 12/2007 |
| CN | 200990393 Y | 12/2007 |
| CN | 201066701 Y | 5/2008 |
| CN | 201117731 Y | 9/2008 |
| CN | 101286572 A | 10/2008 |
| CN | 100468827 C | 3/2009 |
| CN | 101404338 A | 4/2009 |
| CN | 101501884 A | 8/2009 |
| CN | 201466087 U | 5/2010 |
| CN | 201638890 U | 11/2010 |
| CN | 201725845 U | 1/2011 |
| CN | 201781028 U | 3/2011 |
| CN | 202423400 U | 9/2012 |
| CN | 103280543 A | 9/2013 |
| CN | 103427063 A | 12/2013 |
| CN | 203553261 U | 4/2014 |
| CN | 103797611 A | 5/2014 |
| CN | 203967145 U | 11/2014 |
| CN | 104396044 A | 3/2015 |
| CN | 204230370 U | 3/2015 |
| CN | 204596910 U | 8/2015 |
| CN | 204885287 U | 12/2015 |
| CN | 105449291 A | 3/2016 |
| CN | 105655623 A | 6/2016 |
| CN | 106159350 A | 11/2016 |
| CN | 205863251 U | 1/2017 |
| CN | 106463654 A | 2/2017 |
| CN | 107112597 A | 8/2017 |
| CN | 206461019 U | 9/2017 |
| CN | 206461044 U | 9/2017 |
| CN | 206471426 U | 9/2017 |
| CN | 104488113 B | 10/2017 |
| CN | 107275524 A | 10/2017 |
| CN | 206619636 U | 11/2017 |
| CN | 107431215 A | 12/2017 |
| CN | 107482156 A | 12/2017 |
| CN | 107851769 A | 3/2018 |
| CN | 207217654 U | 4/2018 |
| CN | 108063192 A | 5/2018 |
| CN | 207381468 U | 5/2018 |
| CN | 108496269 A | 9/2018 |
| CN | 108695451 A | 10/2018 |
| CN | 208400966 U | 1/2019 |
| CN | 110048065 A | 7/2019 |
| CN | 209328958 U | 8/2019 |
| CN | 110459705 A | 11/2019 |
| CN | 110476273 A | 11/2019 |
| CN | 110581235 A | 12/2019 |
| CN | 209912959 U | 1/2020 |
| CN | 110870099 A | 3/2020 |
| CN | 111033807 A | 4/2020 |
| CN | 111446386 A | 7/2020 |
| CN | 211208547 U | 8/2020 |
| CN | 111668534 A | 9/2020 |
| CN | 111952525 A | 11/2020 |
| CN | 211879534 U | 11/2020 |
| CN | 212182379 U | 12/2020 |
| CN | 112310574 A | 2/2021 |
| CN | 112335075 A | 2/2021 |
| CN | 212907981 U | 4/2021 |
| CN | 112909445 A | 6/2021 |
| CN | 113193165 A | 7/2021 |
| CN | 214378637 U | 10/2021 |
| CN | 215342666 U | 12/2021 |

(56) References Cited

FOREIGN PATENT DOCUMENTS

| | | |
|---|---|---|
| CN | 114865242 A | 8/2022 |
| EP | 2677592 A1 | 12/2013 |
| EP | 2 728 647 A1 | 5/2014 |
| EP | 2 876 338 A1 | 5/2015 |
| EP | 2 160 777 B1 | 3/2019 |
| EP | 4087034 A1 | 11/2022 |
| EP | 4336649 A1 | 3/2024 |
| GB | 1191105 A | 5/1970 |
| GB | 2564670 A | 1/2019 |
| JP | 82-7157 U | 1/1987 |
| JP | 6-124696 A | 5/1994 |
| JP | 7-201309 A | 8/1995 |
| JP | 8-22818 A | 1/1996 |
| JP | 8-102313 A | 4/1996 |
| JP | 8-180849 A | 7/1996 |
| JP | 10-83833 A | 3/1998 |
| JP | 10-106532 A | 4/1998 |
| JP | 10-214609 A | 8/1998 |
| JP | 10-228908 A | 8/1998 |
| JP | 11-67279 A | 3/1999 |
| JP | 11-176447 A | 7/1999 |
| JP | 11-297301 A | 10/1999 |
| JP | 2955135 B2 | 10/1999 |
| JP | 11-329398 A | 11/1999 |
| JP | 2000-243433 A | 9/2000 |
| JP | 2001-28274 A | 1/2001 |
| JP | 2001-43844 A | 2/2001 |
| JP | 2001-52756 A | 2/2001 |
| JP | 2001-148238 A | 5/2001 |
| JP | 2001-256954 A | 9/2001 |
| JP | 3252846 B2 | 2/2002 |
| JP | 2002-157991 A | 5/2002 |
| JP | 2002-289170 A | 10/2002 |
| JP | JP2003-115285 A | 4/2003 |
| JP | 2004-14173 A | 1/2004 |
| JP | 2004-95487 A | 3/2004 |
| JP | 2004-253253 A | 9/2004 |
| JP | 3588264 B2 | 11/2004 |
| JP | 3632586 B2 | 3/2005 |
| JP | 2005-100927 A | 4/2005 |
| JP | 2005-129433 A | 5/2005 |
| JP | 2005-166664 A | 6/2005 |
| JP | 2005-276840 A | 10/2005 |
| JP | 3718872 B2 | 11/2005 |
| JP | 3751782 B2 | 3/2006 |
| JP | 2006-120606 A | 5/2006 |
| JP | 2006-278016 A | 10/2006 |
| JP | 3906519 B2 | 1/2007 |
| JP | 2007-234486 A | 9/2007 |
| JP | 2008-66302 A | 3/2008 |
| JP | 2008-123848 A | 5/2008 |
| JP | 2008-243811 A | 10/2008 |
| JP | 2009-104925 A | 5/2009 |
| JP | 2009-110885 A | 5/2009 |
| JP | 2009-176449 A | 8/2009 |
| JP | 4346637 B2 | 10/2009 |
| JP | 2009-259452 A | 11/2009 |
| JP | 2009-289672 A | 12/2009 |
| JP | 4401634 B2 | 1/2010 |
| JP | 2010-33940 A | 2/2010 |
| JP | 4430587 B2 | 3/2010 |
| JP | 2010-529624 A | 8/2010 |
| JP | 2011-113845 A | 6/2011 |
| JP | 2911-159582 A | 8/2011 |
| JP | 2012-74359 A | 4/2012 |
| JP | 2012-510143 A | 4/2012 |
| JP | 2012-160658 A | 8/2012 |
| JP | 5019557 B2 | 9/2012 |
| JP | 5030379 B2 | 9/2012 |
| JP | 2012-190739 A | 10/2012 |
| JP | 5051410 B2 | 10/2012 |
| JP | 2013-246968 A | 12/2013 |
| JP | 5651536 B2 | 1/2015 |
| JP | 2015-106613 A | 6/2015 |
| JP | 2015-222685 A | 12/2015 |
| JP | 5877724 B2 | 3/2016 |
| JP | 2016-100323 A | 5/2016 |
| JP | 5935878 B2 | 6/2016 |
| JP | 2016-225014 A | 12/2016 |
| JP | 2017-143004 A | 8/2017 |
| JP | 2018-507544 A | 3/2018 |
| JP | 2018-092776 A | 6/2018 |
| JP | 2018-163765 A | 10/2018 |
| JP | 6406836 B2 | 10/2018 |
| JP | 2019-46639 A | 3/2019 |
| JP | WO2019/194182 A1 | 10/2019 |
| JP | 2020-71898 A | 5/2020 |
| JP | 6735445 B2 | 8/2020 |
| JP | 2020-527841 A | 9/2020 |
| JP | 2020-202038 A | 12/2020 |
| KR | 2001-0017098 A | 3/2001 |
| KR | 10-2001-0038811 A | 5/2001 |
| KR | 2001-0056363 A | 7/2001 |
| KR | 10-0490526 B1 | 8/2005 |
| KR | 10-2005-0110460 A | 11/2005 |
| KR | 10-2005-0121904 A | 12/2005 |
| KR | 10-2005-0121914 A | 12/2005 |
| KR | 10-0551885 B1 | 2/2006 |
| KR | 10-2006-0022128 A | 3/2006 |
| KR | 10-0612236 B1 | 8/2006 |
| KR | 10-2007-0033762 A | 3/2007 |
| KR | 10-2008-0047165 A | 5/2008 |
| KR | 10-2010-0068080 A | 6/2010 |
| KR | 10-2010-0089092 A | 8/2010 |
| KR | 10-2010-0096100 A | 9/2010 |
| KR | 10-2013-0084086 A | 7/2013 |
| KR | 10-1320581 B1 | 10/2013 |
| KR | 10-1446151 B1 | 10/2014 |
| KR | 10-2016-0043725 A | 4/2016 |
| KR | 10-2016-0092748 A | 8/2016 |
| KR | 10-1679413 B1 | 11/2016 |
| KR | 10-2017-0025074 A | 3/2017 |
| KR | 10-2017-0033543 A | 3/2017 |
| KR | 10-1743136 B1 | 6/2017 |
| KR | 10-1807353 B1 | 12/2017 |
| KR | 10-2018-0026910 A | 3/2018 |
| KR | 10-1839158 B1 | 3/2018 |
| KR | 10-2018-0106367 A | 10/2018 |
| KR | 10-2018-0116004 A | 10/2018 |
| KR | 10-2018-0118156 A | 10/2018 |
| KR | 20180116156 A * | 10/2018 |
| KR | 10-2018-0129115 A | 12/2018 |
| KR | 10-2019-0030016 A | 3/2019 |
| KR | 10-2019-0040699 A | 4/2019 |
| KR | 10-2019-0078094 A | 7/2019 |
| KR | 10-2042999 B1 | 11/2019 |
| KR | 10-2020-0007561 A | 1/2020 |
| KR | 10-2020-0020173 A | 2/2020 |
| KR | 10-2020-0037599 A | 4/2020 |
| KR | 10-2020-0039214 A | 4/2020 |
| KR | 10-2020-0041625 A | 4/2020 |
| KR | 10-2021-0006203 A | 1/2021 |
| TW | I679311 B | 12/2019 |
| WO | WO 01/59856 A1 | 8/2001 |
| WO | WO2006/035980 A1 | 4/2006 |
| WO | WO2006/085437 A1 | 8/2006 |
| WO | WO2010/0146154 A2 | 12/2010 |
| WO | WO2012/090599 A1 | 7/2012 |
| WO | WO 2013/024774 A1 | 2/2013 |
| WO | WO 2015/025388 A1 | 2/2015 |
| WO | WO2018/117457 A1 | 6/2018 |
| WO | 2020/080089 A1 | 3/2020 |
| WO | 2020/149350 A1 | 7/2020 |
| WO | 2020/171426 A1 | 8/2020 |
| WO | WO 2020/159071 A1 | 8/2020 |
| WO | 2021/020119 A1 | 2/2021 |
| WO | 2021/020237 A1 | 2/2021 |

OTHER PUBLICATIONS

European Search Report mailed in EP 22152223 on Jul. 29, 2022 (10 pages).

(56) References Cited

OTHER PUBLICATIONS

European Search Report mailed in EP 22152237 on Aug. 2, 2022 (11 pages).
European Search Report mailed in EP 22152245 on Jul. 28, 2022 (11 pages).
European Search Report mailed in EP 22152250 on Aug. 5, 2022 (12 pages).
U.S. Office Action for U.S. Appl. No. 17/592,597, dated Jun. 21, 2023.
U.S. Office Action for U.S. Appl. No. 18/132,085, dated Jun. 14, 2023.
Third Party Observation dated Apr. 17, 2024 for European Application No. 22742840.6.
Third Party Observation dated Apr. 18, 2024 for European Application No. 23214922.9.
Third Party Observation dated Apr. 19, 2024 for European Application No. 22742838.0.
Third Party Observation dated Apr. 25, 2024 for European Application No. 22742834.9.
Third Party Observation dated Apr. 4, 2024 for U.S. Appl. No. 17/592,576.
Third Party Observation dated Mar. 22, 2024 for U.S. Appl. No. 17/592,672.
ASM Aerospace Specification Metals Inc., "Aluminum 5052-H19 Foil", 2001, https://asm.matweb.com/search/SpecificMaterial.asp?bassnum=ma5052h19, 2 pages.
Iowa State University, Center for Nondestructive Evaluation, NDE-Ed.org, Physics of Nondestructive Evaluation>Electricity, 2021, https://www.nde-ed.org/Physics/Electricity/voltage.xhtml, 14 pages.
Third Party Observation dated Feb. 13, 2024 for European Application No. 22742834.9.
U.S. Notice of Allowance for U.S. Appl. No. 17/579,380, dated Feb. 14, 2024.
U.S. Office Action for U.S. Appl. No. 17/665,896, dated Feb. 12, 2024.
Youtube, "Tesla Battery Day", Sep. 22, 2020, https://www.youtube.com/watch?v=l6T9xleZTds, 2 pages.
U.S. Office Action for U.S. Appl. No. 18/086,410, dated Jul. 24, 2023.
U.S. Office Action for U.S. Appl. No. 18/086,485, dated Aug. 15, 2023.
"Laser Welding vs. Arc (Tig) Welding of Medical Instruments," Accumet, Oct. 22, 2014, 2 pages total.
Ma et al., "Electro-Thermal Modeling of a Lithium-ion Battery System," Sae International, vol. 3, Issue 2, Oct. 25, 2010, p. 306.
U.S. Office Action for U.S. Appl. No. 17/579,380, dated Jul. 20, 2023.
European Communication pursuant to Rule 114(2) EPC for European Application No. 22742840.6, dated Feb. 5, 2024.
Nigel, "Tesla 4680 Cell," Battery Design, Nov. 18, 2022, URL: <https://www.batterydesign.net/tesla-4680-cell/>.
U.S. Notice of Allowance for U.S. Appl. No. 18/131,751, dated Jan. 16, 2024.
Automotive & Accessories Magazine, "The core topic of Tesla's "Battery Day": reducing battery manufacturing costs," Sep. 23, 2020, 6 pages.
Third Party Observation dated Feb. 26, 2024 for European Application No. 22152256.8.
Third Party Observation dated Feb. 26, 2024 for European Application No. 22152262.6.
Full English Translation of Japanese Publication No. 2002-289170-A dated Oct. 4, 2002.
Third Party Observation dated Apr. 9, 2024 for European Application No. 22742833.1.
U.S. Advisory Action for U.S. Appl. No. 18/086,485, dated Nov. 3, 2023.
U.S. Office Action for U.S. Appl. No. 18/132,166, dated Oct. 2, 2023.
U.S. Office Action for U.S. Appl. No. 17/592,594, dated Nov. 24, 2023.
U.S. Office Action for U.S. Appl. No. 18/132,140, dated Nov. 28, 2023.
European Communication pursuant to Rule 114(2) EPC for European Application No. 22756569.4, dated Jun. 6, 2024.
European Communication pursuant to Rule 114(2) EPC for European Application No. 22756569.4, dated May 27, 2024.
European Communication pursuant to Rule 114(2) EPC for European Application No. 22756574.4, dated May 3, 2024.
European Communication pursuant to Rule 114(2) EPC for European Application No. 22756576.9, dated Apr. 16, 2024.
European Communication pursuant to Rule 114(2) EPC for European Application No. 22856151.0, dated Apr. 30, 2024.
European Communication pursuant to Rule 114(2) EPC for European Application No. 22881171.7, dated May 3, 2024.
European Communication pursuant to Rule 114(2) EPC for European Application No. 22883724.1, dated May 8, 2024.
European Communication pursuant to Rule 114(2) EPC for European Application No. 22895785.8, dated Apr. 16, 2024.
Partial Supplementary European Search Report dated Jul. 15, 2024, for European Application No. 22742840.6.
Third Party Observation dated Jul. 22, 2024 for European Application No. 22881172.5.
U.S. Office Action for U.S. Appl. No. 18/086,402 dated Jun. 12, 2024.

\* cited by examiner

BATTERY AND CURRENT COLLECTOR APPLIED THERETO, AND BATTERY PACK AND VEHICLE INCLUDING THE SAME

CROSS-REFERENCE TO RELATED APPLICATIONS

This application is a Continuation of U.S. application Ser. No. 17/592,597, filed on Feb. 4, 2022, which claims the benefit under 35 U.S.C. § 119(a) to Patent Application No. 10-2021-0022881, filed in the Republic of Korea on Feb. 19, 2021, Patent Application No. 10-2021-0022891, filed in the Republic of Korea on Feb. 19, 2021, Patent Application No. 10-2021-0022894, filed in the Republic of Korea on Feb. 19, 2021, Patent Application No. 10-2021-0022897, filed in the Republic of Korea on Feb. 19, 2021, Patent Application No. 10-2021-0024424, filed in the Republic of Korea on Feb. 23, 2021, Patent Application No. 10-2021-0030291, filed in the Republic of Korea on Mar. 8, 2021, Patent Application No. 10-2021-0030300, filed in the Republic of Korea on Mar. 8, 2021, Patent Application No. 10-2021-0046798, filed in the Republic of Korea on Apr. 9, 2021, Patent Application No. 10-2021-0058183, filed in the Republic of Korea on May 4, 2021, Patent Application No. 10-2021-0077046, filed in the Republic of Korea on Jun. 14, 2021, Patent Application No. 10-2021-0084326, filed in the Republic of Korea on Jun. 28, 2021, Patent Application No. 10-2021-0131205, filed in the Republic of Korea on Oct. 1, 2021, Patent Application No. 10-2021-0131207, filed in the Republic of Korea on Oct. 1, 2021, Patent Application No. 10-2021-0131208, filed in the Republic of Korea on Oct. 1, 2021, Patent Application No. 10-2021-0131215, filed in the Republic of Korea on Oct. 1, 2021, Patent Application No. 10-2021-0131225, filed in the Republic of Korea on Oct. 1, 2021, Patent Application No. 10-2021-0137001, filed in the Republic of Korea on Oct. 14, 2021, Patent Application No. 10-2021-0137856, filed in the Republic of Korea on Oct. 15, 2021, Patent Application No. 10-2021-0142196, filed in the Republic of Korea on Oct. 22, 2021, Patent Application No. 10-2021-0153472, filed in the Republic of Korea on Nov. 9, 2021, Patent Application No. 10-2021-0160823, filed in the Republic of Korea on Nov. 19, 2021, Patent Application No. 10-2021-0163809, filed in the Republic of Korea on Nov. 24, 2021, Patent Application No. 10-2021-0165866, filed in the Republic of Korea on Nov. 26, 2021, Patent Application No. 10-2021-0172446, filed in the Republic of Korea on Dec. 3, 2021, Patent Application No. 10-2021-0177091, filed in the Republic of Korea on Dec. 10, 2021, Patent Application No. 10-2021-0194572, filed in the Republic of Korea on Dec. 31, 2021, Patent Application No. 10-2021-0194593, filed in the Republic of Korea on Dec. 31, 2021, Patent Application No. 10-2021-0194610, filed in the Republic of Korea on Dec. 31, 2021, Patent Application No. 10-2021-0194611, filed in the Republic of Korea on Dec. 31, 2021, Patent Application No. 10-2021-0194612, filed in the Republic of Korea on Dec. 31, 2021, and Patent Application No. 10-2022-0001802, filed in the Republic of Korea on Jan. 5, 2022, all of which are hereby expressly incorporated by reference in their entireties into the present application.

Also, Patent Application No. 10-2021-0007278, filed in the Republic of Korea on Jan. 19, 2021, is hereby expressly incorporated by reference in its entirety into the present application.

TECHNICAL FIELD

The present disclosure relates to a battery, a current collector applied thereto, and a battery pack and a vehicle including the same. More particularly, the present disclosure relates to a battery having a structure for preventing forces from concentrating on a welded portion between components when external impacts or vibrations are applied during the use of a secondary battery, a current collector applied thereto, and a battery pack and a vehicle including the same.

BACKGROUND ART

Secondary batteries are used in a wide range of applications. Among them, for example, battery packs applied to devices such as electric vehicles require high capacity and high output. In addition, the battery pack having high capacity and high output may include, for example, cylindrical batteries as unit battery.

In the case of the cylindrical batteries having high capacity and high output characteristics, to increase the current collection efficiency, electrode tabs may be provided over two surfaces of a jelly roll, and a current collector may be coupled onto each of the two surfaces of the jelly roll. Through the application of this structure, it is possible to maximize the contact area of the electrode tabs and the current collectors, and minimize the resistance at the connected portion between components.

As described above, when the cylindrical batteries is applied to, for example, a device such as a vehicle, external impacts and vibrations may be frequently applied while in used, and as a consequence, a coupled portion for electrical connection between components may be damaged. The damage of the coupled portion causes defects of products.

Alternatively, in case that the coupling area between components reduces due to damage in part of the welded portion even though electrical connection is not completely interrupted when the coupled portion for electrical connection is damaged, an internal short may occur due to excessive heat induced by the increased resistance and the consequential component deformation.

Accordingly, there is a need for development of a cylindrical battery having a structure of preventing forces from concentrating on the coupled portion between components when external impacts and/or vibrations are applied during the use of the cylindrical battery.

In the case of the cylindrical battery, a separator serving as an insulator is interposed between a positive electrode and a negative electrode, and they are wound to form an electrode assembly in the form of a jelly roll, which is inserted into a housing together with an electrolyte to construct a battery. In addition, a strip-shaped electrode tab may be connected to an uncoated region of each of the positive electrode and the negative electrode, and the electrode tab electrically connects the electrode assembly to an electrode terminal exposed to the outside. For reference, the positive electrode terminal is a cap of a sealing structure that closes the opening of the housing, and the negative electrode terminal is the housing.

However, according to the conventional cylindrical battery having such a structure, the current concentrates on the strip-shaped electrode tab coupled to the positive electrode uncoated region and/or the negative electrode uncoated region, resulting in high resistance, a large amount of heat generated, and the consequential low current collection efficiency.

The resistance and heat of small cylindrical batteries with 1865 or 2170 form factor is not a major issue. However, as the form factor increases to apply the cylindrical battery to an electric vehicle, a lot of heat is generated around the electrode tab during the rapid charging process, causing a fire in the cylindrical battery.

In order to solve this problem, a cylindrical battery (a so-called tab-less cylindrical battery) with improved current collection efficiency is proposed, the cylindrical battery designed such that the positive electrode uncoated region and the negative electrode uncoated region are positioned on the top and bottom of the jelly-roll type electrode assembly, respectively, and the current collector is welded to the uncoated region.

FIGS. 1 to 3 are diagrams showing a process of manufacturing the tab-less cylindrical battery. FIG. 1 shows the structure of the electrode plate, FIG. 2 shows a process of winding the electrode plate, and FIG. 3 shows a process of welding the current collector to a bend surface of the uncoated region. FIG. 4 is a cross-sectional view of the tab-less cylindrical battery, taken along the lengthwise direction Z.

Referring to FIGS. 1 to 4, the positive electrode plate 210 and the negative electrode plate 211 have a structure that the sheet-shaped current collector 220 is coated with the active material 221, and include the uncoated region 222 on one long side along the winding direction X.

The electrode assembly A is manufactured by sequentially stacking the positive electrode plate 210 and the negative electrode plate 211 together with two sheets of separators 212 as shown in FIG. 2 and winding them in one direction X. In this instance, the uncoated region of the positive electrode plate 210 and the uncoated region of the negative electrode plate 211 are arranged in opposite directions.

After the winding process, the uncoated region 210a of the positive electrode plate 210 and the uncoated region 211a of the negative electrode plate 211 are bent toward the core. Afterward, the current collectors 230, 231 are coupled to the uncoated regions 210a, 211a by welding, respectively.

No electrode tab is coupled to the positive electrode uncoated region 210a and the negative electrode uncoated region 211a, the current collectors 230, 231 are connected to external electrode terminals, and a current path is formed with a large cross-sectional area along the winding axis direction of the electrode assembly A (see the arrow), thereby reducing the resistance of the battery. This is because the resistance is inversely proportional to the cross-sectional area of the passage through which the current flows.

However, when the form factor of the cylindrical battery increases and the magnitude of the charging current increases during rapid charging, the heat generation problem rises again in the tab-less cylindrical battery.

Specifically, the conventional tab-less cylindrical battery 240 includes the housing 241 and the sealing structure 242 as shown in FIG. 4. The sealing structure 242 includes a cap 242a, a sealing gasket 242b and a connecting plate 242c. The sealing gasket 242b surrounds the edge of the cap 242a and is fixed by a crimping portion 243. In addition, the electrode assembly A is fixed in the housing 241 by a beading portion 244 to prevent vertical movement.

Typically, the positive electrode terminal is the cap 242a of the sealing structure 242, and the negative electrode terminal is the housing 241. Therefore, the current collector 230 coupled to the uncoated region 210a of the positive electrode plate 210 is electrically connected to the connecting plate 242c attached to the cap 242a through a lead 245 in a strip form. In addition, the current collector 231 coupled to the uncoated region 211a of the negative electrode plate 211 is electrically connected to the bottom of the housing 241. The insulator 246 covers the current collector 230 to prevent a short circuit caused by the contact between the housing 241 and the uncoated region 210a of the positive electrode plate 210 having different polarities.

When the current collector 230 is connected to the connecting plate 242c, the lead 245 of a strip form is used. The lead 245 is separately attached to the current collector 230 or is integrally formed with the current collector 230. However, since the lead 245 is in the form of a thin strip, its cross-sectional area is small, and thus, when the rapid charging current flows, a lot of heat is generated. In addition, excessive heat generated from the lead 245 is transferred to the electrode assembly A, causing the separator 212 to shrink, which may cause an internal short circuit that is a main cause of thermal runaway. The lead 245 occupies a considerable installation space in the housing 241.

Accordingly, the cylindrical battery 240 including the lead 245 has low space efficiency, which places limitation on an increase in energy density.

In addition, to connect the conventional tab-less cylindrical batteries 240 in series and/or in parallel, it is necessary to connect busbars to the cap 242a of the sealing structure 242 and the bottom surface of the housing 241, resulting in low space efficiency. A battery pack mounted in an electric vehicle includes a few hundreds of cylindrical batteries 240. Accordingly, inefficient electrical wiring causes considerable inconvenience in the assembly process of the electric vehicle and maintenance and repair of the battery pack.

Meanwhile, recently, as the cylindrical battery is applied to the electric vehicle, the form factor of the cylindrical battery increases. That is, the diameter and height of the cylindrical battery increase compared to the conventional cylindrical batteries having 1865 and 2170 form factor. The increased form factor improves the energy density, the safety against thermal runaway and the cooling efficiency.

In addition to the increased form factor, when the unnecessary internal space of the housing is minimized, the energy density of the cylindrical battery may further increase. Accordingly, there is a need for the optimal design of components used for electrical insulation between the electrode assembly and the housing or components used to collect the current from the positive electrode plate and the negative electrode plate to increase the capacity of the battery and the overall resistance of the battery.

DISCLOSURE

Technical Problem

The present disclosure is designed to solve the above-described problem, and therefore an object of the present disclosure is to disperse external impacts and/or vibrations applied to a secondary battery during the use of the secondary battery to prevent the impacts and/or vibrations from concentrating on a specific portion, thereby preventing damage in a coupled portion between components.

Another object of the present disclosure is to enable a current collector itself to perform the current interruption function to rapidly interrupt the current in the event of an overcurrent caused by a short-circuit without an additional installation of a current interruption member, thereby ensuring safety of secondary batteries while in use.

In another aspect, an object of the present disclosure is to provide a battery having a structure in which a positive electrode terminal and a negative electrode terminal are applied in the same direction.

In still another aspect, an object of the present disclosure is to have a sufficient area for welding an electrical connection component, such as busbars, used to manufacture a battery pack with an electrode terminal of a battery by making use of the wide surface of a closed portion of a housing as an electrode terminal when electrically connecting a plurality of batteries in one direction.

In yet another aspect, an object of the present disclosure is to increase the contact area of an electrode assembly and a current collector (a first current collector) and/or the contact area of a terminal and the current collector (the first current collector) through the improved structure of an uncoated region of an electrode assembly, thereby minimizing the resistance of a battery.

However, the technical problem of the present disclosure is not limited to the above-described problem, and other problems not mentioned herein will be clearly understood by those skilled in the art from the following description.

Technical Solution

To solve the above-described problem, a battery according to an embodiment of the present disclosure includes an electrode assembly including a first electrode, a second electrode, and a separator between the first electrode and the second electrode, the first electrode, the second electrode, and the separator wound about an axis to define a core and an outer circumferential surface, wherein the first electrode includes a first region coated with an active material and a second region at a first side and adjacent to the first region, the second region being exposed beyond the separator, and at least part of the second region is an electrode tab; a housing including a first end with a first opening, the housing accommodating the electrode assembly; a first current collector including an edge portion on the electrode assembly, a second region coupling portion extending from the edge portion and coupled with the second region, and a terminal coupling portion spaced apart from the second region coupling portion; and a terminal coupled with the terminal coupling portion.

The edge portion may a rim shape having an inner space with an opening.

The second region coupling portion and the terminal coupling portion may be electrically connected by the edge portion.

The terminal coupling portion may be at a center of the inner space of the edge portion.

The first current collector may further include a connecting portion extending inward from the edge portion and connected to the terminal coupling portion.

At least part of the connecting portion may be smaller in cross-sectional area than the second region coupling portion.

At least part of the connecting portion may be smaller in at least one of a width or a thickness than the second region coupling portion.

The connecting portion may include a tapered portion in which a width of the connection portion is tapered along a direction from an inner surface of the edge portion toward the terminal coupling portion.

A plurality of the second region coupling portions may be provided.

The plurality of second region coupling portions may be arranged along a circumference of the edge portion.

An extended length of each of the plurality of second region coupling portions may be substantially equal to each other.

A cross-sectional area of each of the plurality of second region coupling portions may be substantially equal.

A width and a thickness of each of the plurality of second region coupling portions may be substantially equal.

The terminal coupling portion may be surrounded by the plurality of second region coupling portions.

The connecting portion may be between a pair of adjacent second region coupling portions.

A distance from the connecting portion to one of the pair of adjacent second region coupling portions along a circumference of the edge portion may be substantially equal to a distance to the other one of the pair of adjacent second region coupling portions.

A plurality of the connecting portions may be provided.

Each of the plurality of connecting portions may be positioned between pairs of adjacent second region coupling portions.

The plurality of connecting portions may be arranged along a circumference of the edge portion.

A distance from each of the plurality of connecting portions to one of the pair of adjacent second region coupling portions may be substantially equal to a distance to the other one of the pair of adjacent second region coupling portions.

The connecting portion may include a current interruption portion having a smaller cross-sectional area than a remaining region of the connection portion.

The current interruption portion may include a region having a smaller width or thickness than the remaining region of the connecting portion.

The current interruption portion may include a notch, a groove, or a through-hole formed on at least one surface of the connecting portion.

The terminal coupling portion may be at a location corresponding to a hole formed at a winding center of the electrode assembly.

The terminal coupling portion may cover the hole formed at the winding center of the electrode assembly to prevent the hole from being exposed beyond the terminal coupling portion.

A diameter of the terminal coupling portion may be substantially equal to or larger than a diameter of the hole formed at the winding center of the electrode assembly.

The second region may extend toward a second end of the housing opposite to the first end of the housing.

The second region coupling portion may be coupled onto a coupling surface formed by bending an end of the second region along a direction parallel to the first current collector.

The battery may further include a cap to seal the first opening of the housing. The cap may not be electrically connected to the electrode assembly and may have no polarity.

The housing may include a beading portion adjacent to the first opening and press-fit toward an inner side of the housing; and a crimping portion formed below the beading portion, and extended and bent to surround a circumferential edge of the cap.

The battery may further include a sealing gasket in the crimping portion and between the housing and the cap.

The terminal may pass through a second end of the housing opposite to the first end of the housing.

The terminal may pass through a center of the second end.

The terminal may be insulated from the housing.

An insulation gasket may be between the housing and the terminal.

The battery may further include an insulator between a second end of the housing opposite the first opening and the first current collector.

The insulator may have a thickness corresponding to a distance between an inner surface of the second end of the housing and the first current collector.

The terminal may be coupled with the terminal coupling portion of the first current collector through a hole formed in the insulator.

A lower end of the terminal coupled with the terminal coupling portion may be at a height that is substantially equal to or higher than a lower surface of the insulator.

The insulator may be between the second region and a sidewall of the housing.

An upper surface of the insulator may contact an inner surface of the second end of the housing opposite the first end, and a lower surface of the insulator may contact an upper surface of the first current collector.

The second electrode may further include a third region coated with an active material and a fourth region at a second side and opposite to the third region, and the fourth region may extend in a direction opposite to the second region and may be exposed beyond the separator.

The housing may be electrically connected to the fourth region.

The battery may further include a second current collector coupled to the fourth region and the housing to electrically connect the fourth region to the housing.

The second current collector may have a second current collector hole formed in an area corresponding to a hole formed at a winding center of the electrode assembly.

The second current collector hole may have a diameter that is substantially equal to or larger than the hole formed at the winding center of the electrode assembly so as not to cover the hole formed at the winding center of the electrode assembly.

The second current collector may include a fourth region coupling portion coupled with the fourth region; and a housing coupling portion coupled with the housing.

The fourth region and the fourth region coupling portion may be coupled to each other by welding.

The housing and the housing coupling portion may be coupled to each other by welding.

The housing may include a beading portion which is formed adjacent to the first opening and press-fit inward.

The housing coupling portion may be electrically coupled to a lower surface of the beading portion.

A distance from a center of the first current collector to an outermost side of the edge portion may be longer than a distance from a center of the second current collector to an outermost side of the fourth region coupling portion.

The distance from the center of the second current collector to the outermost side of the fourth region coupling portion may be substantially equal to or shorter than one half of an inner diameter of the beading portion of the housing.

At least part of the second region may include a plurality of segments along a winding direction of the electrode assembly, and the plurality of segments may be bent along a radial direction of the electrode assembly.

The plurality of segments may overlap in multiple layers.

The electrode assembly may have a welding target area including a uniform number of overlaps of the plurality of segments of the second region along the radial direction of the electrode assembly.

At least part of the fourth region may include a plurality of segments along a winding direction of the electrode assembly, and the plurality of segments may be bent along a radial direction of the electrode assembly.

The plurality of segments may overlap in multiple layers.

The electrode assembly may have a welding target area including a uniform number of overlaps of the plurality of segments of the fourth region along the radial direction of the electrode assembly.

The first current collector may further include a bridge portion connected according to at least one of the following: between adjacent second region coupling portions; between the second region coupling portion and the connecting portion adjacent to each other; and between adjacent connecting portions.

The bridge portion may be at an inner position relative to the edge portion.

The first current collector may have an impregnation hole between the edge portion and the bridge portion.

The impregnation hole may have a slit shape extending along a circumference of the edge portion.

A ratio of a non-contact area between the first current collector and an upper surface of the electrode assembly to an area of a circle having an outer diameter of the electrode assembly is 20% or more and less than 100%.

The first current collector may include an additional connecting portion.

A ratio of a cross-sectional area of the connecting portion at the current interruption portion to a cross-sectional area of the connecting portion at an area adjacent to the current interruption portion may be 0.6 to 0.9.

A ratio of a cross-sectional area of the connecting portion and a cross-section area of the second region coupling portion may be 0.2 to 1.0.

An outer diameter of the first current collector may be 33% to 98.5% of an inner diameter of the housing.

The welding target area may include a maximum number of overlapping layers of the plurality of segments.

The first current collector may be welded to the second region by overlapping at least 50% of the welding target area.

The welding target area may include a maximum number of overlapping layers of the plurality of segments.

The second current collector may be welded to the fourth region by overlapping at least 50% of the welding target area.

A resistance measured between the first electrode and the second electrode of the battery may be 4 mohm or less.

The current interruption portion may be formed at 40% to 90% distance of a radius of the electrode assembly along a radial direction away from the core.

At least part of the second region may include a plurality of segments split along a winding direction of the electrode assembly, and the plurality of segments may be bent along a radial direction of the electrode assembly and overlaps in multiple layers, and the current interruption portion may be in an area corresponding to the welding target area having a uniform number of overlaps of the plurality of segments along the radial direction of the electrode assembly.

A tape may be coupled to the current interruption portion.

The tape may be made of polyimide.

The tape may surround the connecting portion at an area where the current interruption portion is formed.

The following formula may be satisfied:

$$JR-2*F \leq T < JR,$$

wherein an outer diameter of the first current collector is T, wherein an outer diameter of the electrode assembly is JR, and wherein a height of one of the plurality of segments disposed on an outermost side in the radial direction of the electrode assembly is F.

A welding pattern formed by a welding bead formed on one surface of the terminal coupling portion of the first current collector may surround a center of a bottom surface of the terminal.

The welding pattern may be continuously or discontinuously formed.

A tensile strength of a welded portion formed between the terminal coupling portion of the first current collector and a bottom surface of the terminal may be 2 kgf or more.

A converted diameter of a welding pattern formed by a welding bead formed on one surface of the terminal coupling portion of the first current collector may be 2 mm or more.

A flat portion formed on the bottom surface of the terminal may be 3 mm to 14 mm in diameter.

A ratio of an area of a welding pattern formed by a welding bead formed on the surface of the terminal coupling portion of the first current collector compared to an area of a flat portion formed on a bottom surface of the terminal may be 2.04% to 44.4%.

The second current collector hole may be smaller in diameter than the hole formed at the winding center of the electrode assembly.

The diameter of the winding hole is defined as R3, and the diameter of the second current collector hole may be 0.5*R3 or more and less than R3.

The diameter of the winding hole is defined as R3, and the diameter of the second current collector hole may be 0.7*R3 or more and less than R3.

A form factor ratio obtained by dividing a diameter of the battery by a height of the battery may be larger than 0.4.

A length of a welded portion extending along the radial direction of the electrode assembly in an area of coupling between the second region coupling portion and the second region may be longer than a length of a welded portion extending along the radial direction of the electrode assembly in an area of the coupling between the fourth region coupling portion and the fourth region.

A distance from the core to a start point of a welded portion coupling the second region coupling portion and the second region and a distance from the core to a start point of a welded portion coupling the fourth region coupling portion and the fourth region may be substantially equal.

The battery may include a plurality of the current interruption portions being provided along a lengthwise direction of the connecting portion.

A connected portion between the edge portion and the terminal may not have a welded portion.

In another aspect, a battery pack according to an embodiment of the present disclosures includes a plurality of batteries according to an embodiment of the present disclosure described above; and a pack housing accommodating the plurality of batteries.

The plurality of batteries may be arranged in a predetermined number of columns, and a terminal of each of the plurality of batteries and an outer surface of the second end of the housing opposite the first end of the housing may be positioned vertically upward.

The battery pack may include a plurality of busbars connecting the plurality of batteries in series and in parallel, the plurality of busbars may be positioned on the plurality of batteries, and each busbar may include a body portion extending between adjacent batteries of the plurality of batteries; a plurality of first busbar terminals extending in a first direction of the body portion and electrically coupled to terminals of the plurality of battery disposed in the first direction; and a plurality of second busbar terminals extending in a second direction of the body portion opposite the first direction and electrically coupled to the outer surface of the second end of the housing of each of the plurality of batteries disposed in the second direction.

A vehicle according to an embodiment of the present disclosure includes the battery pack according to an embodiment of the present disclosure as described above.

In yet another aspect, a current collector of a battery according to an embodiment of the present disclosure includes an edge portion positioned on one surface of an electrode assembly of the battery; a coupling portion extending from the edge portion and coupled with a region on an electrode of the electrode assembly; and a terminal coupling portion spaced apart from the coupling portion and coupled with a terminal of the battery.

The edge portion may have a rim shape having an inner space with an opening.

The coupling portion and the terminal coupling portion may be electrically connected by the edge portion.

The terminal coupling portion may be at a center of the inner space of the edge portion.

The current collector may further include a connecting portion extending from the edge portion and connected to the terminal coupling portion.

At least part of the connecting portion may be smaller in cross-sectional area than the coupling portion.

At least part of the connecting portion may be smaller in width or thickness than the coupling portion.

The connecting portion may include a tapered portion in which a width of the connection portion is gradually reduced or tapered along a direction from an inner surface of the edge portion toward the terminal coupling portion.

The current collector may include a plurality of the coupling portions.

The plurality of coupling portions may be arranged along a circumference of the edge portion.

A length of each of the plurality of coupling portions may be substantially equal to each other.

A cross-sectional area of each of the plurality of coupling portions may be substantially equal.

A width and a thickness of each of the plurality of coupling portions may be substantially equal.

The terminal coupling may be surrounded by the plurality of coupling portions.

The connecting portion may be between a pair of adjacent coupling portions, and a distance from the connecting portion to one of the pair of coupling portions may be substantially equal to a distance to the other one of the pair of coupling portions.

The current collector may further include a plurality of the connecting portions.

Each of the plurality of connecting portions may be positioned between a pair of adjacent coupling portions.

The plurality of connecting portion may be arranged along a circumference of the edge portion.

A distance from each of the plurality of connecting portions to one of the pair of adjacent coupling portions may be substantially equal to a distance to the other one of the pair of adjacent coupling portions.

The connecting portion may include a current interruption portion having a reduced cross-sectional area in the connecting portion.

The current interruption portion may be a region having a smaller width or thickness than a remaining region of the connecting portion.

The current interruption portion may include at least one of a notch, a groove or a through-hole formed on at least one surface of the connecting portion.

The current collector may further include a bridge portion connected according to at least one of the following: between adjacent coupling portions; between the coupling portion and another connecting portion adjacent; and between adjacent connecting portions.

The bridge portion may be disposed at an inner position relative to the edge portion.

An impregnation hole may be formed between the edge portion and the bridge portion.

The impregnation hole may have a shape of a slit extending along a circumference of the edge portion.

The current collector may include an additional connecting portion.

A ratio of a cross-sectional area of the connecting portion at an area where the current interruption portion is formed may be 0.6 to 0.9 compared to a cross-sectional area of the connecting portion at an area adjacent to the area where the current interruption portion is formed.

A ratio of a cross-sectional area of the connecting portion may be 0.2 to 1.0 compared to a cross-sectional area of the coupling portion.

A tape may be coupled to the current interruption portion.

The tape may be made of polyimide.

The tape may surround the connecting portion at the area where the current interruption portion is formed.

Advantageous Effects

According to an aspect of the present disclosure, it is possible to disperse external impacts and/or vibrations applied to the secondary battery during the use of the secondary battery to prevent the impacts and/or vibrations from concentrating on a specific portion, thereby preventing damage in the coupled portion between components.

According to another aspect of the present disclosure, the current collector itself performs the current interruption function without an additional installation of a current interruption member, and accordingly it is possible to rapidly interrupt the current in the event of an overcurrent caused by a short-circuit, thereby ensuring safety of secondary batteries while in use.

According to another aspect of the present disclosure, the sectional area of the current path is increased by improving the structure of the electrode terminal of the battery, thereby solving the problem of internal heat generated during rapid charging.

According to another aspect of the present disclosure, an electrical wiring operation for connecting batteries in serial and/or in parallel may be performed on one side of the batteries.

According to another aspect of the present disclosure, when electrically connecting a plurality of batteries in one direction, the wide surface of the closed portion of the housing is used as an electrode terminal, thereby having a sufficient area for welding an electrical connection component, such as busbars, used to manufacture a battery pack with electrode terminals of the batteries.

According to another aspect of the present disclosure, it is possible to increase the contact area of the electrode assembly and the current collector (first current collector) and/or the contact area of the terminal and the current collector (first current collector) through the improved structure of the uncoated region of the electrode assembly, thereby minimizing the resistance of the battery.

However, the technical effects that can be obtained through the present disclosure are not limited to the above-described effect, and these and other effects will be clearly understood by those skilled in the art from the following description.

DESCRIPTION OF DRAWINGS

The accompanying drawings illustrate embodiments of the present disclosure, and together with the detailed description of the present disclosure described below, serve to provide a further understanding of the technical aspects of the present disclosure, and thus the present disclosure should not be construed as being limited to the drawing.

DESCRIPTION OF THE EMBODIMENTS

Figure 1:
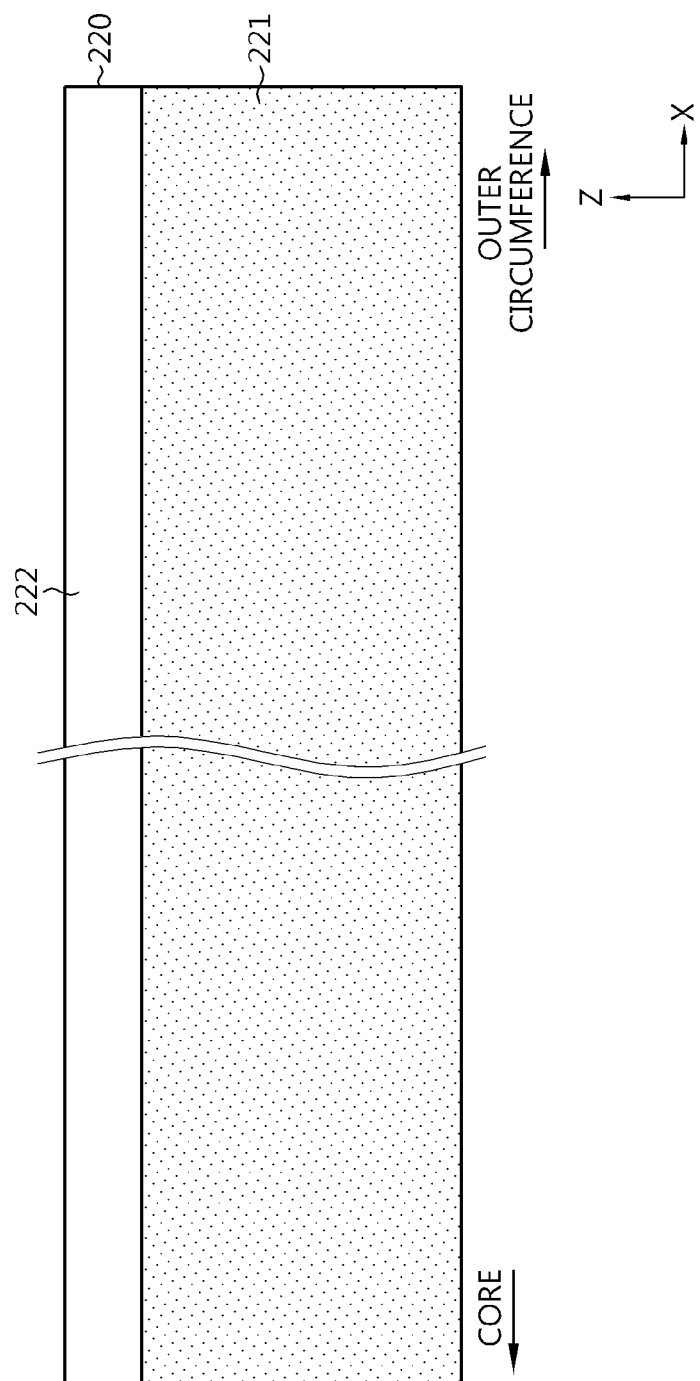
FIG. 1 is a plan view showing a structure of an electrode plate used in a conventional tab-less cylindrical battery.

Hereinafter, embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation. Therefore, the embodiments described herein and illustrations shown in the drawings are just some of the embodiments of the present disclosure, but not intended to fully describe the technical aspects of the present disclosure, so it should be understood that a variety of other equivalents and modifications could have been made thereto at the time that the application was filed.

In addition, to help the understanding of the present disclosure, the accompanying drawings may illustrate some elements in exaggerated dimensions, not in actual scale. Furthermore, the same element in different embodiments may be given the same reference numeral.

The term equal refers to 'substantially equal'. Accordingly, substantially equal may include the deviation regarded as a low level in the corresponding technical field, for example, the deviation of 5% or less. In addition, uniformity of a certain parameter in a predetermined region may mean uniformity in terms of an average.

Figure 5:
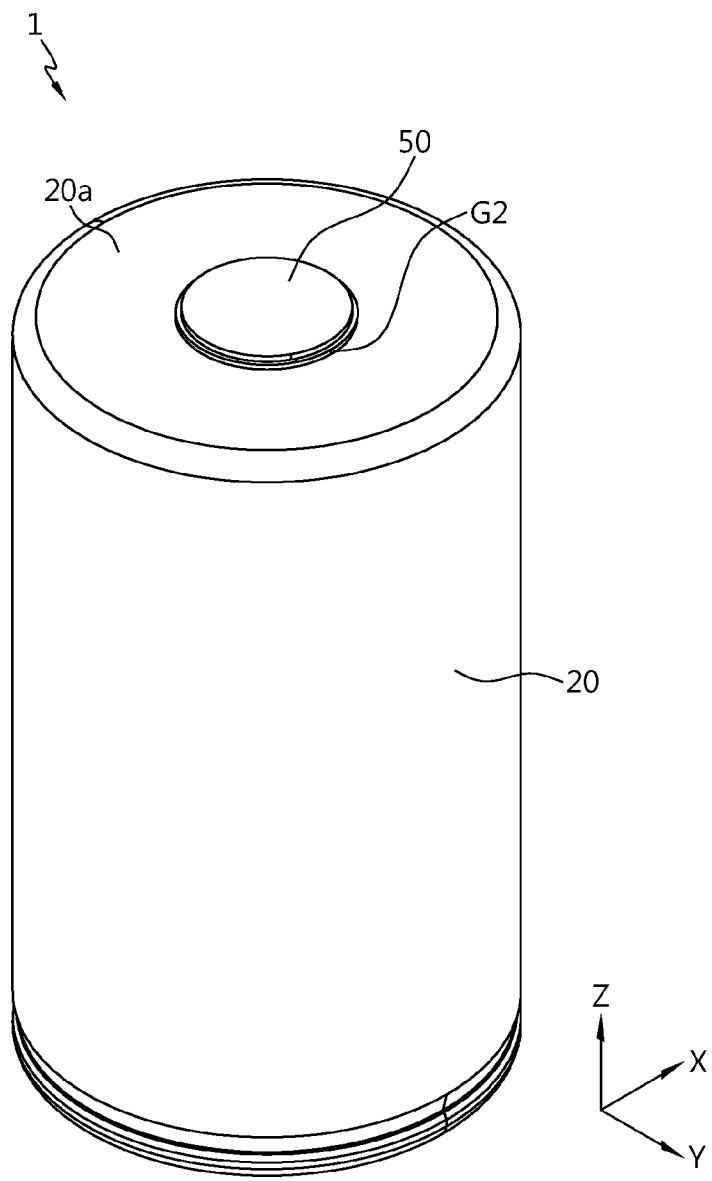
FIG. 5 is a diagram showing an appearance of a cylindrical battery according to an embodiment of the present disclosure.
Figure 6:
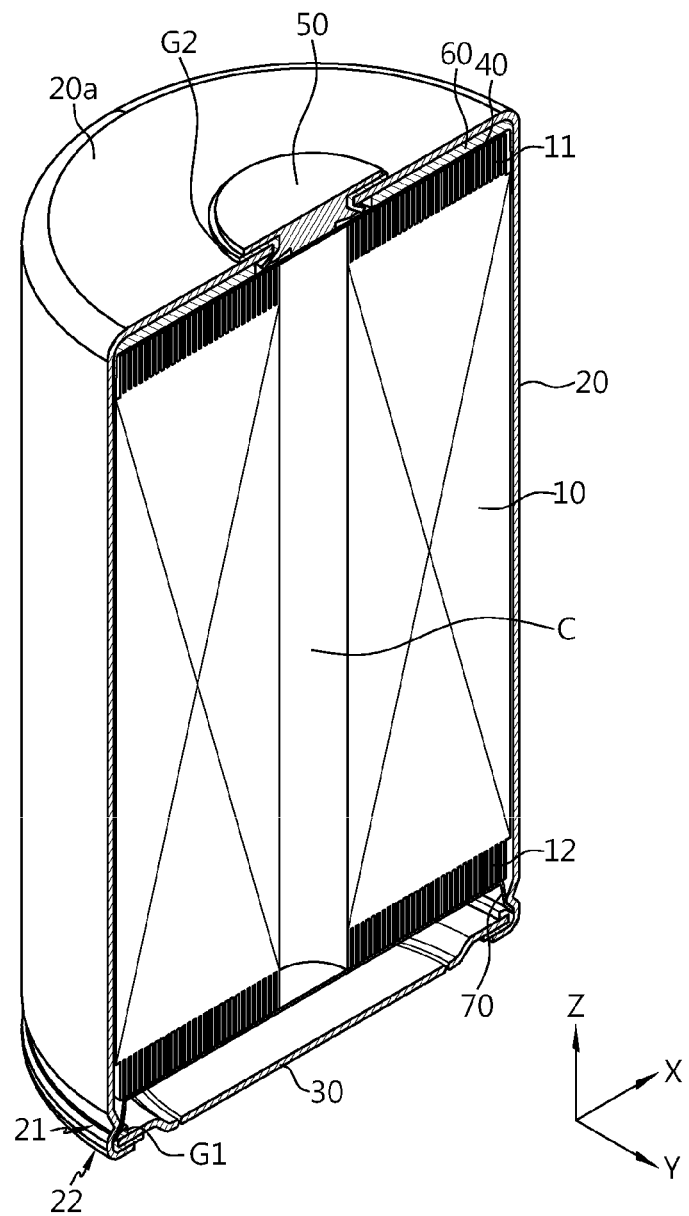
FIG. 6 is a cross-sectional view showing an internal structure of a cylindrical battery according to an embodiment of the present disclosure.

Referring to FIGS. 5 and 6, a cylindrical battery 1 according to an embodiment of the present disclosure includes an electrode assembly 10, a housing 20, a cap 30, a current collector (a first current collector) 40 and a terminal 50. In addition to the above-described components, the cylindrical battery 1 may further include a sealing gasket G1 and/or an insulation gasket G2 and/or an insulator 60 and/or a second current collector 70.

The electrode assembly 10 includes a first electrode having a first polarity, a second electrode having a second polarity, and a separator interposed between the first electrode and the second electrode. The first electrode is a positive electrode or a negative electrode, and the second electrode corresponds to an electrode having the opposite polarity to the first electrode.

The electrode assembly 10 may have, for example, a jelly-roll structure. That is, the electrode assembly 10 may be manufactured by forming a stack by stacking a first electrode current collector and a second electrode current collector having a sheet shape at least once with the separator interposed between and winding the stack around a winding center C in a direction. In this case, an additional separator may be provided on an outer circumferential surface of the electrode assembly 10 for insulation from the housing 20. Any well-known jelly-roll structure may be applied to the present disclosure without limitations.

The first electrode includes the first electrode current collector and a first electrode active material coated on one or two surfaces of the first electrode current collector. There is an uncoated region, in which the first electrode active material is not coated, at one end of the first electrode current collector in the widthwise direction (parallel to the Z axis). The uncoated region serving as a first electrode tab is hereinafter referred to as a first uncoated region 11. The first uncoated region 11 is provided on the electrode assembly 10 received in the housing 20 in the heightwise direction (parallel to the Z axis). That is, the first electrode current collector includes the first uncoated region 11 in which the active material layer is not coated and is exposed to the outside of the separator at the end of the long side, and part of the first uncoated region 11 itself is used as an electrode tab. The first uncoated region 11 may be, for example, a positive electrode tab.

Meanwhile, at least part of the first uncoated region 11 may include a plurality of segments segmented along the winding direction of the electrode assembly 10. In this case, the plurality of segments may be bent along the radial direction of the electrode assembly 10. The plurality of bent segments may overlap in multiple layers. In this case, a first uncoated region coupling portion 32 as described below may be coupled to an area in which the plurality of segments overlap in multiple layers.

The second electrode includes the second electrode current collector and a second electrode active material coated on one or two surfaces of the second electrode current collector. There is an uncoated region, in which the second electrode active material is not coated, at the other end of the second electrode current collector in the widthwise direction (parallel to the Z axis). The uncoated region serving as a second electrode tab is hereinafter referred to as a second uncoated region 12. The second uncoated region 12 is provided below the electrode assembly 10 received in the housing 20 in the heightwise direction (parallel to the Z axis). That is, the second electrode current collector includes the second uncoated region 12 in which the active material layer is not coated and is exposed to the outside of the separator at the end of the long side, and at least part of the second uncoated region 12 itself is used as an electrode tab. The second uncoated region 12 may be, for example, a positive electrode tab. Meanwhile, at least part of the second uncoated region 12 may include a plurality of segments segmented along the winding direction of the electrode assembly 10. In this case, the plurality of segments may be bent along the radial direction of the electrode assembly 10. The plurality of bent segments may overlap in multiple layers. In this case, a second current collector 70 as described below may be coupled to an area in which the plurality of segments overlaps in multiple layers.

The first uncoated region 11 and the second uncoated region 12 extend in the opposite directions along the heightwise direction (parallel to the Z axis) of the cylindrical battery 1. The first uncoated region 11 extends toward a closed portion of the housing 20, and the second uncoated region 12 extends toward an open portion of the housing 20.

In the present disclosure, a positive electrode active material coated on the positive electrode plate and a negative electrode active material coated on the negative electrode plate may include any well-known active material without limitation.

In an example, the positive electrode active material may include an alkali metal compound represented by a general formula $A[A_xM_y]O_{2+z}$ (A includes at least one of Li, Na or K; M includes at least one selected from Ni, Co, Mn, Ca, Mg, Al, Ti, Si, Fe, Mo, V, Zr, Zn, Cu, Al, Mo, Sc, Zr, Ru and Cr; $x \geq 0$, $1 \leq x+y \leq 2$, $-0.1 \leq z \leq 2$; and the stoichiometric coefficients x, y and z are selected to keep the compound electrically neutral).

In another example, the positive electrode active material may include an alkali metal compound $xLiM^1O_2$-$(1-x)Li_2M^2O_3$ disclosed in U.S. Pat. Nos. 6,677,082, 6,680,143, et al., wherein $M^1$ includes at least one element having an average oxidation state of 3; $M^2$ includes at least one element having an average oxidation state of 4; $0 \leq x \leq 1$).

In still another example, the positive electrode active material may include lithium metal phosphate represented by a general formula $Li_aM^1{}_xFe_{1-x}M^2{}_yP_{1-y}M^3{}_zO_{4-z}$ ($M^1$ includes at least one selected from the Ti, Si, Mn, Co, Fe, V, Cr, Mo, Ni, Nd, Al, Mg and Al; $M^2$ includes at least one selected from Ti, Si, Mn, Co, Fe, V, Cr, Mo, Ni, Nd, Al, Mg, Al, As, Sb, Si, Ge, V and S; $M^3$ includes a halogen group element optionally including F; $0<a\leq2$, $0\leq x\leq 1$, $0\leq y<1$, $0\leq z<1$; the stoichiometric coefficients a, x, y and z are selected to keep the compound electrically neutral), or $Li_3M_2(PO_4)_3$ (M includes at least one selected from Ti, Si, Mn, Fe, Co, V, Cr, Mo, Ni, Al, Mg and Al).

Preferably, the positive electrode active material may include primary particles and/or secondary particles formed by agglomeration of the primary particles.

In an example, the negative electrode active material may include carbon materials, lithium metal or lithium metal compounds, silicon or silicon compounds and tin or tin compounds. In addition, the negative electrode active material may include metal oxides such as $TiO_2$ and $SnO_2$ with a potential of less than 2V. The carbon material may include a low-crystalline carbon and a high-crystalline carbon.

The separator may include a porous polymer film, for example, a porous polymer film made of a polyolefin-based polymer such as ethylene homopolymer, propylene homopolymer, ethylene/butene copolymer, ethylene/hexene copolymer and ethylene/methacrylate copolymer, used singly or in stack. As another example, the separator may include a commonly used porous nonwoven fabric, for example, a nonwoven fabric made of high melting point glass fibers and polyethylene terephthalate fibers.

A coating layer of inorganic particles may be included on at least one surface of the separator. The separator itself may be a coating layer of inorganic particles. The particles in the coating layer may be coupled with a binder such that there is interstitial volume between adjacent particles.

The inorganic particles may be an inorganic material having a dielectric constant of 5 or more. A non-limiting example of the inorganic particles may include at least one selected from the group consisting of $Pb(Zr,Ti)O_3$ (PZT), $Pb_{1-x}La_xZr_{1-y}Ti_yO_3$ (PLZT), $PB(Mg_3Nb_{2/3})O_3$-$PbTiO_3$ (PMN-PT), $BaTiO_3$, hafnia ($HfO_2$), $SrTiO_3$, $TiO_2$, $Al_2O_3$, $ZrO_2$, $SnO_2$, $CeO_2$, MgO, CaO, ZnO and $Y_2O_3$.

An electrolyte may be a salt having a structure of $A^+B^-$. Here, $A^+$ includes an alkali metal cation such as $Li^+$, $Na^+$ and $K^+$, or a combination thereof. $B^-$ includes at least one anion selected from the group consisting of $F^-$, $Cl^-$, $Br^-$, $I^-$, $NO_3{}^-$, $N(CN)_2{}^-$, $BF_4{}^-$, $ClO_4{}^-$, $AlO_4{}^-$, $AlCl_4{}^-$, $PF_6{}^-$, $SbF_6{}^-$, $AsF_6{}^-$, $BF_2C_2O_4{}^-$, $BC_4O_8{}^-$, $(CF_3)_2PF_4{}^-$, $(CF_3)_3PF_3{}^-$, $(CF_3)_4PF_2{}^-$, $(CF_3)_5PF^-$, $(CF_3)_6P^-$, $CF_3SO_3{}^-$, $C_4F_9SO_3{}^-$, $CF_3CF_2SO_3{}^-$, $(CF_3SO_2)_2N^-$, $(FSO_2)_2N^-$, $CF_3CF_2$ $(CF_3)_2CO^-$, $(CF_3SO_2)_2$ $CH^-$, $(SF_5)_3C^-$, $(CF_3SO_2)_3C^-$, $CF_3(CF_2)_7SO_3{}^-$, $CF_3CO_2{}^-$, $CH_3CO_2{}^-$, $SCN^-$ and $(CF_3CF_2SO_2)_2N^-$.

The electrolyte may be dissolved in an organic solvent. The organic solvent may include at least one of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC) or γ-butyrolactone.

Figure 7:
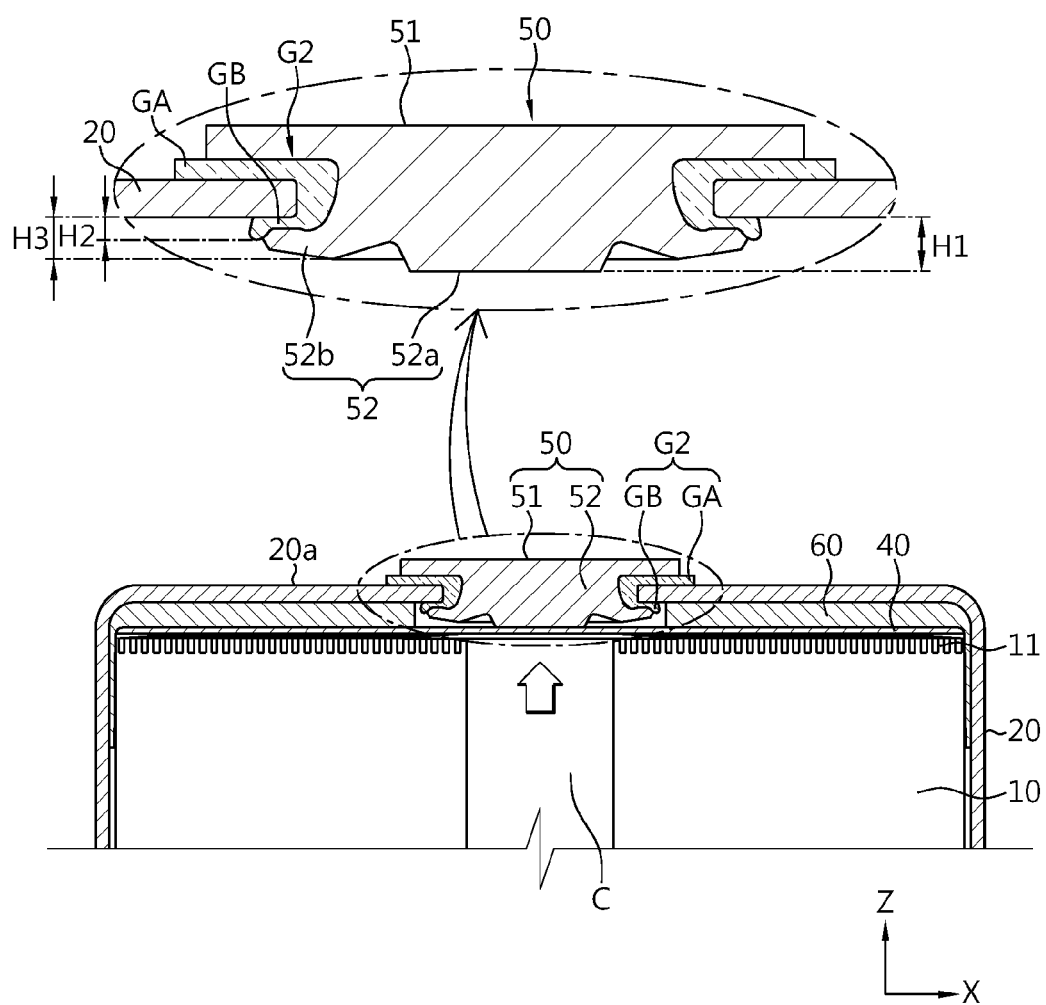
FIG. 7 is a partial cross-sectioned view showing an upper structure of a cylindrical battery according to an embodiment of the present disclosure.
Figure 23:
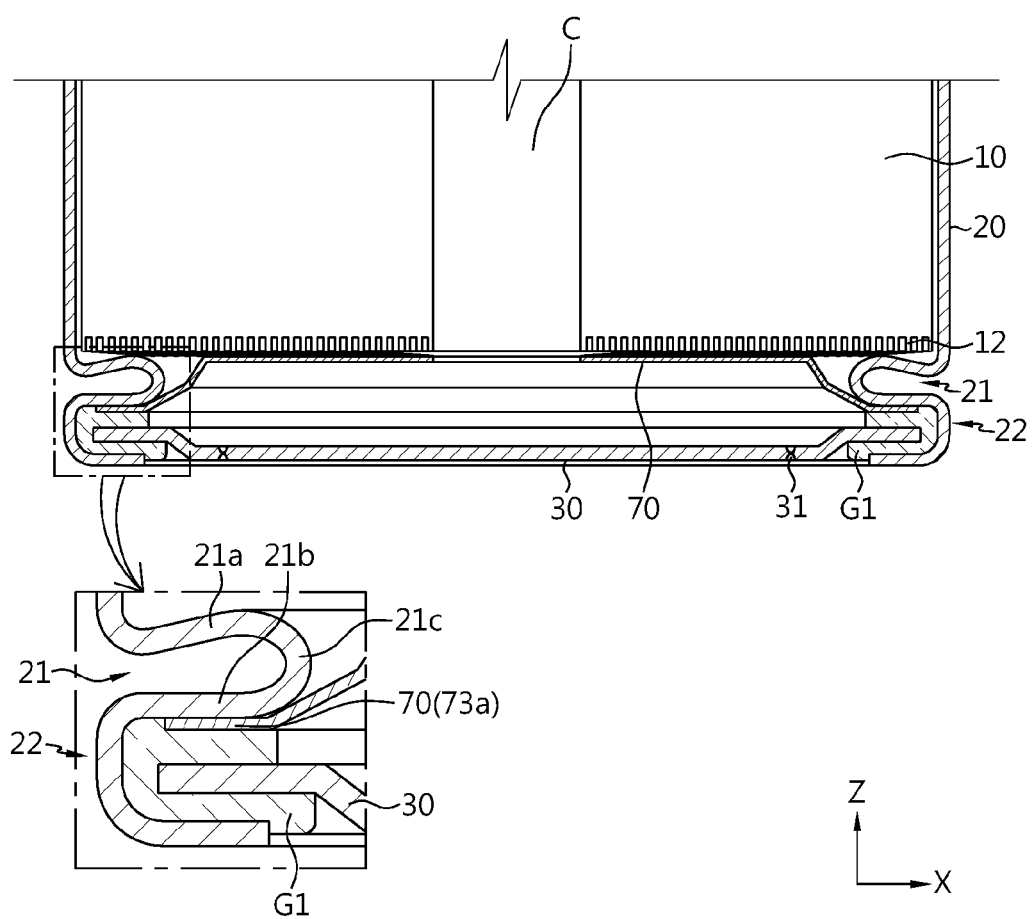
FIG. 23 is a partial cross-sectioned view showing a lower structure of a cylindrical battery according to an embodiment of the present disclosure.

Referring to FIGS. 6, 7 and 23, the housing 20 is a substantially cylindrical container having an opening on the lower side, and is made of, for example, a material having conductive properties such as a metal. The material of the housing 20 may include, for example, steel, stainless steel or nickel-plated steel. The upper surface disposed on the side opposite to the opening will be referred to as a closed portion. The sidewall portion and the closed portion of the housing 20 may be integrally formed. Alternatively, the sidewall portion and the closed portion of the housing 20 may be provided separately from each other and be coupled to each other, for example, by welding. The upper surface of the housing 20 (a surface parallel to the X-Y plane) or an outer surface 20a of the closed portion, may have an approximately flat shape. The housing 20 accommodates the electrode assembly 10 through the opening formed on the lower side, and also accommodates the electrolyte together.

The housing 20 is electrically connected to the electrode assembly 10. The housing 20 is electrically connected to, for example, the second uncoated region 12 of the electrode assembly 10. In this case, the housing 20 has the same polarity as the second uncoated region 12.

Referring to FIGS. 6 and 23, the housing 20 may include a beading portion 21 and a crimping portion 22 formed at the lower end thereof. The beading portion 21 is disposed below the electrode assembly 10. The beading portion 21 is formed by press-fitting the periphery of the outer circumferential surface of the housing 20. An upper beading portion 21a and a lower beading portion 21b disposed at upper and lower positions, respectively, with respect to an innermost portion 21c of the beading portion 21 disposed on the innermost side along the pressing-fitting direction may have an asymmetrical shape. This asymmetrical shape may be formed in the process of compressing the housing 20 along the height direction (parallel to the Z-axis) through a sizing process. The sizing process is a process of conforming the height of the cylindrical battery 1 to the design form factor by pressing the housing 20 along the winding axis direction of the electrode assembly 10.

The lower beading portion 21b may include a flat portion approximately parallel to the closed portion of the housing 20. Meanwhile, due to the asymmetrical shape, the upper beading portion 21a may be inclined upward, at least in part, along a direction toward the innermost portion 21c. Accordingly, the upper beading portion 21a may press the lower part of the electrode assembly 10 to fix the electrode assembly 10. The beading portion 21 prevents the electrode assembly 10 having a size approximately corresponding to the inner diameter of the housing 20 from slipping through the opening formed at the lower end of the housing 20 and may function as a support portion on which the cap 30 is seated. In addition to the cap 30, the lower beading portion 21b may function as a support portion for fixing the contact portion 73a of the second current collector 70 and the sealing gasket G1 as described below.

The crimping portion 22 is formed below the beading portion 21. The crimping portion 22 extends from the lower beading portion 21. The crimping portion 22 is extended and bent to surround the outer circumferential surface of the cap 30 disposed below the beading portion 21 and a part of the lower surface of the cap 30. In addition to the cap 30, the crimping portion 22 may fix the sealing gasket G1.

However, the present disclosure does not exclude the case where the housing 20 does not include the beading portion 21 and/or the crimping portion 22. In the present disclosure, in case that the housing 20 does not include the beading portion 21 and/or the crimping portion 22, fixing the electrode assembly 10 and/or fixing the cap 30 and/or sealing the housing 20 may be realized by, for example, additionally applying a component serving as a stopper for the electrode assembly 10 and/or additionally applying a structure on which the cap 30 is seated and/or welding the housing 20 and the cap 30.

Meanwhile, the housing 20 may have different thicknesses for each location. The housing 20 may include the sidewall portion that is thinner than the closed portion. In this case, the electrode assembly 10 may have a larger diameter, thereby providing an energy density advantage.

The housing 20 may be, for example, about 0.4 mm to 1.2 mm, and more particularly about 0.6 mm to 1.0 mm in thickness at the area of the closed portion or the upper surface. In case that the thickness of the closed portion of the housing 20 is too small, there may be a high likelihood that the internal pressure rises or the housing 20 deforms when welded. On the contrary, in case that the thickness of the closed portion of the housing 20 is too large, it is not good for the processing of the housing 20, and losses of energy density may increase. Therefore, it is necessary to manage the thickness of the closed portion of the housing 20 at an appropriate level.

Meanwhile, the housing 20 may be about 0.3 mm to 0.8 mm, and more particularly about 0.4 mm to 0.6 mm in thickness at the sidewall portion that forms the outer circumferential surface. If the thickness of the sidewall portion of the housing 20 is too small, there is a high likelihood that a fire spreads to neighboring cylindrical batteries 1 when the fire and explosion occurs in the cylindrical battery 1. For example, when a fire and explosion occur due to a malfunction of a cylindrical battery 1 in a battery pack including a plurality of cylindrical batteries 1, in case that the thickness of the sidewall portion of the housing 20 is too small, a pin hole may be formed, and as a consequence, the likelihood of a chain ignition and explosion may increase. In contrast, in case that the thickness of the sidewall portion of the housing 20 is too large, it is not good for the processing of the housing 20 and losses of energy density may increase. Therefore, it is necessary to manage the thickness of the sidewall portion of the housing 20 at an appropriate level. Meanwhile, the housing 20 may have a plating layer. In this case, the plating layer may include, for example, nickel (Ni). The plating layer may be about 1.5 μm to 6.0 μm in thickness.

Referring to FIGS. 6 and 23, the cap 30 may be made of, for example, a metal material to ensure rigidity. The cap 30 closes the opening (or the open end) formed at the lower end of the housing 20. That is, the cap 30 forms the lower surface of the cylindrical battery 1. In the cylindrical battery 1 of the present disclosure, the cap 30 made of a metal material having conductive properties may have no polarity. The cap 30 has no polarity may means that the cap 30 is not electrically connected to the electrode assembly 10. When the cap 30 is not electrically connected to the electrode assembly 10, the cap 30 does not function as a positive electrode terminal or a negative electrode terminal. That is, in the present disclosure, the cap 30 does not need to be electrically connected to the electrode assembly 10 and the housing 20, and its material is not necessarily limited to the conductive metal.

When the housing 20 of the present disclosure includes the beading portion 21, the cap 30 may be supported by the lower surface of the beading portion 21 formed in the housing 20. In addition, when the housing 20 of the present disclosure includes the crimping portion 22, the cap 30 is fixed by the crimping portion 22. That is, the upper surface of the cap 30 may be supported by the beading portion 21, and the outer circumferential surface and the lower surface of the cap 30 may be supported by the crimping portion 22. The sealing gasket G1 may be interposed between the cap 30 and the crimping portion 22 of the housing 20 to ensure sealability of the housing 20. Meanwhile, as described above, the housing 20 of the present disclosure may not include the beading portion 21 and/or the crimping portion 22, and in this case, the sealing gasket G1 may be interposed between a structure for fixing provided at the opening of the housing 20 and the cap 30 to ensure sealability of the housing 20.

Figure 24:
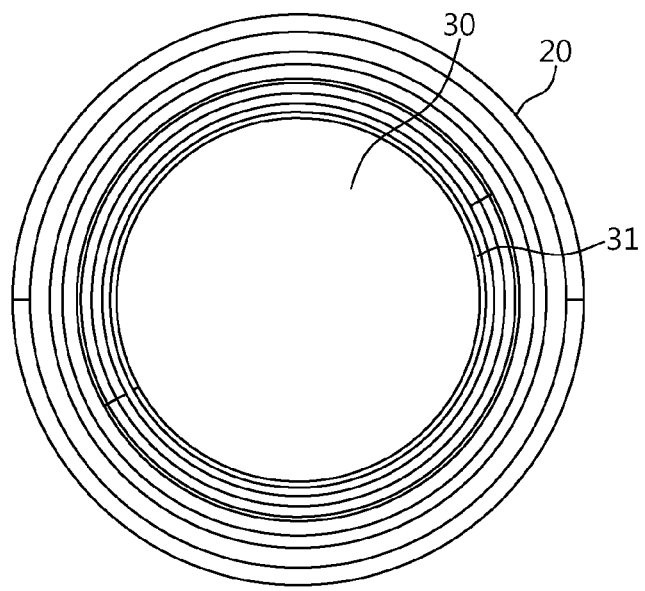
FIG. 24 is a diagram showing a lower surface of a cylindrical battery according to an embodiment of the present disclosure.

Referring to FIGS. 23 and 24, the cap 30 may further include a venting portion 31 to prevent the internal pressure from rising over a preset value due to a gas generated inside the housing 20. The preset internal pressure value may be about 15 kgf/cm$^2$ to 35 kgf/cm$^2$. The venting portion 31 corresponds to a region having a smaller thickness than the peripheral region of the cap 30. The venting portion 31 is more structurally vulnerable than the peripheral region. Accordingly, in case that the internal pressure of the housing 20 rises over a certain level due to a malfunction of the cylindrical battery 1, the venting portion 31 blows to force gas generated inside the housing 20 out. The venting portion 31 may be formed, for example, by notching on one or two surfaces of the cap 30 to partially reduce the thickness of the housing 20.

The cylindrical battery 1 according to an embodiment of the present disclosure may have a structure in which both the positive electrode terminal and the negative electrode terminal are provided at the upper part thereof as described below, and thus the upper structure is more complicated than the lower structure. Accordingly, the cap 30 that forms the lower surface of the cylindrical battery 1 may include the venting portion 31 to force gas generated inside the housing 20 out. As shown in FIG. 23, the lower end of the cap 30 is preferably disposed higher than the lower end of the housing 20. In this case, even in case that the lower end of the housing 20 contacts the ground or the bottom surface of the housing for constructing a module or pack, the cap 30 does not contact the ground or the bottom surface of the housing for constructing a module or pack. Accordingly, it is possible to prevent the pressure required for the blowing of the venting portion 31 from deviating from a design value due to the weight of the cylindrical battery 1, thereby allowing the venting portion 31 to blow smoothly.

Meanwhile, the venting portion 31 may extend continuously or discontinuously to surround the central region of the cap 30. In this case, a longer distance from the center of the cap 30 to the venting portion 31 causes the venting portion 31 to blow more easily when the internal pressure rises. This is because under the equal internal pressure applied, with the increasing distance from the center point of the cap 30 to the venting portion 31, a greater force acts on the venting portion 31, thereby allowing the venting portion 31 to blow more easily. In addition, with the increasing distance from the center point of the cap 30 to the venting portion 31, the open area by venting increases, thereby allowing the venting gas to smoothly exit. From this point of view, the venting portion 31 may be preferably formed along the edges of the central region having an approximately flat shape extending in a downward direction (in FIG. 23) among the entire region of the cap 30.

Although FIGS. 23 and 24 show that the venting portion 31 is continuously formed on the cap 30 in an approximately circular shape, the present disclosure is not limited thereto. The venting portion 31 may have an approximately elliptical shape or any other geometric shape including the center point of the cap 30 therein. In addition, the venting portion 31 may be formed discontinuously, rather than continuously.

Referring to FIG. 7, the current collector (the first current collector) 40 is coupled to the upper part of the electrode assembly 10. The current collector 40 is made of a metal having conductive properties, and is connected to the first uncoated region 11.

Figure 8:
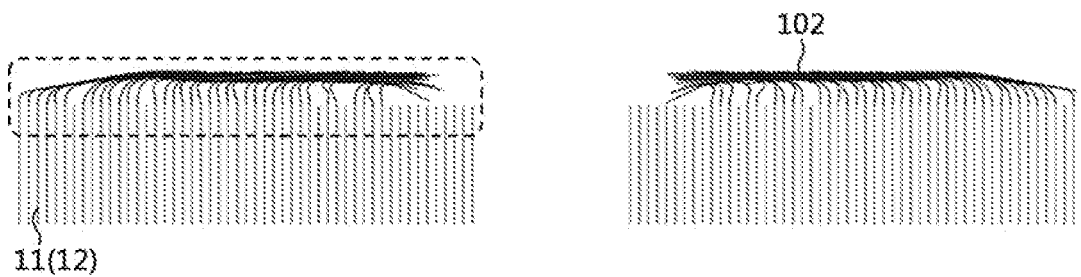
FIG. 8 is an enlarged diagram showing an upper part of an electrode assembly of the present disclosure.

Referring to FIGS. 7 and 8, the current collector 40 may be coupled onto a coupling surface (a bend surface) 102 formed by bending the end of the first uncoated region 11 in parallel to the current collector 40. The bending direction of the first uncoated region 11 may be the radial direction of the electrode assembly 10. The bending direction of the first uncoated region 11 may be, for example, a direction facing the winding center C of the electrode assembly 10. When the first uncoated region 11 has the bent shape as described above, the space occupied by the first uncoated region 11 reduces, thereby improving the energy density. In addition, the coupling area between the first uncoated region 11 and the current collector 40 increases, thereby improving the coupling strength and reducing the contact resistance.

Figure 9:
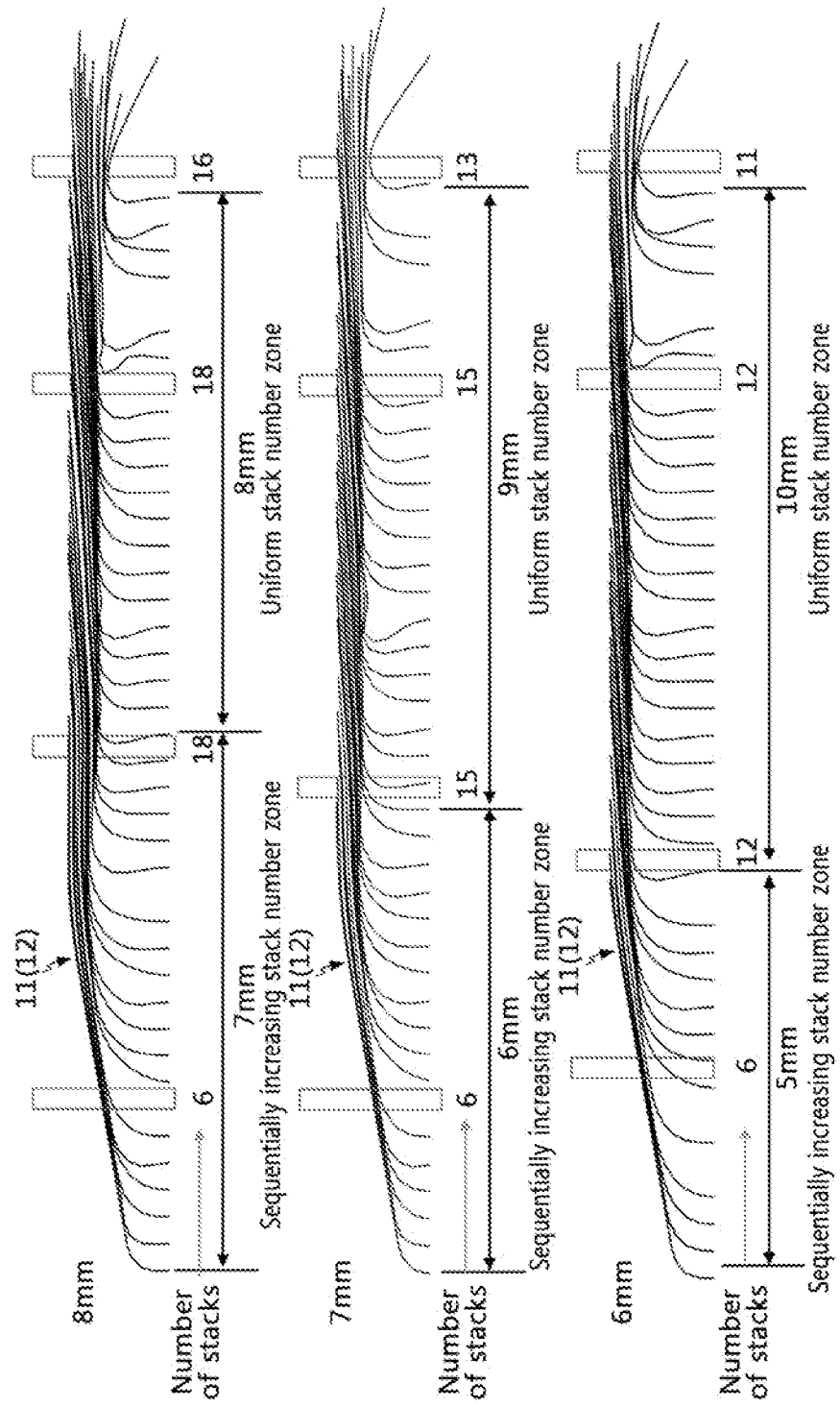
FIG. 9 is an enlarged diagram showing an upper part of an uncoated region of FIG. 8.
Figure 29:
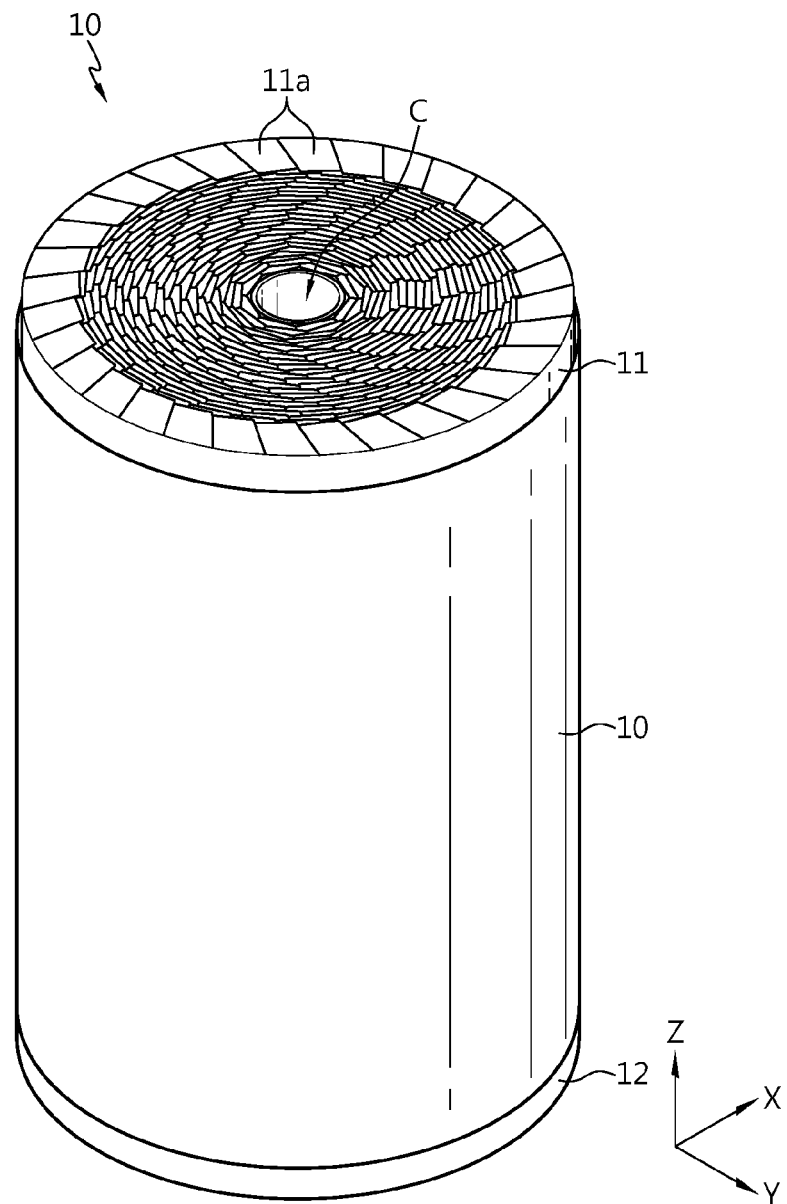
FIG. 29 is a perspective view showing an electrode assembly with a bent uncoated region according to an embodiment of the present disclosure.

Referring to FIGS. 7 to 9, at least part of the first uncoated region 11 and/or the second uncoated region 12 may include the plurality of segments (see 11*a* in FIGS. 26 and 29) split along the winding direction of the electrode assembly 10. In this case, the plurality of segments may be bent along the radial direction of the electrode assembly 10. The plurality of bent segments may overlap in multiple layers. In this case, the first uncoated region coupling portion 42 (see FIGS. 12 to 15) of the current collector (the first current collector) 40 and/or a second uncoated region coupling portion 72 (see FIG. 25) of the current collector (the second current collector) 70 as described below may be coupled to an area in which the plurality of segments overlap in multiple layers.

Referring to FIGS. 7 to 9, as the first uncoated region 11 and/or the second uncoated region 12 is bent from the outer circumference of the electrode assembly 10 to the electrode core, there is a zone in which the segments overlap in ten or more layers.

When the plurality of segments overlap by bending the segments of the first uncoated region 11 and/or the second uncoated region 12 from the outer circumference of the electrode assembly 10 to the core, the number of overlapping layers of the segments gradually increases from the outer circumference to the core. The number of overlapping layers of the segments is uniformly maintained when it reaches a specific zone after it gradually increases.

The zone where the number of overlapping layers of the segments is approximately at the maximum and is approximately uniformly maintained is defined as a welding target area. The number of overlapping layers at the welding target area may be, for example, approximately ten or more. The first current collector 40 and/or the second current collector 70 as described below may be coupled with the first uncoated region 11 and/or the second uncoated region 12 by welding to overlap with the welding target area at least 50% or more. It is desirable to increase the output of a laser to sufficiently ensure the weld strength when welding the first current collector 40 and/or the second current collector 70 onto the approximately flat coupling surface 102 formed by bending the first uncoated region 11 and/or the second uncoated region 12. When the output of the laser increases, the laser penetrates into the electrode assembly 10 through the area in which the first uncoated region 11 and/or the second uncoated region 12 overlaps, causing damage to the separator and the active material layer. Accordingly, to prevent the laser from passing through, it is desirable to increase the number of overlapping layers of the first uncoated region 11 and/or the second uncoated region 12 above a predetermined level. To increase the number of overlapping layers of the first uncoated region 11 and/or the second uncoated region 12, it is necessary to increase the height of the segment. However, when the height of the segment increases, swell may occur in the first uncoated region 11 and/or the second uncoated region 12 in the process of manufacturing the electrode plate. Accordingly, it is desirable to adjust the height of the segment to an appropriate level.

As described above, when it is designed such that the radial direction length of the zone in which the number of overlapping layers of the segments of the first uncoated region 11 and/or the second uncoated region 12 is ten or more is approximately 25% or more compared to the radius of the electrode assembly 10, and welding is carried out in the welding target area, even though the output of the laser increases, the overlapping portion of the first uncoated region 11 and/or the second uncoated region 12 sufficiently masks the laser, thereby preventing damage of the separator and the active material layer by the laser.

Referring to FIGS. 6 and 7, the current collector (the first current collector) 40 is coupled to the upper part of the electrode assembly 10. In addition, the current collector 40 is coupled with the terminal 50. That is, the current collector 40 electrically connects the first uncoated region 11 of the electrode assembly 10 to the terminal 50. The first current collector 40 is made of a metal having conductive properties.

Referring to FIGS. 8 and 9 together with FIGS. 6 and 7, the current collector 40 may be coupled onto the coupling surface (the bend surface) 102 formed by bending the end of the first uncoated region 11 in parallel to the current collector 40. The bending direction of the first uncoated region 11 may be, for example, a direction facing the winding center C of the electrode assembly 10 or the core. When the first uncoated region 11 has the bent shape as described above, the space occupied by the first uncoated region 11 reduces, thereby improving the energy density. In addition, when the first uncoated region 11 has the bent shape as described above, the coupling area between the first uncoated region 11 and the current collector 40 increases, thereby improving the coupling strength and reducing the resistance.

Referring to FIGS. 12 to 15 together with FIGS. 6 and 7, the current collector 40 includes an edge portion 41, an uncoated region coupling portion (a first uncoated region coupling portion) 42 and a terminal coupling portion 43. The edge portion 41 may be positioned on the electrode assembly 10, and have an approximately rim shape having an empty space S inside. Although the drawings of the present disclosure show the edge portion 41 having an approximately circular rim shape, the present disclosure is not limited thereto. The edge portion 41 may have an approximately square rim shape, a hexagonal rim shape, an octagonal rim shape, or any other rim shape as opposed to those shown in the drawings.

The uncoated region coupling portion (the first uncoated region coupling portion) 42 extends inward from the edge portion 41 and is coupled with the first uncoated region 12. As described above, the coupling between the current collector 40 and the first uncoated region 11 preferably has at least approximately 50% overlap with the welding target area or the zone where the number of overlapping layers of the segments is approximately at the maximum and is approximately uniformly maintained. That is, the uncoated region coupling portion 42 of the current collector 40 may be coupled with the first uncoated region 11 such that it overlaps with the welding target area at least approximately 50%.

The terminal coupling portion 43 is disposed on the inner side of the edge portion 41, apart from the uncoated region coupling portion 42. The terminal coupling portion 43 may be coupled with the terminal 50 as described below by welding. To ensure the welding area for coupling with the flat portion formed on the bottom surface of the terminal 50, the terminal coupling portion 43 may have the diameter that is substantially equal or larger than the diameter of the flat portion formed on the bottom surface of the terminal 50. The terminal coupling portion 43 may be disposed, for example, at approximately the center of the internal space surrounded by the edge portion 41. The terminal coupling portion 43 may be positioned at a location corresponding to a hole formed at the winding center C of the electrode assembly 10. The terminal coupling portion 43 may be configured to cover the hole formed at the winding center C of the electrode assembly 10 to prevent from the hole formed at the winding center C of the electrode assembly 10 being exposed to the outside of the terminal coupling portion 43. When the hole formed at the winding center C of the electrode assembly 10 is covered as described above, it is possible to prevent the separator disposed in the hole from being damaged due to the flow rate of the electrolyte solution passing through the hole and the consequential exposure of the electrode. To this end, the terminal coupling portion 43 may have a larger diameter or width than the hole formed at the winding center C of the electrode assembly 10.

The uncoated region coupling portion 42 and the terminal coupling portion 43 are not directly connected to each other, and they are spaced apart from each other and electrically connected by the edge portion 41. Since the current collector 40 according to an embodiment of the present disclosure has a structure in which the uncoated region coupling portion 42 and the terminal coupling portion 43 are not directly connected to each other and they are connected through the edge portion 41, when impacts and/or vibrations occur in the cylindrical battery 1, it is possible to disperse the impacts applied to the coupled portion between the uncoated region coupling portion 42 and the first uncoated region 12 and the coupled portion between the terminal coupling portion 43 and the terminal 50. Accordingly, the current collector 40 of the present disclosure may minimize or prevent damage of the welded portion by external impacts. The current collector 40 of the present disclosure may have a structure in which stress concentrates on the connected portion of the edge portion 41 and the terminal coupling portion 43 when external impacts are transmitted to the inside of the battery 1 through the terminal 50. However, the connected portion is not a portion in which the welded portion for coupling between components is formed. Accordingly, in the present disclosure, it is possible to effectively prevent defects of products caused by the damage of the welded portion due to external impacts.

The current collector 40 may further include a connecting portion 44 which extends inward from the edge portion 41 and is connected to the terminal coupling portion 43. The connecting portion 44 may include a taper portion 44a in which the width becomes narrower along a direction from the inner surface of the edge portion 41 to the terminal coupling portion 43. That is, the taper portion 44a may be configured such that the width becomes wider along a direction from the connected portion between the terminal coupling portion 43 and the edge portion 41 to the edge portion 41. The width change of the taper portion 44a may include a continuous change and a gradual change. When the taper portion 44a is provided, it is possible to increase the rigidity of the component at the connected portion between the connecting portion 44 and the edge portion 41. When the taper portion 44a is provided, it is possible to transfer the current collector 40 and/or an assembly of the current collector 40 and the electrode assembly 10 easily and safely, for example, by a transport device and/or an operator who holds the taper portion 44a, in the process of manufacturing the cylindrical battery 1. That is, when the taper portion 44a is provided, it is possible to prevent defects of products that may occur when holding a component to be welded with other component, such as the uncoated region coupling portion 42 or the terminal coupling portion 43.

Meanwhile, the plurality of first uncoated region coupling portions 42 may be provided. When the plurality of first uncoated region coupling portions 42 is provided, the plurality of uncoated region coupling portions 42 may be arranged, for example, in a radial pattern, a crisscross pattern or a combined pattern with respect to the center of the terminal coupling portion 43. Although the drawings of the present disclosure show three first uncoated region coupling portions 42 and four first uncoated region coupling portions 42, the present disclosure is not limited thereto. The number of the first uncoated region coupling portions 42 may be variously determined considering the resistance level required for the cylindrical battery 1 and the open ratio of the first current collector 40. The plurality of first uncoated region coupling portions 42 may be regularly arranged along the extension direction of the edge portion 41. For example, the plurality of first uncoated region coupling portions 42 may be arranged at the substantially equal interval along the extension direction of the edge portion 41. The extended length of each of the plurality of first uncoated region coupling portions 42 may be substantially equal to each other. The first uncoated region coupling portion 42 may be coupled with the first uncoated region 11 by welding.

The terminal coupling portion 43 may be positioned such that it is surrounded by the plurality of first uncoated region coupling portions 42. The terminal coupling portion 43 may be coupled with the terminal 50 by welding. The connecting portion 44 may be disposed between a pair of adjacent first uncoated region coupling portions 42. In this case, the distance from the connecting portion 44 to one of the pair of first uncoated region coupling portions 42 along the extension direction of the edge portion 41 may be substantially equal to the distance from the connecting portion 44 to the other of the pair of first uncoated region coupling portions 42 along the extension direction of the edge portion 41. The cross-sectional area of each of the plurality of first uncoated region coupling portions 42 may be substantially equal to each other. The width and thickness of each of the plurality of first uncoated region coupling portions 42 may be substantially equal to each other.

The plurality of connecting portions 44 may be provided. The number of connecting portions 44 may be determined, considering the resistance level required for the cylindrical battery 1 and the open ratio of the first current collector 40. Each of the plurality of connecting portions 44 may be positioned between the pair of adjacent first uncoated region coupling portions 42. The plurality of connecting portions 44 may be regularly arranged along the extension direction of the edge portion 41. For example, the plurality of connecting portions 44 may be arranged at the substantially equal interval along the extension direction of the edge portion 41. Meanwhile, the distance from each of the plurality of connecting portions 44 to one of the pair of adjacent first uncoated region coupling portions 42 along the extension direction of the edge portion 41 may be substantially equal to the distance to the other first uncoated region coupling portion 42.

In case that the plurality of first uncoated region coupling portions 42 and/or the plurality of connecting portions 44 is provided as described above, when the distance between the first uncoated region coupling portions 42 and/or the distance between the connecting portions 44 and/or the distance between the first uncoated region coupling portion 42 and the connecting portion 44 are formed approximately uniformly, it is possible to form a smooth flow of current from the first uncoated region coupling portion 42 toward the connecting portion 44 or from the connecting portion 44 toward the first uncoated region coupling portion 42.

The coupling between the current collector 40 and the first uncoated region 11 may be made by welding. In this case, for example, laser welding, ultrasonic welding and spot welding may be used.

Referring to FIGS. 16 to 20, the connecting portion 44 may include current interruption portions N, G, T to partially reduce the cross-sectional area of the connecting portion 44. The reduction in the cross-sectional area of the connecting portion 44 at an area in which the current interruption portion is formed may be realized, for example, through a partial reduction in the width and/or thickness of the connecting portion 44. When the current interruption portion is provided, the electrical resistance at the area in which the current interruption portion is formed increases, and in the event of an overcurrent, the current interruption portion blows, thereby achieving rapid current interruption. The plurality of current interruption portions may be provided along the lengthwise direction of the connecting portion. When the plurality of connecting portions 44 is provided, the current interruption portion may be provided in at least one of the plurality of connecting portions 44. For example, the current interruption portion may include at least one of a notch, a groove or a through-hole.

When the connecting portion 44 includes the taper portion 44a, the current interruption portion may be disposed closer to the taper portion 44a than the terminal coupling portion 43. A larger amount of heat is generated at the narrowest part of the taper portion 44a, and the current interruption portion close to the taper portion 44a may rapidly interrupt an overcurrent.

Meanwhile, to prevent impurities such as welding spatter produced when blown from entering the electrode assembly 10, the current interruption portion is preferably provided in an area corresponding to the welding target area of the electrode assembly 10 described above. In this area, the number of overlapping layers of the segments of the first uncoated region 11 is maintained at the maximum, and the overlapping segments may act as a mask. The current interruption portion may be formed, for example, at a location approximately 40% to 90% away from the core of the electrode assembly 10 along the radial direction of the electrode assembly 10 on the basis of the radius of the electrode assembly along the radial direction. Preferably, the current interruption portion may be disposed at the approximately center between the core and the outermost side of the electrode assembly 10.

Figure 16:
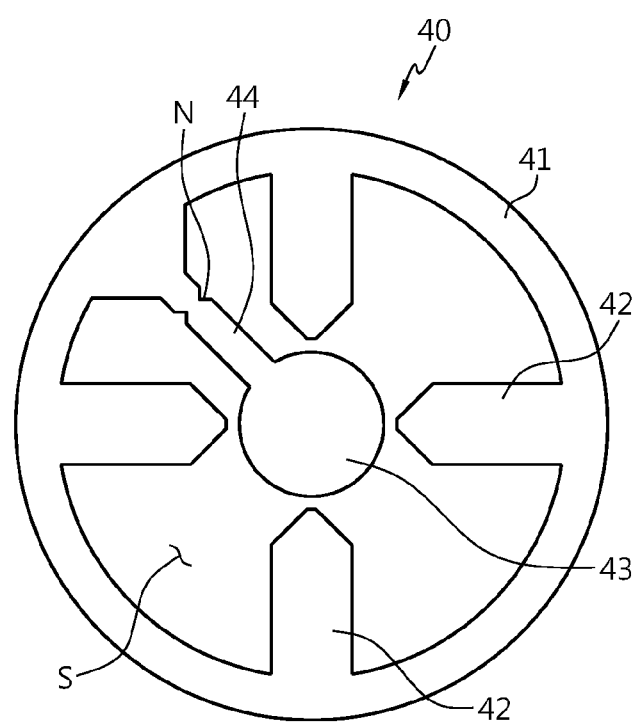
FIGS. 16 to 20 are diagrams exemplarily showing various shapes of a current collector (a first current collector) according to another embodiment of the present disclosure (a current collector with a current interruption portion).
Figure 17:
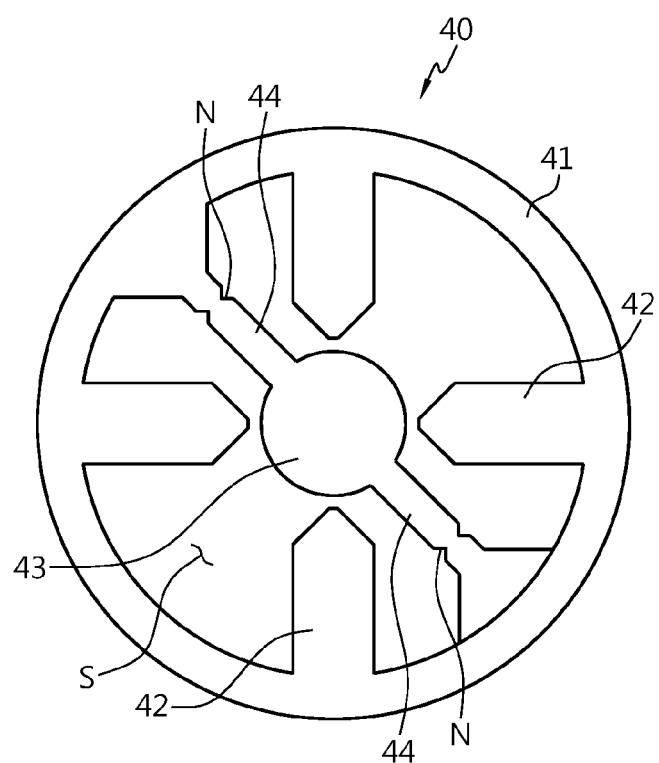

Referring to FIGS. 16 and 17, the current interruption portion may include a notch N formed on at least one surface of the connecting portion 44. The notch N may gradually decrease in width as it goes inward from the surface of the connecting portion 44. The notch N may be formed on the side and/or the upper surface and/or the lower surface of the connecting portion 44. When the plurality of connecting portions 44 is provided as shown in FIG. 17, the notch N may be formed in at least one of the plurality of connecting portions 44.

Figure 18:
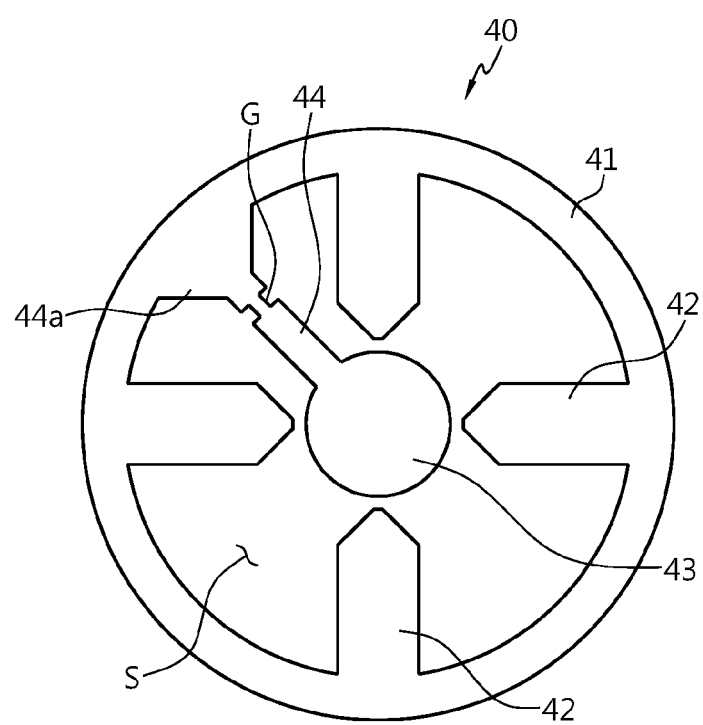
Figure 19:
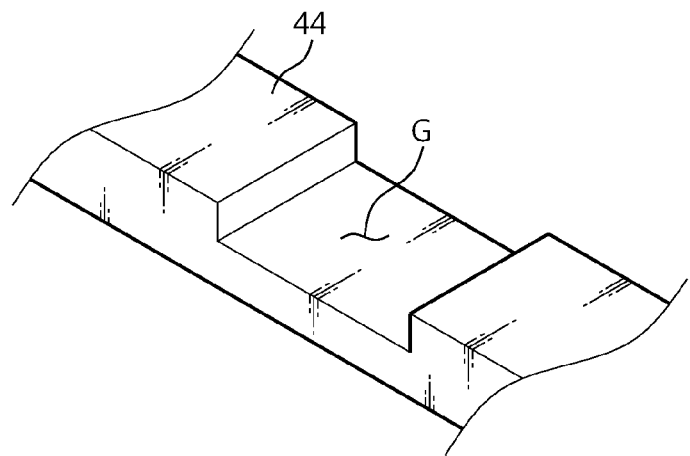

Referring to FIGS. 18 and 19, the current interruption portion may include a groove G formed on at least one surface of the connecting portion 44. The groove G may be formed on the side and/or the upper surface and/or the lower surface of the connecting portion 44. When the plurality of connecting portions 44 is provided, the groove G may be formed in at least one of the plurality of connecting portions 44.

Figure 20:
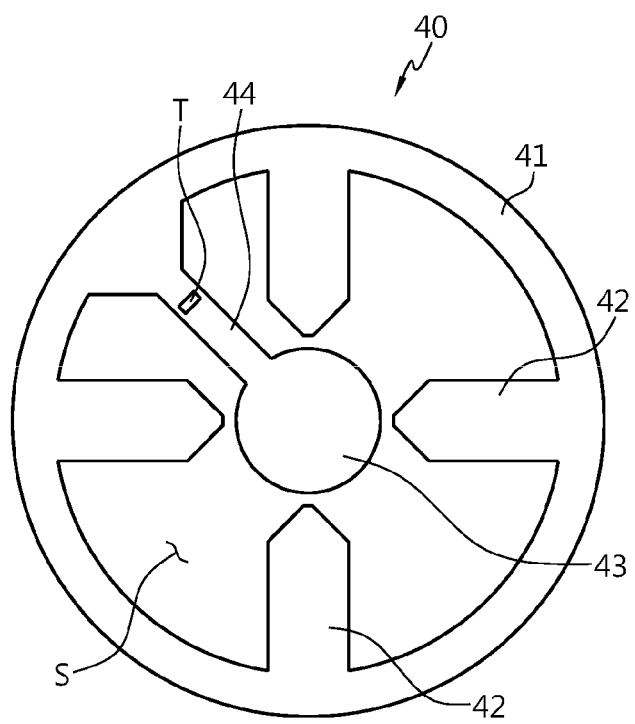

Referring to FIG. 20, the current interruption portion may include a through-hole T formed on at least one surface of the connecting portion 44. The through-hole T may pass through the upper surface and the lower surface of the connecting portion 44 and/or the side of the connecting portion 44. When the plurality of connecting portions 44 is provided, the through-hole T may be formed in at least one of the plurality of connecting portions 44.

When the plurality of connecting portions 44 is provided and the current interruption portion is provided in at least two of the connecting portions 44, the plurality of current interruption portions may have approximately the same shape or different shapes. For example, the plurality of current interruption portions may include at least two of a notch N, a groove G or a through-hole T.

Figure 21:
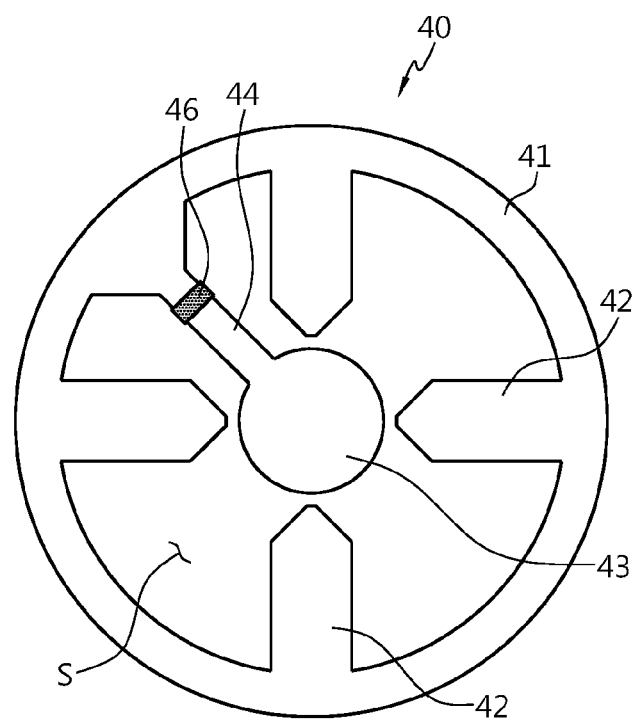
FIG. 21 is a diagram exemplarily showing various shapes of a current collector (a first current collector) according to a still another embodiment of the present disclosure (a current interruption portion to which a cover member is applied).

Referring to FIG. 21, a tape 46 may be coupled to the current interruption portion. The tape 46 may be configured such that it surrounds the circumference of the connecting portion 44 in the area in which the current interruption portion is formed. The tape 46 may be made of a variety of materials, and for example, may be made of polyimide (PI) which does not easily deform by heat. However, the material of the tape 46 of the present disclosure is not limited thereto.

When the tape 46 is applied, heat generated from the current interruption portion does not easily exit. Accordingly, the temperature rises fast at the current interruption portion, and the current interruption portion rapidly blows to interrupt an overcurrent. In addition, when the tape 46 is applied, it is possible to prevent impurities, such as molten metal, produced when the current interruption portion blows from splattering to other components.

The cross-sectional area of the connecting portion 44 in the area in which the current interruption portion is formed may range from about 0.6 to 0.9 compared to the cross-sectional area of the connecting portion 44 in the area in which the current interruption portion is not formed. For example, when the current interruption portion is provided such that it reduces the width of the connecting portion 44 while maintaining the thickness of the connecting portion 44, the width of the connecting portion 44 in the area in which the current interruption portion is formed may range from about 0.6 to 0.9 compared to the width of the connecting portion 44 in the area in which the current interruption portion is not formed. This is the same with the case in which the current interruption portion is provided such that it reduces the thickness of the connecting portion 44 while maintaining the width of the connecting portion 44. When the cross-sectional area reduces too much by the current interruption portion, the resistance of the cylindrical battery 1 is too high, and when the cross-sectional area reduces just a little bit, it is difficult to achieve the overcurrent interruption.

In another aspect, the number of connecting portions 44 may be one or two. This is for rapid overcurrent interruption. When there are too many connecting portions 44, the flow of current is dispersed and the fusing function may not normally work. When the perspective of ensuring the rigidity of the current collector 40 is taken into account together, the number of connecting portions 44 may be two. In another aspect, the cross-sectional area of the connecting portion 44 may range from about 0.2 to 1.0 compared to the cross-sectional area of the uncoated region coupling portion 42. For example, when the thickness of the connecting portion 44 is substantially equal to the thickness of the uncoated region coupling portion 42, the width of the connecting portion 44 may range from about 0.2 to 1.0 compared to the width of the uncoated region coupling portion 42. When the cross-sectional area of the connecting portion 44 is too large, it is difficult to achieve the overcurrent interruption, and when the cross-sectional area of the connecting portion 44 is too small, the overall resistance value of the cylindrical battery 1 may be excessively large.

In still another aspect of the present disclosure, a ratio of the non-contact area between the current collector 40 and the upper surface of the electrode assembly 10 to the area of a circle having the outer diameter of the electrode assembly 10 as the diameter may be defined as the open ratio of the current collector 40. The open ratio may be calculated by the following equation.

> Open ratio (%)=1−(contact area between the current collector and the upper surface of the electrode assembly)/(area of a circle having the outer diameter of the electrode assembly as the diameter)=(non-contact area between the current collector and the upper surface of the electrode assembly)/(area of a circle having the outer diameter of the electrode assembly as the diameter)

Figure 12:
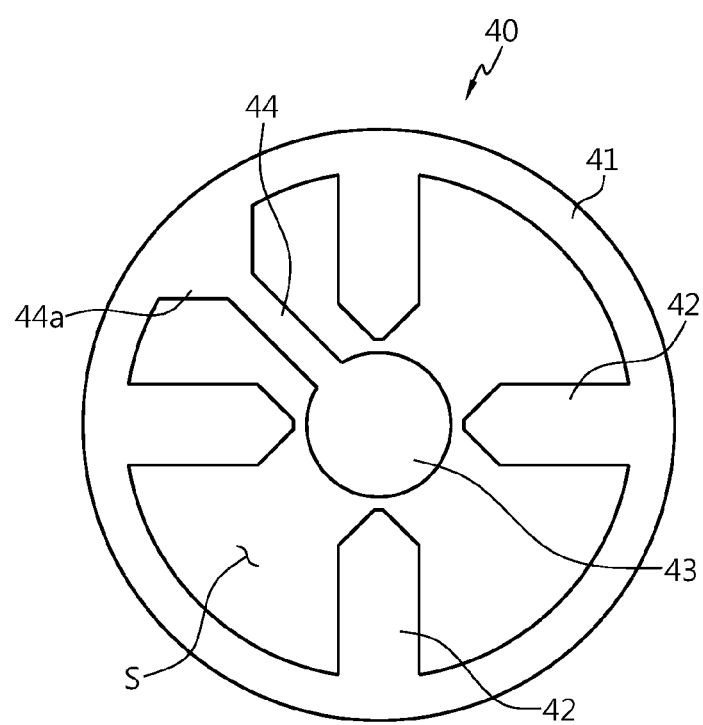
FIGS. 12 to 15 are diagrams exemplarily showing various shapes of a current collector (a first current collector) according to an embodiment of the present disclosure.
Figure 13:
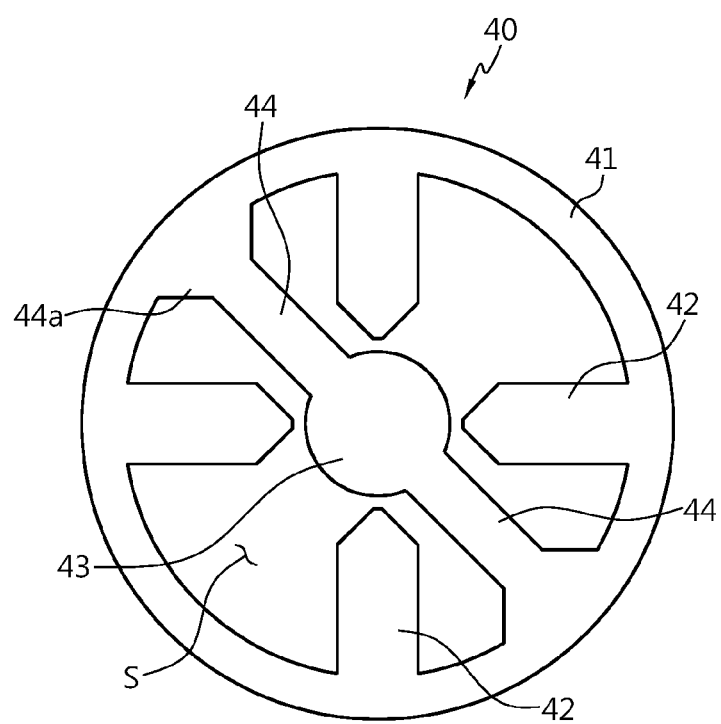
Figure 14:
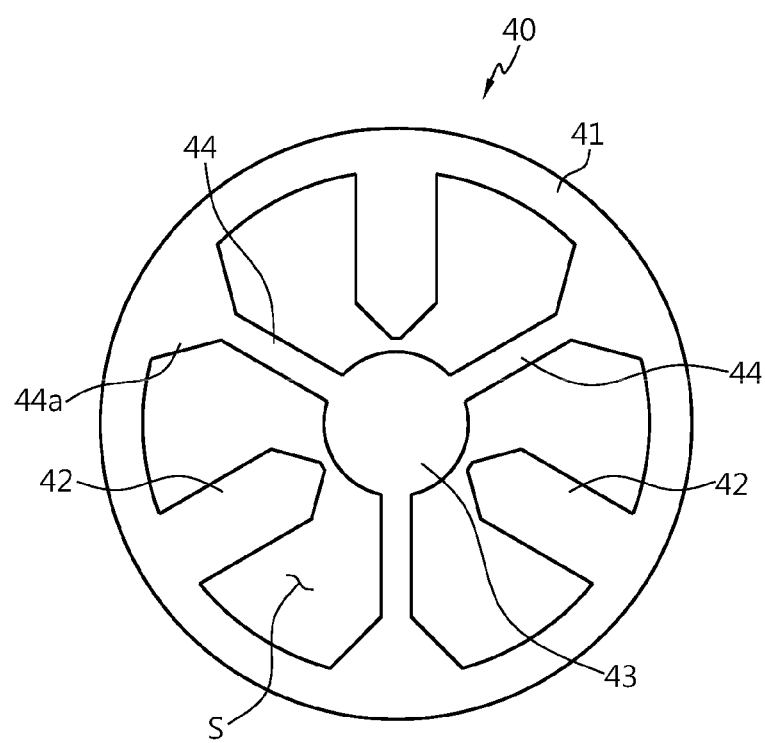
Figure 15:
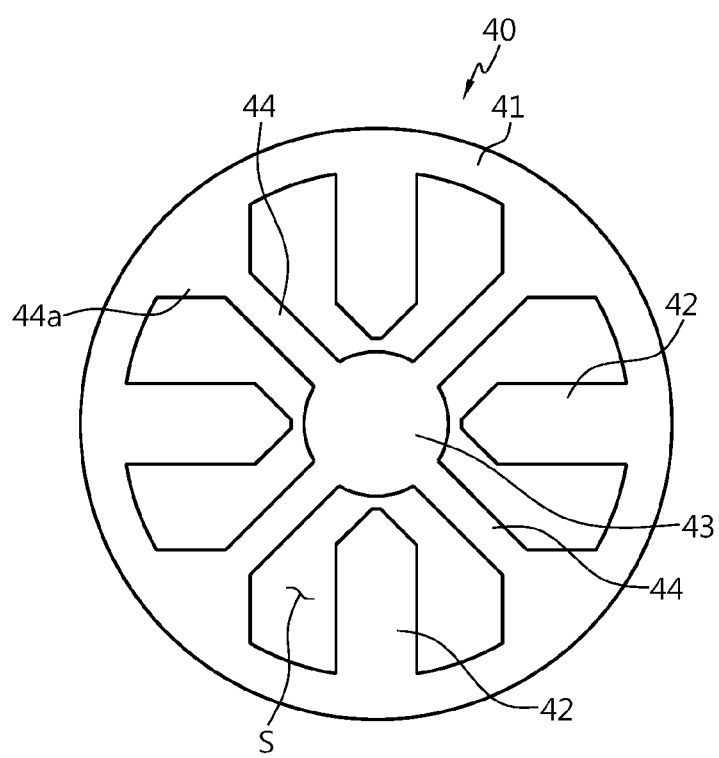

The open ratio of the current collector 40 may be, for example, approximately 20% or more and less than 100%, and more particularly approximately 30% or more and less than 100%. Describing that the current collector 40 shown in FIG. 12 is placed on and coupled to the electrode assembly 10 for illustrative purposes, the contact area between the current collector 40 and the electrode assembly 10 may be the edge portion 41, the uncoated region coupling portion 42, and the connecting portion 44. That is, the ratio of the contact area between the current collector 40 and the electrode assembly 10 to the area of a circle having the diameter of the same length as the outer diameter of the electrode assembly 10 may be approximately 80% or less, and more particularly approximately 70% or less. When the open ratio of the current collector 40 is in the above-described range, the wetting of the electrolyte solution may be smoothly carried out. That is, there is a gap near the terminal coupling portion 43 disposed at the center of the current collector 40, and the electrolyte solution radially spreads through the gap, moves to the open space, and then permeates through the electrode assembly 10.

Figure 22:
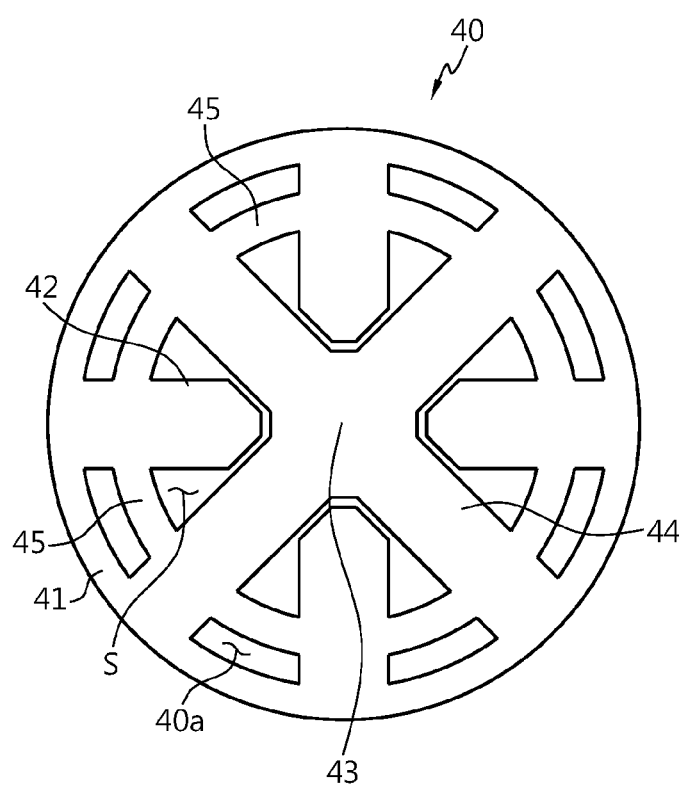
FIG. 22 is a diagram showing a current collector (a first current collector) having a different structure from the current collectors (first current collectors) shown in FIGS. 12 to 15 (a structure in which a bridge portion is additionally applied).

Referring to FIG. 22, in addition to the embodiments shown in FIGS. 5 to 10, the current collector (the first current collector) 40 further includes a bridge portion 45 connecting at least one of the following: between the adjacent first uncoated region coupling portions 42, between the first uncoated region coupling portion 42 and the connecting portion 44 adjacent to each other, and between the adjacent connecting portions 44. The bridge portion 45 is disposed at the inner position than the edge portion 41. The current collector 40 may have an impregnation hole 40a between the edge portion 41 and the bridge portion 45. The impregnation hole 40a may have, for example, an approximately slit shape extending along the extension direction of the edge portion 41. The impregnation hole 40a may increase the ratio of the empty space S formed inside the edge portion 41 to facilitate the circulation of the electrolyte solution injected into the housing 20, thereby improving the wettability.

Referring to FIGS. 5 to 7, the terminal 50 is made of a metal material having conductive properties. The material of the terminal 50 may include, for example, aluminum (Al). When the material of the terminal 50 is aluminum, it is easy to rivet as described below, and 10 series aluminum having a relatively low electrical resistance may be applied. The terminal 50 penetrates the upper surface of the housing 20 or the surface (parallel to the XY plane) disposed on the opposite side to the opening of the housing 20. The terminal 50 is electrically connected, for example, to the first uncoated region 11 of the electrode assembly 10. In this case, the terminal 50 has the first polarity. Accordingly, the terminal 50 may serve as a first electrode terminal in the cylindrical battery 1 of the present disclosure. When the terminal 50 has the first polarity, the terminal 50 is electrically insulated from the housing 20 having the second polarity. The electrical insulation between the terminal 50 and the housing 20 may be realized in various ways. For example, the insulation may be realized by interposing the insulation gasket G2 between the terminal 50 and the housing 20. Alternatively, the insulation may be realized by forming an insulating coating layer on a portion of the terminal 50. Alternatively, any method of fixing the terminal 50 structurally firmly to prevent the terminal 50 from coming into contact with the housing 20 may be applied. Alternatively, two or more of the above-described methods may be applied together.

The terminal 50 includes a terminal exposure portion 51 and a terminal insert portion 52. The terminal insert portion 52 may include an electrical connection portion 51a and a flange portion 52b. The terminal exposure portion 51 is exposed to the outside of the housing 20. The terminal exposure portion 51 may be disposed at the approximately center of the closed portion of the housing 20. The maximum width of the terminal exposure portion 51 may be larger than the maximum width of the hole formed in the housing 20 for the insertion of the terminal 50. The terminal insert portion 52 may pass through approximately the center of the closed portion of the housing 20, and the electrical connection portion 52a of the terminal insert portion 52 may be electrically connected to the first uncoated region 11. When the cylindrical battery 1 of the present disclosure includes the insulator 60, the terminal insert portion 52 may be surrounded by the insulator 60 to prevent the side from being exposed. The flange portion 52b of the terminal insert portion 52 is formed around the electrical connection portion 52a, and may be coupled onto the inner surface of the closed portion of the housing 20 by riveting. That is, the flange portion 52b of the terminal insert portion 52 may have a curved shape that curves toward the inner surface of the closed portion of the housing 20. Therefore, the maximum width of the terminal insert portion 52 after the riveting process for fixing the terminal 50 may be larger than the maximum width of the hole formed in the housing 20 to allow the terminal insert portion 52 to pass through.

Figure 10:
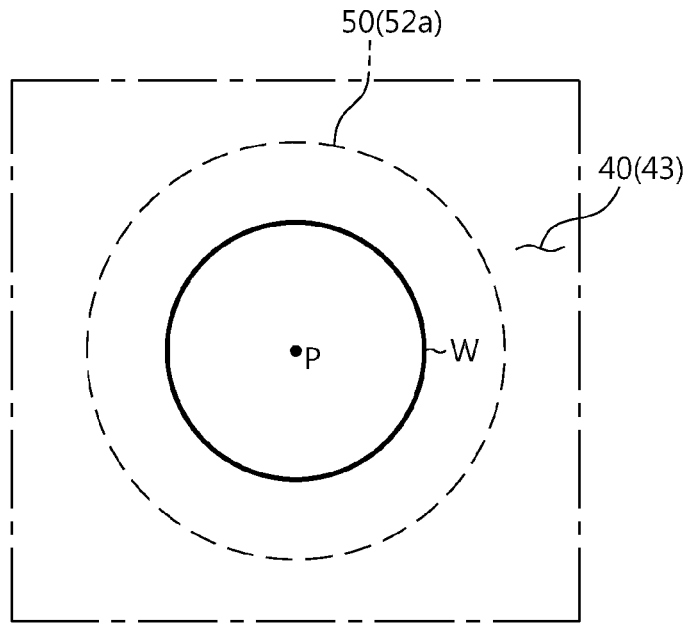
FIGS. 10 and 11 are top views showing a coupled portion of a first current collector and a terminal, when viewed along the arrow direction of FIG. 7.
Figure 11:
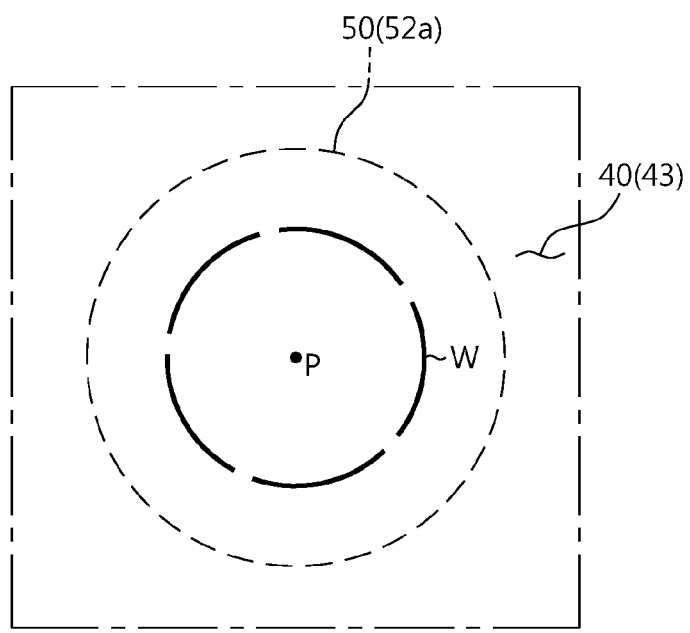

Referring to FIGS. 10 to 12 together with FIGS. 5 to 7, the electrical connection portion 52a of the terminal insert portion 52 may be coupled with the terminal coupling portion 43 of the current collector (the first current collector) 40. The electrical connection portion 52a of the terminal insert portion 52 may have, for example, an approximately cylindrical shape. The shape of the electrical connection portion 52a of the terminal insert portion 52 is not limited thereto. The electrical connection portion 52a of the terminal insert portion 52 may have various shapes, for example, a cylindrical shape having an elliptical cross section, a square prism shape, a hexagonal prism shape and an octagonal prism shape. The bottom surface of the electrical connection portion 52a of the terminal insert portion 52 may be approximately flat at least in part.

Referring to FIGS. 9 and 10 together with FIG. 7, the coupling between the bottom surface of the central region of the terminal insert portion 42 and the current collector (the first current collector) 40 may be made by, for example, laser welding, spot welding or ultrasonic welding.

The welding may be performed by laser irradiation through the hole formed at the winding center C of the electrode assembly 10 or inserting a tool for ultrasonic welding or spot welding to form a welding bead W on one surface (a surface facing the hole formed at the winding center C of the electrode assembly 10) of the current collector 40. A guide pipe for welding may be inserted into the hole formed at the winding center C. When welding is carried out in a state where the guide pipe is inserted, it is possible to reduce the damage risk of the separator which forms the inner wall of the hole formed at the winding center C.

The welding pattern formed by the welding bead W formed on one surface of the terminal coupling portion 43 of the current collector 40 may run around the center P of the bottom surface of the electrical connection portion 52a of the terminal insert portion 52. The welding pattern may be, for example, approximately circular, and alternatively, the welding pattern may have an approximately elliptical shape, or a polygonal shape such as approximately square, hexagonal and octagonal shapes. The welding pattern formed by the welding bead W may be formed continuously (see FIG. 10) or discontinuously (see FIG. 11). The exemplary circular, elliptical and polygonal shapes of the welding pattern formed by the welding bead W do not refer to geometrically perfect circular, elliptical and polygonal shapes.

Meanwhile, the diameter of the flat portion formed on the bottom surface of the electrical connection portion 52a of the terminal insert portion 52 may be determined, considering the weld strength with the current collector 40. The tensile strength of the welded portion between the flat portion and the current collector (the first current collector) 40 may be at least about 2 kgf or more, or 3 kgf or more, or 4 kgf or more, or 5 kgf or more, or 6 kgf or more, or 7 kgf or more, or 8 kgf or more, or 9 kgf or more, or 10 kgf or more. It is preferable to increase the tensile strength of the welded portion as much as possible within an allowable range by optimally selecting a welding method.

The diameter (or the maximum width) of the welding pattern formed on the flat portion to satisfy the tensile strength requirement of the welded portion may be at least about 2 mm. The diameter of the welding pattern may be defined as the diameter $(2*(S/\pi)^{0.5})$ of the circle when the area S of the welding bead W found on the surface of the welded portion is converted to the area $(\pi r^2)$ of the circle.

The flat portion formed on the bottom surface of the electrical connection portion 52a of the terminal insert portion 52 corresponds to a weldable region. The diameter of the weldable region may be approximately 3 mm to 14 mm. When the diameter of the weldable region is less than about 3 mm, it is difficult to form the welding pattern having the (converted) diameter of 2 mm or more. In particular, in the case of the welding pattern using laser welding, it is difficult to form the welding pattern having the diameter of 2 mm or more due to laser beam interference. When the diameter of the weldable region is larger than approximately 14 mm, the diameter of the terminal exposure portion 51 of the terminal 50 becomes larger, and thus it is difficult to have a sufficient area of the outer surface 20a of the housing 20 that will be used as an electrode terminal having the opposite polarity to the terminal 50.

When considering the diameter requirement of the welding pattern and the diameter requirement of the weldable region, the ratio of the area of the welding pattern to the area of the weldable region necessary for the tensile strength of the welded portion of at least about 5 kgf is approximately 2.04% $(\pi 1^2/\pi 7^2)$ to 44.4% $(\pi 1^2/\pi 1.5^2)$.

In an example, when the flat portion formed on the bottom surface of the electrical connection portion 52a of the terminal insert portion 52 and the current collector 40 are welded by a laser while forming the welding bead W along a continuous or discontinuous line in an approximately arc pattern, the diameter of the arc welding pattern is about 2 mm or more, and more particularly about 4 mm or more. When the diameter of the arc welding pattern meets the corresponding requirement, it is possible to ensure a sufficient weld strength by increasing the tensile strength of the welded portion to about 5 kgf or more.

In another example, when the flat portion formed on the bottom surface of the electrical connection portion 52a of the terminal insert portion 52 and the current collector 40 are welded by ultrasonic waves in a circular pattern, the diameter of the circular welding pattern is more particularly about 2 mm or more. When the diameter of the circular welding pattern meets the corresponding requirement, it is possible to ensure a sufficient weld strength by increasing the tensile strength of the welded portion to about 2 kgf or more.

The diameter of the flat portion formed on the bottom surface of the terminal 50 corresponding to the weldable region may be adjusted in the range of approximately 3 mm to 14 mm. When the radius of the flat portion is less than about 3 mm, it is difficult to form the welding pattern having the diameter of about 2 mm or more using the laser welding tool and the ultrasonic welding tool.

Meanwhile, the cylindrical battery 1 according to an embodiment of the present disclosure has a structure in which the bottom surface of the electrical connection portion 52a of the terminal insert portion 52 is coupled onto the current collector 40 by welding as described above, thereby maximizing the coupling area between the current collector 40 and the terminal 50. That is, the bottom surface of the electrical connection portion 52a is flat at least in part, thereby maximizing the coupling area between the terminal 50 and the current collector 40. Therefore, the cylindrical battery 1 according to an embodiment of the present disclosure may guarantee a smooth flow of current at the coupled portion of the current collector 40 and the terminal 50 when a large amount of current flows during rapid charging, thereby reducing the charging time and lessening the amount of heat generated.

The insulation gasket G2 includes a gasket exposure portion GA and a gasket insert portion GB. The gasket exposure portion GA is interposed between the terminal exposure portion 51 of the terminal 50 and the housing 20. The gasket exposure portion GA may extend longer than the terminal exposure portion 51, and thus may be exposed to the outside of the terminal exposure portion 51 when the cylindrical battery 1 is viewed from the top. The gasket insert portion GB is interposed between the terminal insert portion 52 of the terminal 50 and the housing 20. When riveting the flange portion 52b of the terminal insert portion 52, the gasket insert portion GB may deform together and come into close contact with the inner surface of the closed portion of the housing 20. The insulation gasket G2 may be made of, for example, a resin material having insulation and elastic properties.

Referring to FIGS. 6, 7 and 12 together, the insulator 60 may be provided between the current collector (the first current collector) 40 and the inner surface of the housing 20. The insulator 60 prevents the contact between the current collector 40 and the housing 20. The insulator 60 may be also interposed between the top of the outer circumferential surface of the electrode assembly 10 and the inner surface of the housing 20. That is, the insulator 60 may be also interposed between the first uncoated region 11 and the inner surface of the sidewall portion of the housing 20. It is to prevent the contact between the first uncoated region 11 extending toward the closed portion of the housing 20 and the inner circumferential surface of the housing 20.

When the cylindrical battery 1 of the present disclosure includes the insulator 60, the terminal 50 is coupled to the current collector 40 through the insulator 60. To allow the terminal 50 to pass through, the insulator 60 may have a hole formed at the approximately center thereof. The hole formed in the insulator 60 may be formed at a location corresponding to the terminal coupling portion 43 of the current collector 40. The hole formed in the insulator 60 may be formed at a location corresponding to the hole formed at the winding center C of the electrode assembly 10. The hole formed in the insulator 60 may be formed at a location corresponding to the electrical connection portion 52a of the terminal insert portion 52 provided in the terminal 50. Accordingly, the electrical connection portion 52a of the terminal insert portion 52 may be coupled with the terminal coupling portion 43 of the current collector 40 through the hole formed in the insulator 60.

Meanwhile, in case that the welded portion between the terminal 50 and the first current collector 40 is disposed in the hole formed at the winding center C of the electrode assembly 10, the electrode assembly 10 may be damaged. To prevent this, the lower end of the terminal 50 coupled to the terminal coupling portion 43 may be disposed at a height that is substantially equal to or higher than the lower surface of the insulator 60. In this case, the welded portion between the terminal 50 and the first current collector 40 is disposed outside the hole formed at the winding center C of the electrode assembly 10.

In view of this, the thickness of the insulator 60 may be substantially equal to or greater than the distance from the inner surface of the closed portion of the housing 20 to the flat portion provided at the lower end of the terminal 50. Meanwhile, the insulator 60 may have a thickness corresponding to the distance between the inner surface of the closed portion of the housing 20 and the current collector 40 to fill up the space between the inner surface of the closed portion of the housing 20 and the current collector 40 along the heightwise direction (parallel to the Z axis) so that there is no room for movement of the electrode assembly 10 can move. In another aspect, the upper surface of the insulator 60 may contact the inner surface of the closed portion of the housing 20, and the lower surface of the insulator 60 may contact the upper surface of the current collector 40.

Figure 25:
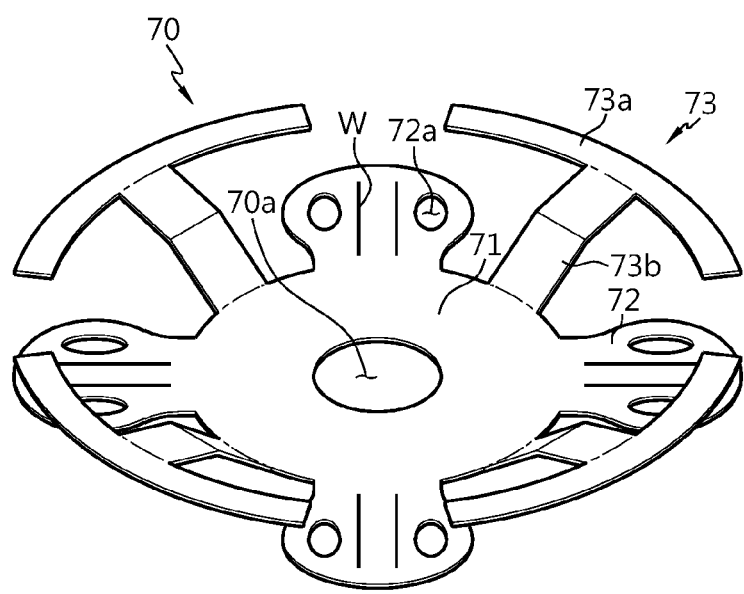
FIG. 25 is a diagram showing an exemplary shape of a second current collector which is applied to the present disclosure.

Referring to FIGS. 23 and 25, the current collector (the second current collector) 70 is coupled to the lower part of the electrode assembly 10. The current collector 70 is made of a metal having conductive properties, and is coupled with the second uncoated region 12. In addition, the current collector 70 is electrically connected to the housing 20. The current collector 70 electrically connects the second uncoated region 12 to the housing 20. At least part of the circumferential edge area of the current collector 70 may be interposed and fixed between the lower surface (the seating surface) of the beading portion 21 of the housing 20 and the sealing gasket G1. In this case, the current collector 70 may be welded onto the seating surface formed by the beading portion 21 of the housing 20. The sealing gasket G1 is positioned in the crimping portion 22 and interposed between the housing 20 and the cap 30.

The current collector 70 may include a second current collector hole 70a in an area corresponding to the hole formed at the winding center C of the electrode assembly 10. The winding center hole of the electrode assembly 10 and the second current collector hole 70a in communication with each other may serve as a passage for inserting a welding rod for welding between the terminal 50 and the terminal coupling portion 43 of the first current collector 40 or laser beam irradiation. The second current collector hole 70a may have a diameter that is equal to or larger than the hole formed at the winding center C of the electrode assembly 10 not to cover the hole formed at the winding center C of the electrode assembly 10. In case that the diameter of the second current collector hole 70a is too smaller than the diameter of the hole formed at the winding center C, the hole formed at the winding center C is covered, thus the efficiency of the electrolyte injection process may be reduced, and it may be difficult to have a sufficient space for inserting a device or tool for welding or laser irradiation.

As opposed to the above-described embodiment, according to another embodiment of the present disclosure, the diameter of the second current collector hole 70a may be smaller than the diameter of the hole formed at the winding center C provided in the core of the electrode assembly 10. For example, when the diameter of the hole formed at the winding center C is R3, the diameter of the second current collector hole 70a may be 0.5*R3 or more and less than R3, and more particularly 0.7*R3 or more and less than R3.

In general, when vented, the separator or the uncoated region at the winding center may slip from the lower surface of the electrode assembly 10 by strong pressure of gas coming out at the winding center. In this instance, when the diameter of the second current collector hole 70a is smaller than the diameter of the hole provided in the core of the electrode assembly 10, it is possible to prevent the separator or the uncoated region at the winding center from slipping from the lower surface of the electrode assembly 10. However, in which the diameter of the second current collector hole 70a is too small, it may be difficult to inject the electrolyte solution, and since it is necessary to have a space for welding between the second current collector 70 and the terminal 50, the diameter of the second current collector hole 70a is 0.5*R3 or more, and more particularly 0.7*R3 or more.

The second current collector 70 may include a second uncoated region coupling portion 72 coupled with the second uncoated region 12 and a housing coupling portion 73 coupled with the housing 20. The second current collector 70 may further include a support portion 71. The second uncoated region 12 and the second uncoated region coupling portion 72 may be coupled to each other by welding. The housing 20 and the housing coupling portion 73 may be coupled to each other by welding. The housing coupling portion 73 may be electrically coupled to the lower surface of the beading portion 21.

The support portion 71 is positioned below the electrode assembly 10. When the support portion 71 is provided, the second uncoated region coupling portion 72 may extend along the approximately radial direction of the electrode assembly 10 from the support portion 71 and may be coupled with the second uncoated region 12. In addition, the housing coupling portion 73 may extend along the approximately radial direction of the electrode assembly 10 from the support portion 71 and may be coupled onto the inner surface of the housing 20. The second uncoated region coupling portion 72 and the housing coupling portion 73 is not directly connected to each other, and may be indirectly connected through the support portion 71. In this case, when external impacts are applied to the cylindrical battery 1, it is possible to minimize the likelihood that damage occurs in the coupled portion of the second current collector 70 and the electrode assembly 10 and the coupled portion of the second current collector 70 and the housing 20. However, the second current collector 70 of the present disclosure is not limited to the indirectly connected structure of the second uncoated region coupling portion 72 and the housing coupling portion 73. For example, the second current collector 70 may have a structure in which there is no support portion 71 indirectly connecting the second uncoated region coupling portion 72 to the housing coupling portion 73 and/or a structure in which the second uncoated region coupling portion 72 and the housing coupling portion 73 are directly connected to each other.

Meanwhile, not only the second uncoated region coupling portion 72 but also the support portion 71 may be coupled with the second uncoated region 12. When the housing 20 has the beading portion 21, the support portion 71 and the second uncoated region coupling portion 72 are disposed higher than the beading portion 21.

A plurality of second uncoated region coupling portions 72 may be provided. When the plurality of second uncoated region coupling portions 72 is provided, the plurality of second uncoated region coupling portions 72 may extend toward the sidewall of the housing 20 approximately radially from the support portion 71 of the second current collector 70. Each of the plurality of second uncoated region coupling portions 72 may be spaced apart from each other along the circumference of the support portion 71.

A plurality of housing coupling portions 73 may be provided. In this case, the plurality of housing coupling portions 73 may extend toward the sidewall of the housing 20 approximately radially from the center of the second current collector 70. Accordingly, the electrical connection between the second current collector 70 and the housing 20 may be made at a plurality of points. When the coupling for electrical connection is made at the plurality of points, it is possible to maximize the coupling area and minimize the electrical resistance. Each of the plurality of housing coupling portions 73 may be spaced apart from each other along the circumference of the support portion 71. At least one housing coupling portion 73 may be disposed between the adjacent second uncoated region coupling portions 72. The plurality of housing coupling portions 73 may be coupled to, for example, the beading portion 21 in the inner surface of the housing 20. The housing coupling portions 73 may be coupled especially to the lower surface of the beading portion 21.

The housing coupling portion 73 may include a contact portion 73a coupled onto the inner surface of the housing 20 and an extension portion 73b connecting the support portion 71 to the contact portion 73a.

The contact portion 73a is coupled onto the inner surface of the housing 20. When the housing 20 includes the beading portion 21, the contact portion 73a may be coupled onto the beading portion 21 as described above. More specifically, the contact portion 73a may be electrically coupled to the flat portion formed on the lower surface of the beading portion 21 formed in the housing 20, and may be interposed between the lower surface of the beading portion 21 and the sealing gasket G1. In this case, for stable contact and coupling, the contact portion 73a may extend from the beading portion 21 by a predetermined length along the circumferential direction of the housing 20.

Referring to FIGS. 8 and 9 together with FIGS. 23 and 25, the current collector 70 may be coupled onto the coupling surface formed by bending the end of the second uncoated region 12 in parallel to the current collector 70. The bending direction of the second uncoated region 12 may be the radial direction of the electrode assembly 10, and for example, a direction toward the winding center C of the electrode assembly 10. When the second uncoated region 12 has the bent shape as described above, the space occupied by the second uncoated region 12 reduces, thereby improving the energy density. In addition, it is possible to improve the coupling strength between the second uncoated region 12 and the current collector 70 and reduce the contact resistance. In the same way as the first uncoated region coupling portion 42 of the first current collector 40 described above, also in the case of the second uncoated region coupling portion 72 of the second current collector 70, the welding target area or a zone in which the number of overlapping layers formed by the bends of the segments of the second uncoated region 12 is approximately uniformly maintained may be coupled with the second uncoated region 12 by at least approximately 50% of overlap.

Meanwhile, referring to FIGS. 7, 23 and 25 together, the distance (the outer diameter of the first current collector 40) from the center of the first current collector 40 to the outermost side of the edge portion 41 may be longer than the distance (the outer diameter of the second current collector 70) from the center of the second current collector 70 to the outermost side of the second uncoated region coupling portion 72. The first current collector 40 may have the diameter close to the inner diameter of the housing 20. The first current collector 40 may have the outer diameter ranging from about 33% to 98.5% compared to the inner diameter of the housing 20. The minimum value of the outer diameter of the first current collector 40 is a numerical value for preventing the resistance from increasing too much. The maximum value of the outer diameter of the first current collector 40 takes into account, for example, the tolerance of the outer diameter of the first current collector 40 that may occur in the manufacture of the current collector 40, the assembly tolerance that occurs when coupling the electrode assembly 10 and the first current collector 40, the tolerance of the inner diameter of the housing 20 that may occur in the manufacture of the housing 20 and the positional tolerance that may occur when inserting the assembly of the electrode assembly 10 and the first current collector 40 into the housing 20. In the present disclosure, when the insulator 60 is applied and the insulator 60 covers to the top of the outer circumferential surface of the electrode assembly 10, it is necessary to further consider a space for insertion of the insulator 60, and thus a ratio of the outer diameter of the first current collector 40 to the inner diameter of the housing 20 is smaller than the maximum value. However, in view of the tolerance, the outer diameter of the first current collector 40 is limited at a slightly smaller level than the inner diameter of the housing 20, while in the case of the second current collector 70, the diameter may be further limited to avoid interference that may occur in the sizing process. To avoid interference, the distance from the center of the second current collector 70 to the outermost side of the second uncoated region coupling portion 72 may be equal to or shorter than the half of the inner diameter in the area in which the beading portion 21 of the housing 20 is formed.

Meanwhile, the length of the welded portion extended along the radial direction of the electrode assembly 10 in the coupling between the first uncoated region coupling portion 42 of the first current collector 40 and the first uncoated region 11 coupled to each other may be longer than the length of the welded portion extended along the radial direction of the electrode assembly 10 in the coupling between the second uncoated region coupling portion 72 of the second current collector 70 and the second uncoated region 12 coupled to each other. For example, in case that the first current collector 40 is an aluminum positive electrode current collector and the second current collector 70 is a copper negative electrode current collector, when the length is longer than the length, the welded portion of the positive electrode current collector having lower electrical conductivity is larger in size, leading to the balanced flow of current in each of the positive electrode current collector and the negative electrode current collector. Here, the extended length of the welded portion coupling the current collectors 40, 70 and the uncoated regions 11, 12 refers to the extended length of the welding bead formed by welding.

On the basis of the core of the electrode assembly 10, the distance to the start point of the welded portion coupling the first uncoated region coupling portion 42 of the first current collector 40 and the first uncoated region 11 may be substantially equal to the distance to the start point of the welded portion coupling the second uncoated region coupling portion 72 and the second uncoated region 12. Here, substantially equal may refer to two equal distances or two distances, for example, having the deviation of approximately 5% or less.

In another aspect of the present disclosure, the ratio of the non-contact area between the current collector (the second current collector) 70 and the lower surface of the electrode assembly 10 to the area of a circle having the outer diameter of the electrode assembly 10 as the diameter may be defined as the open ratio of the current collector 70. The open ratio may be calculated by the following equation.

Open ratio (%)=1−(contact area between the current collector and the lower surface of the electrode assembly)/(area of a circle having the outer diameter of the electrode assembly as the diameter)=(non-contact area between the current collector and the lower surface of the electrode assembly)/(area of a circle having the outer diameter of the electrode assembly as the diameter)

The open ratio of the current collector 70 may be, for example, approximately 30% or more and less than 100%, and more particularly approximately 60% or more and less than 100%. Describing that the current collector 40 shown in FIG. 25 is placed on and coupled to the electrode assembly 10 for illustrative purposes, the contact area between the current collector 40 and the electrode assembly 10 may be the support portion 71 and the uncoated region coupling portion (the second uncoated region coupling portion) 72. That is, the ratio of the contact area between the current collector 70 and the electrode assembly 10 to the area of a circle having the diameter of the same length as the outer diameter of the electrode assembly 10 may be approximately 70% or less, and more particularly approximately 40% or less. When the open ratio of the current collector 70 is in the above-described range, the electrolyte solution may smoothly permeate the electrode assembly 10 through the area not covered with the current collector 70 when injecting the electrolyte solution. That is, when the open ratio of the current collector 70 is in the above-described range, the electrolyte solution permeates the electrode assembly 10 through the hole formed at the winding center C provided in the electrode assembly 10, and in particular, the electrolyte solution may smoothly permeate the electrode assembly 10 by capillarity through the small gap between the overlapping surfaces of the segments 11a and between the pitches.

The structure of the electrode assembly 10 will be described in more detail with reference to FIGS. 26 to 29. In the following description, the first electrode will be described as an example among the first and second electrodes described above, but the structure of the first electrode may be equally applied to the second electrode.

Referring to FIGS. 26 to 29, the first electrode 110 includes a first electrode current collector 111 of a sheet shape made from a conductive foil, a first active material layer 112 formed on at least one surface of the first electrode current collector 111, and a first uncoated region 11 not coated with an active material at the end of the long side of the first electrode current collector 111.

Preferably, the first uncoated region 11 may include a plurality of notched segments 11a. The plurality of segments 11a forms a plurality of groups, and the height (the length in the Z-axis direction) and/or the width (the length in the X-axis direction) and/or the pitch of the segments 11a in each group may be substantially equal to each other. The number of segments 11a in each group may be smaller or larger than those shown in the drawings. The segment 11a has a geometric shape of a combination of at least one straight line and/or at least one curve. Preferably, the segment 11a may have a trapezoidal shape, and modification may be made to the shape, for example, a rectangular, parallelogram, semicircular or a semi-elliptical shape.

Preferably, the height of the segment 11a may gradually increase along a direction parallel to the winding direction of the electrode assembly 10, for example, from the core toward the outer circumference. Also, a core-side uncoated region 11-1 adjacent to the core of the electrode assembly 10 may not include the segment 11a, and the height of the core-side uncoated region 11-1 may have be lower than the uncoated region of other region. In addition, an outer circumferential uncoated region 11-2 adjacent to the outer circumference of the electrode assembly 10 may not include the segment 11a, and the height of the outer circumferential uncoated region 11-2 may be lower than other uncoated region.

Optionally, the first electrode 110 may include an insulation coating layer E that covers the boundary between the active material layer 112 and the first uncoated region 11. The insulation coating layer E includes a polymer resin having insulation properties, and may optionally further include an inorganic filler. The insulation coating layer E may function to prevent the end of the active material layer 112 from contacting the active material layer of the opposite polarity on the opposite side of the separator, and structurally support the bending of the segment 11a. To this end, when the first electrode 110 is wound to form the electrode assembly 10, at least a part of the insulation coating layer E is preferably exposed from the separator to the outside.

Figure 2:
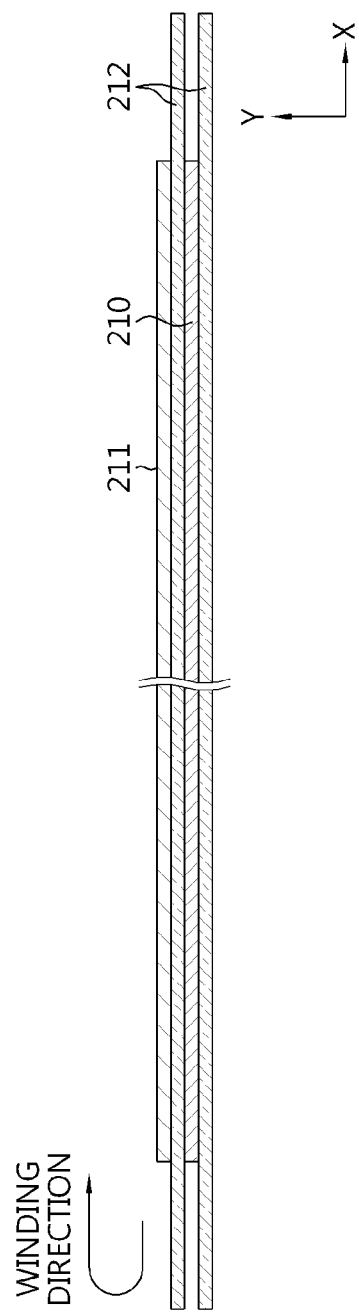
FIG. 2 is a diagram showing a process of winding an electrode assembly included in a conventional tab-less cylindrical battery.
Figure 3:
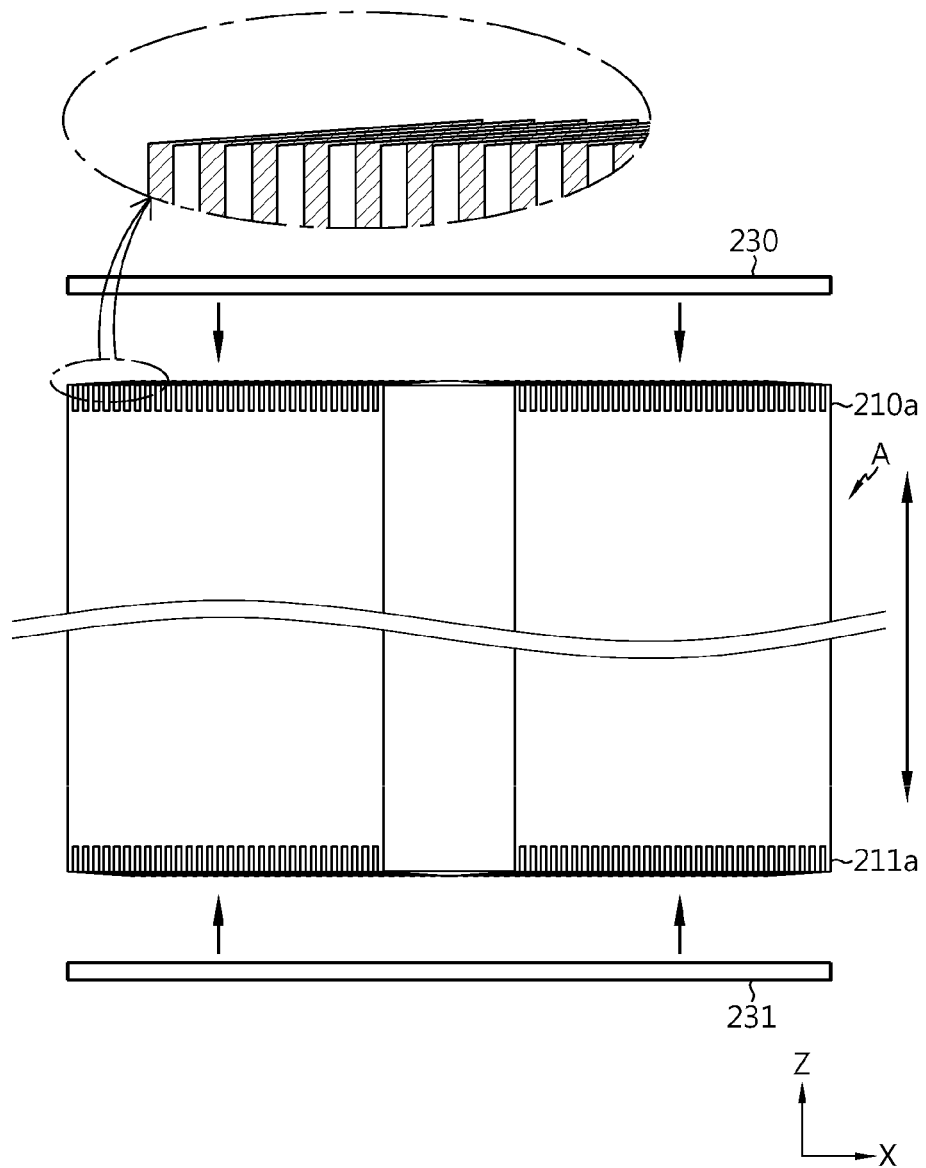
FIG. 3 is a diagram showing a process of welding a current collector to a bend surface of an uncoated region in the electrode assembly of FIG. 2.
Figure 4:
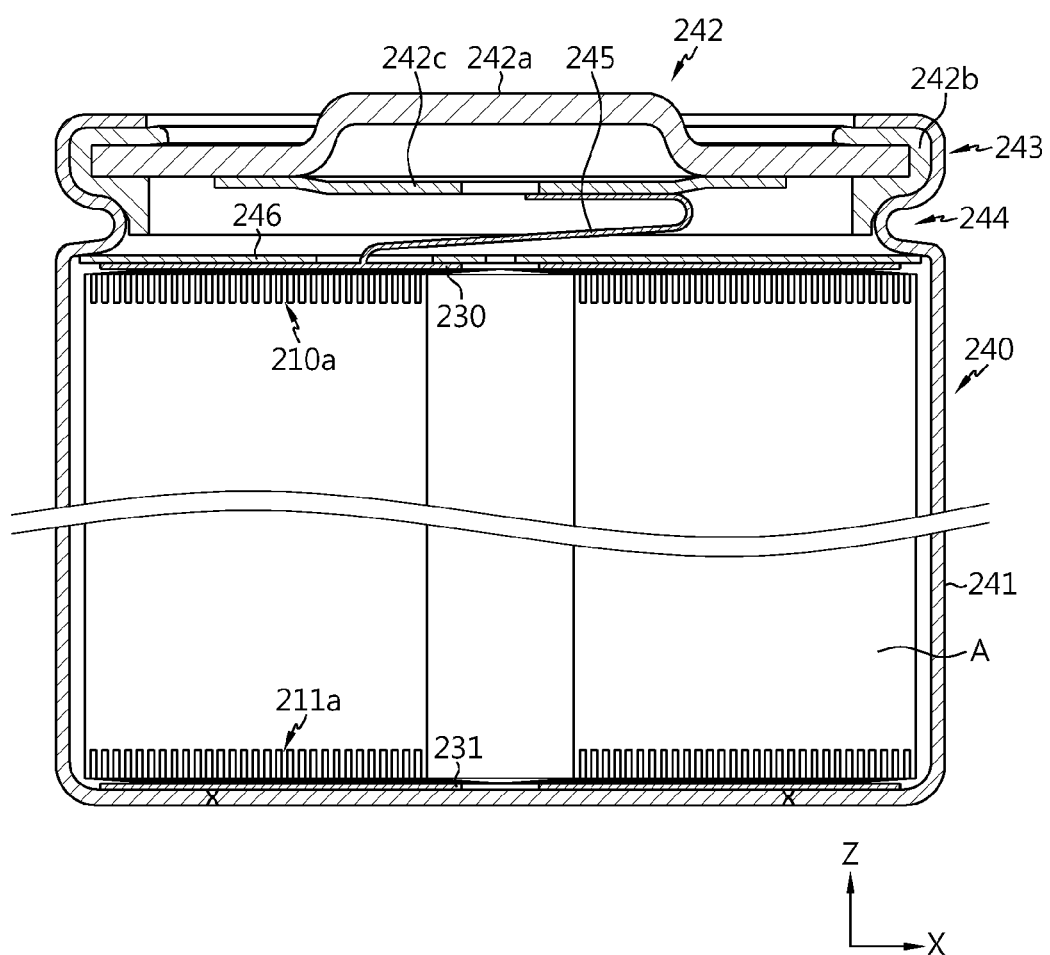
FIG. 4 is a cross-sectional view showing a conventional tab-less cylindrical battery, taken along a lengthwise direction Z.
Figure 26:
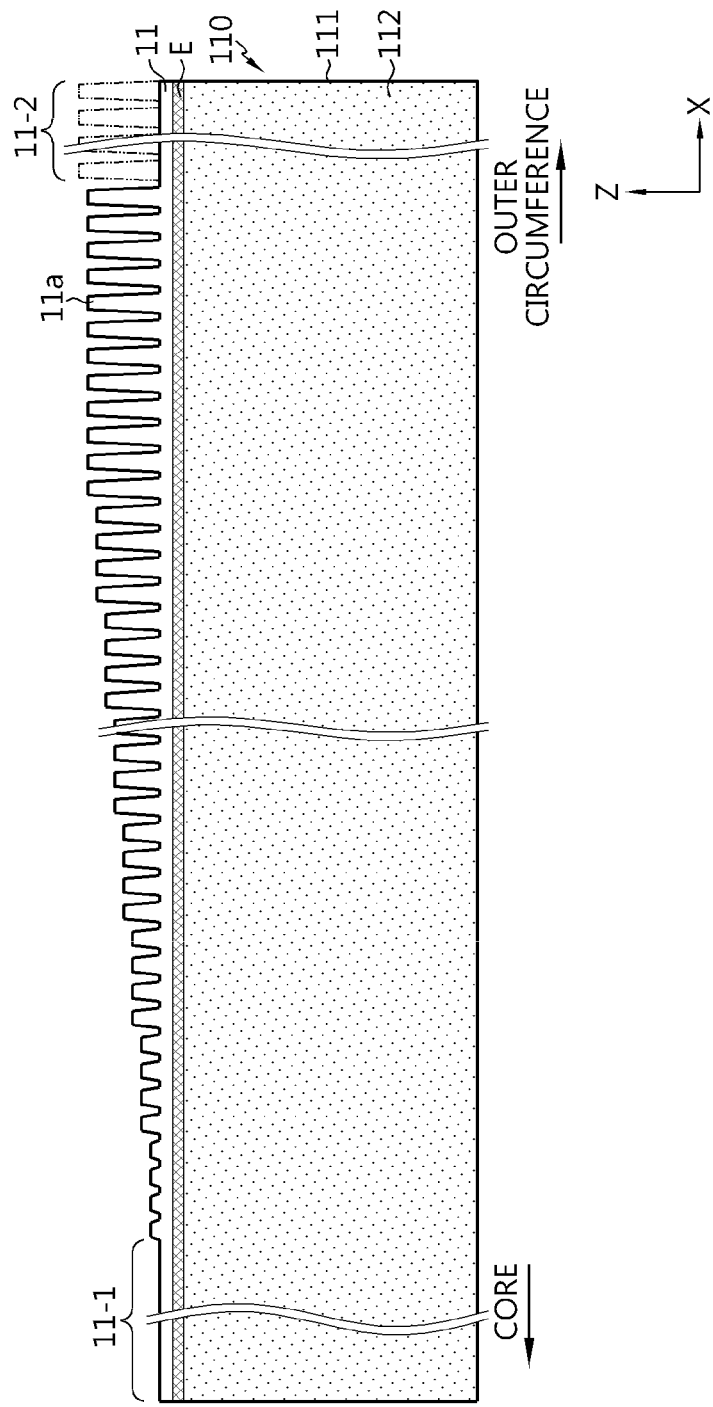
FIG. 26 is a plan view exemplarily showing an electrode structure according to an embodiment of the present disclosure.
Figure 27:
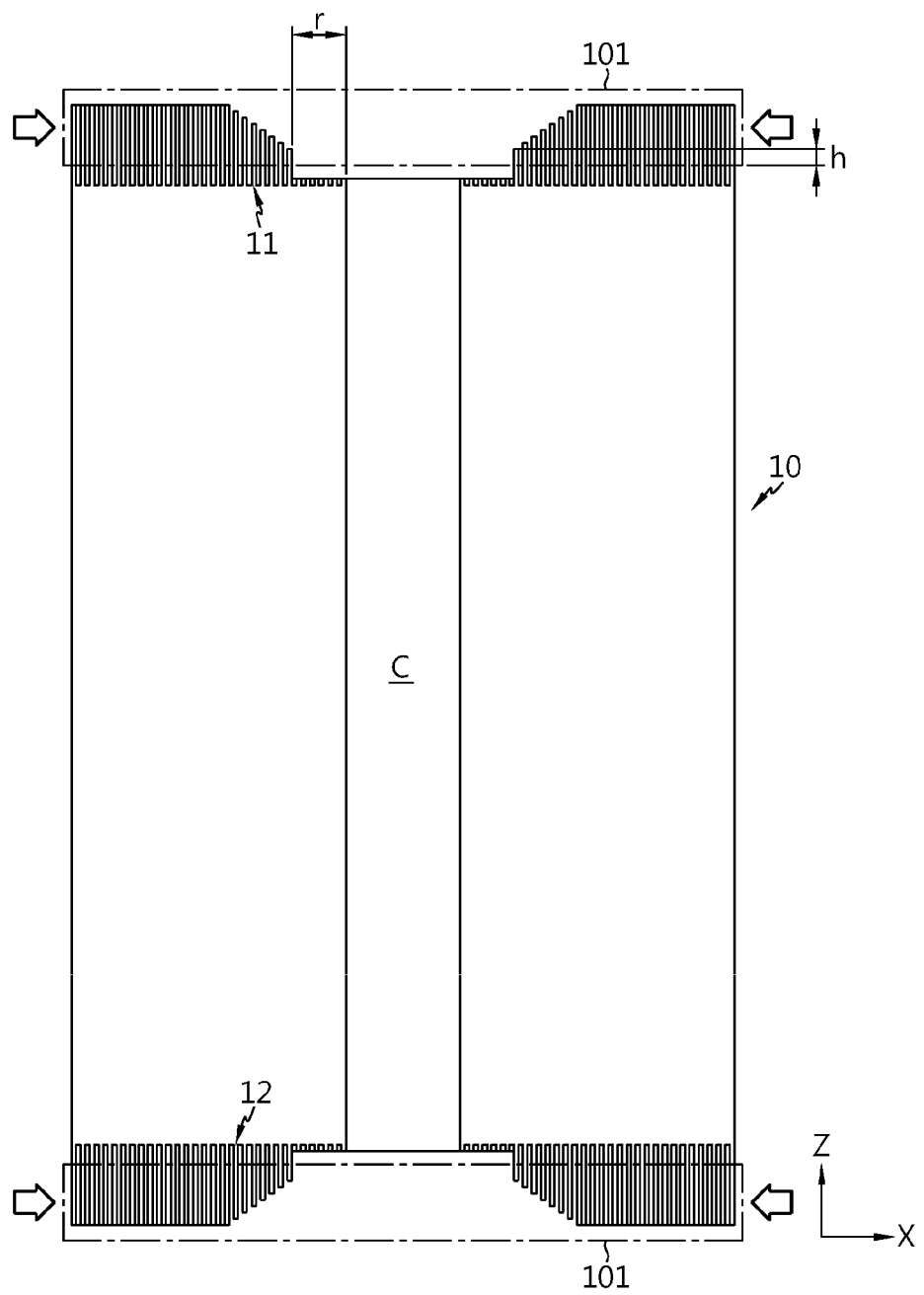
FIG. 27 is a cross-sectional view showing an electrode assembly in which an uncoated region segment structure of a first electrode is also applied to a second electrode according to an embodiment of the present disclosure, taken along a lengthwise direction Z.
Figure 28:
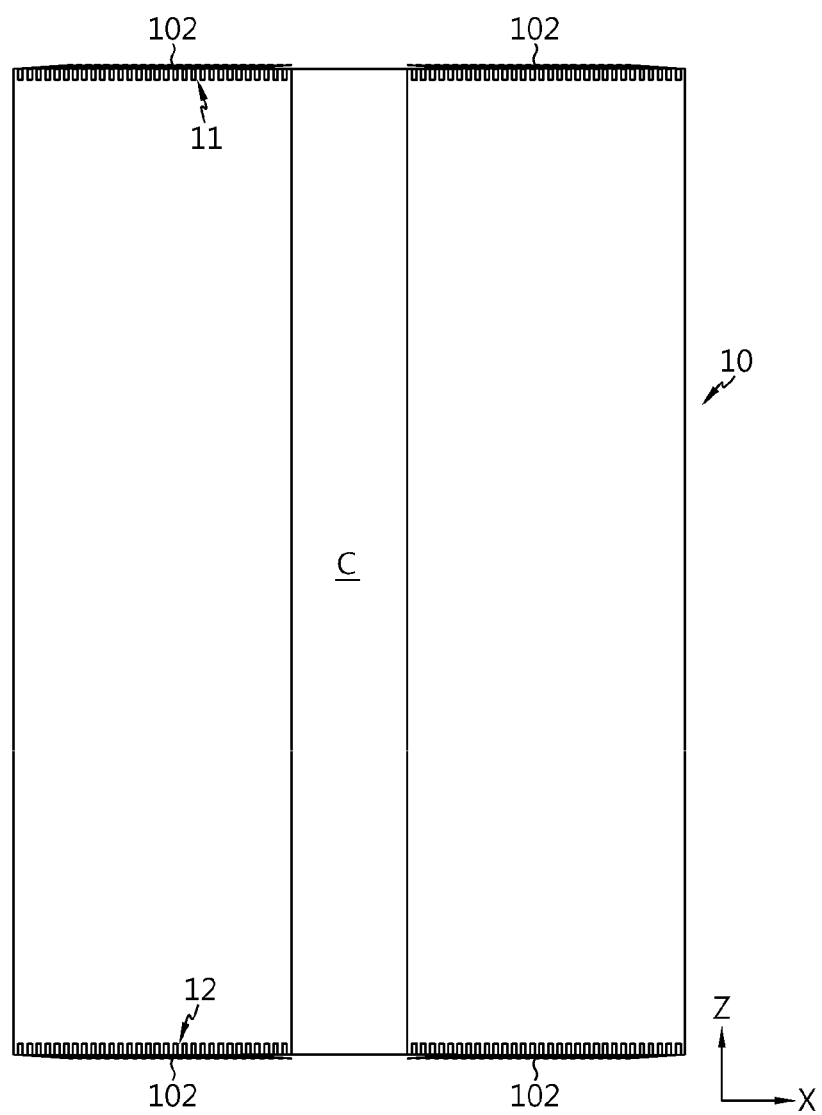
FIG. 28 is a cross-sectional view showing an electrode assembly with a bent uncoated region according to an embodiment of the present disclosure, taken along a lengthwise direction Z.

Referring to FIGS. 26 and 27, the electrode assembly 10 may be manufactured by the winding method described through FIG. 2. For convenience of description, the protrusion structure of the uncoated regions 11, 12 extending out of the separator are illustrated in detail, and the illustration of the winding structure of the first electrode, the second electrode and the separator is omitted. The first uncoated region 11 protruding upward extends from the first electrode, and the second uncoated region 12 protruding downward extends from the second electrode.

The pattern of change in the height of the uncoated regions 11, 12 is schematically shown. That is, the height of the uncoated regions 11, 12 may irregularly change depending on where the cross section is taken. For example, when the side of the trapezoidal segment 11a is cut, the height of the uncoated region in cross section is lower than the height of the segment 11a. Therefore, it should be understood that the height of the uncoated regions 11, 12 shown in the cross-sectional view of the electrode assembly 10 correspond to an average height of the uncoated regions included in each winding turn.

Referring to FIGS. 26 to 29, the uncoated regions 11, 12 may be bent along the radial direction of the electrode assembly 10, for example from the outer circumference toward the core. In the uncoated regions 11, 12, an area in which bending occurs is indicated by the dotted line box in FIG. 27. When the uncoated regions 11, 12 are bent, the bend surface 102 in which adjacent segments in the radial direction overlap in multiple layers is formed on top and bottom of the electrode assembly 10. In this instance, the core-side uncoated region 11-1 (FIG. 26) is not bent due to its small height, and the height h of the segment 11a bent at the innermost side is approximately equal to or smaller than the sum of the radial length R of the winding area formed by the core-side uncoated region 11-1 having no segment structure and 10% of the winding hole diameter. Therefore, the hole formed at the core C of the electrode assembly 10 is not closed. As the hole is not closed, there is no difficulty in the electrolyte injection process, thereby improving the electrolyte injection efficiency. In addition, it is possible to easily weld the terminal 50 and the first current collector 40 by inserting the welding tool through the hole (see FIG. 7).

Meanwhile, when the outer diameter of the first current collector 40 and/or the second current collector 70 is T, the outer diameter of the electrode assembly 10 is JR, and the height of the segment of the first uncoated region 11 and/or the outermost segment of the second uncoated region 12 is F, the following relation equation may be satisfied. Here, the outer diameter of the first current collector 40 is twice distance from the center of the first current collector 40 to the end of the first uncoated region coupling portion 42, and the outer diameter of the second current collector 70 is twice distance from the center of the second current collector 70 to the end of the second uncoated region coupling portion 72.

$$JR-2*F \leq T < JR$$

Preferably, the outer diameter T of the first current collector 40 and/or the second current collector 70 may be equal to or larger than the length obtained by subtracting twice the height F of the segment 11a of the first uncoated region 11 and/or the segment of the second uncoated region 12 from the outer diameter JR of the electrode assembly 10. When this relation equation is satisfied, the first uncoated region coupling portion 42 and/or the second uncoated region coupling portion 72 covers the end of the outermost segment 11a. That is, the first current collector 40 and/or the second current collector 70 may have the outer diameter enough to cover the end of the segment bent at the last winding turn of the first electrode. In this case, all the segments 11a that form the bend portion 42 and/or the second uncoated region coupling portion 72 is coupled may be welded in a state that they are uniformly pressed by the current collector 40, and after the welding, the closely stacked state of the segments 11a may be maintained well. The closely stacked state refers to no gap, in substance, between the segments as shown in FIG. 8. The closely stacked state contributes to the reduction in the resistance of the cylindrical battery 1 below the suitable level (for example, 4 mohm, but greater than 0 mohm, such as 0.01 mohm.) for rapid charging.

In another aspect, the outer diameter T of the first current collector 40 and/or the second current collector 70 may be smaller than the outer diameter JR of the electrode assembly 10. When the outer diameter T of the first current collector 40 and/or the second current collector 70 is larger than the outer diameter JR of the electrode assembly 10, a dead space in the housing 20 increases, which may adversely affect the energy density of the cylindrical battery 1. Accordingly, preferably, the outer diameter T of the first current collector 40 and/or the second current collector 70 is smaller than the outer diameter JR of the electrode assembly 10.

Figure 30:
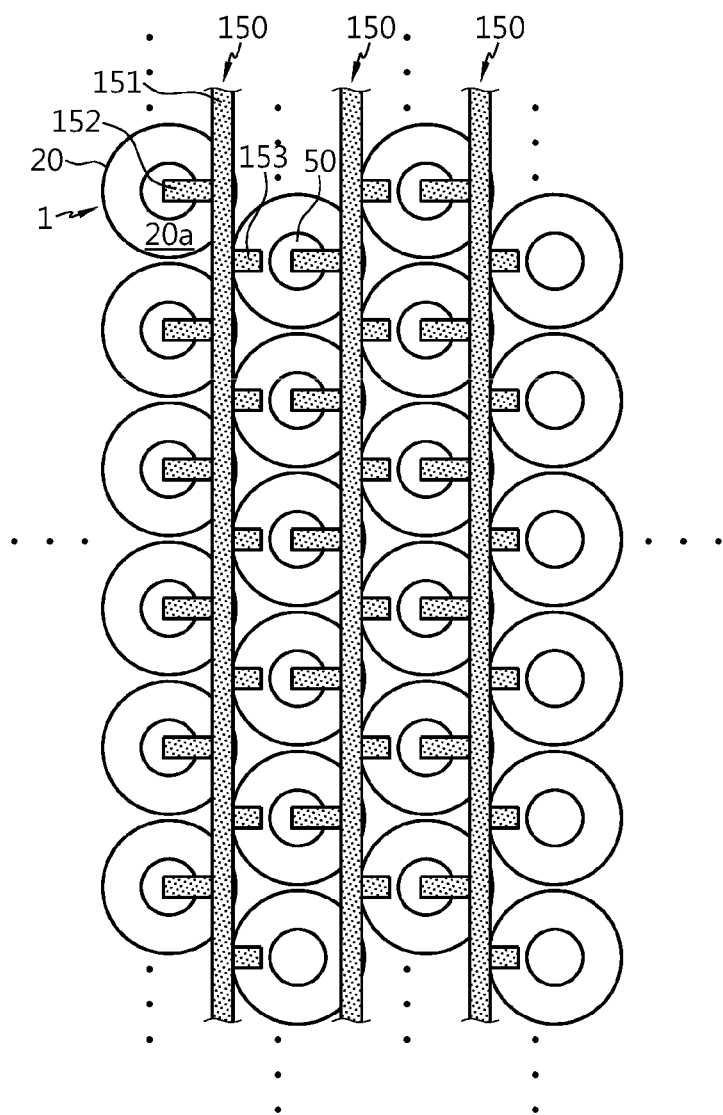
FIG. 30 is a top plan view showing a plurality of cylindrical batteries according to an embodiment of the present disclosure, connected in series and in parallel using busbars.

Meanwhile, referring to FIG. 30, the plurality of cylindrical batteries 1 may be connected in series and in parallel using a busbar 150 on the cylindrical batteries 1. The number of cylindrical batteries 1 may be smaller or larger, considering the capacity of the battery pack.

In each cylindrical battery 1, the terminal 50 may have the positive polarity, and the outer surface 20a of the closed portion of the housing 20 may have the negative polarity, and vice versa. The terminal 50 of the cylindrical battery 1 and the outer surface 20a of the closed portion disposed opposite the opening of the housing 20 may be positioned upward.

Preferably, the plurality of cylindrical batteries 1 may be arranged in a plurality of columns and rows. The column is a vertical direction with respect to FIG. 30, and the row is a horizontal direction with respect to the FIG. 30. In addition, in order to maximize the space efficiency, the cylindrical batteries 1 may be arranged in a closest packing structure. The closest packing structure is formed by connecting the centers of the terminal exposure portions 51 of the terminal 50 exposed to the outside of the housing 20 to each other into a shape of a right triangle. Preferably, the busbar 150 may be positioned on the plurality of cylindrical batteries 1, more preferably between adjacent columns. Alternatively, the busbar 150 may be positioned between adjacent rows.

Preferably, the busbar 150 connects in parallel the cylindrical batteries 1 arranged in the same column, and connects in series the cylindrical batteries 1 arranged in two adjacent columns.

Preferably, the busbar 150 may include a body portion 151, a plurality of first busbar terminals 152 and a plurality of second busbar terminals 153 for serial and parallel connection.

The body portion 151 may extend between the terminals 50 of the adjacent cylindrical batteries 1, preferably between the columns of the cylindrical batteries 1. Alternatively, the body portion 151 may extend along the columns of the cylindrical batteries 1 and may be regularly bent in a zigzag pattern.

The plurality of first busbar terminals 152 may protrude and extend from one side of the body portion 151 toward the terminal 50 of each cylindrical battery 1 and may be electrically coupled to the terminal 50. The electrical coupling between the first busbar terminal 152 and the terminal 50 may be made by laser welding and ultrasonic welding. In addition, the plurality of second busbar terminals 153 may be electrically coupled to the outer surface 20*a* of each cylindrical battery 1 from the other side of the body portion 151. The electrical coupling between the second busbar terminal 153 and the outer surface 20*a* may be made by laser welding and ultrasonic welding.

Preferably, the body portion 151, the plurality of first busbar terminals 152 and the plurality of second busbar terminals 153 may be made of a single conductive metal plate. The metal plate may be, for example, an aluminum plate or a copper plate, but the present disclosure is not limited thereto. In a variation, the body portion 151, the plurality of first busbar terminals 152 and the second busbar terminals 153 may be separately manufactured by the unit of a piece and then coupled to each other, for example, through welding.

The cylindrical battery 1 according to the present disclosure includes the terminal 50 having the positive polarity and the outer surface 20*a* of the closed portion of the housing 20 having the negative polarity are disposed in the same direction, and thus it is possible to easily establish the electrical connection of the cylindrical batteries 1 using the busbar 150.

In addition, the terminal 50 of the cylindrical battery 1 and the outer surface 20*a* of the closed portion of the housing 20 have large areas, and thus it is possible to sufficiently reduce the resistance of the battery pack including the cylindrical battery 1 due to a sufficient coupling area of the busbar 150.

Preferably, the cylindrical battery may be, for example, a cylindrical battery with the form factor ratio (defined as a value obtained by dividing the diameter of the cylindrical battery by height, or a ratio of height H to diameter D) of more than about 0.4.

Here, the form factor refers to a value indicating the diameter and height of the cylindrical battery. The cylindrical battery according to an embodiment of the present disclosure may include, for example, 46110 battery, 4875 battery, 48110 battery, 4880 battery and 4680 battery. In the numbers indicating the form factor, first two numbers indicate the diameter of the battery, next two numbers indicate the height of the battery, and the last number 0 indicates that the battery is circular in cross section. When the cylindrical battery is 100 mm or more in height, three digit numbers are necessary to indicate the height of the cylindrical battery, so the last number may be omitted.

The cylindrical battery according to an embodiment of the present disclosure may be a cylindrical battery having an approximately cylindrical shape, with the diameter of approximately 46 mm, the height of approximately 110 mm and the form factor ratio of approximately 0.418.

The cylindrical battery according to another embodiment may be a cylindrical battery having a substantially cylindrical shape, with the diameter of approximately 48 mm, the height of approximately 75 mm and the form factor ratio of approximately 0.640.

The battery according to still another embodiment may be a cylindrical battery having an approximately cylindrical shape, with the diameter of approximately 48 mm, the height of approximately 110 mm and the form factor ratio of approximately 0.436.

The battery according to further another embodiment may be a cylindrical battery having an approximately cylindrical shape, with the diameter of approximately 48 mm, the height of approximately 80 mm and the form factor ratio of approximately 0.600.

The battery according to yet another embodiment may be a cylindrical battery having an approximately cylindrical shape, with the diameter of approximately 46 mm, the height of approximately 80 mm and the form factor ratio of approximately 0.575.

Conventionally, batteries having the form factor ratio of about 0.4 or less have been used. That is, conventionally, for example, 1865 batteries and 2170 batteries have been used. The 1865 battery has the diameter of approximately 18 mm, the height of approximately 65 mm, and the form factor ratio of approximately 0.277. The 2170 battery has the diameter of approximately 21 mm, the height of approximately 70 mm and the form factor ratio of approximately 0.300.

Figure 31:
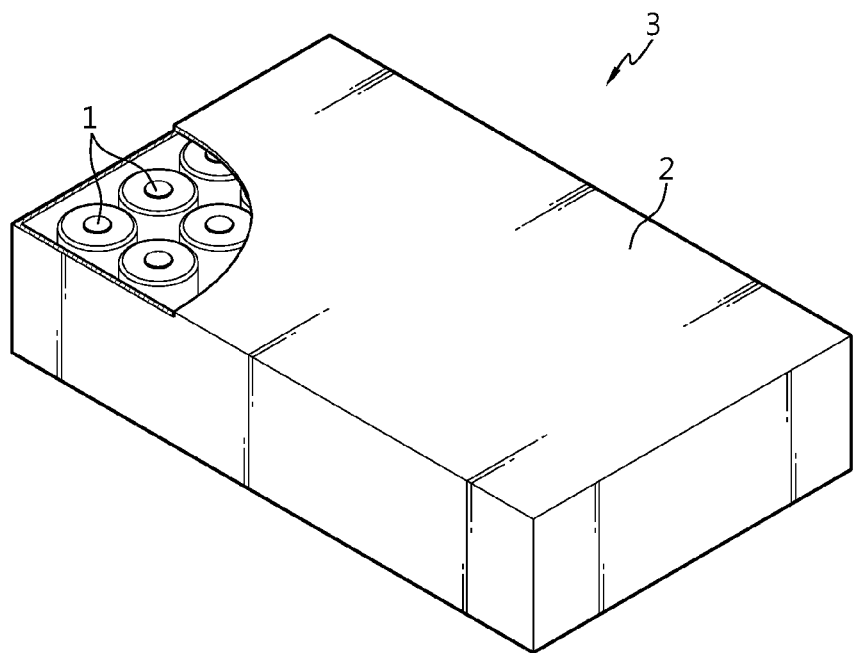
FIG. 31 is a diagram showing a schematic configuration of a battery pack including cylindrical batteries according to an embodiment of the present disclosure.

Referring to FIG. 31, the battery pack 3 according to an embodiment of the present disclosure includes a secondary battery assembly including the plurality of cylindrical batteries 1 according to an embodiment of the present disclosure as described above, electrically connected to one another, and a pack housing 2 which accommodate the same. The illustration of the component for electrical connection such as the busbar, a cooling unit and a power terminal is omitted from the drawings of the present disclosure for convenience of illustration. The electrical connection structure of the plurality of batteries 1 for manufacturing the battery pack 3 is described above with reference to FIG. 30 for illustrative purposes.

Figure 32:
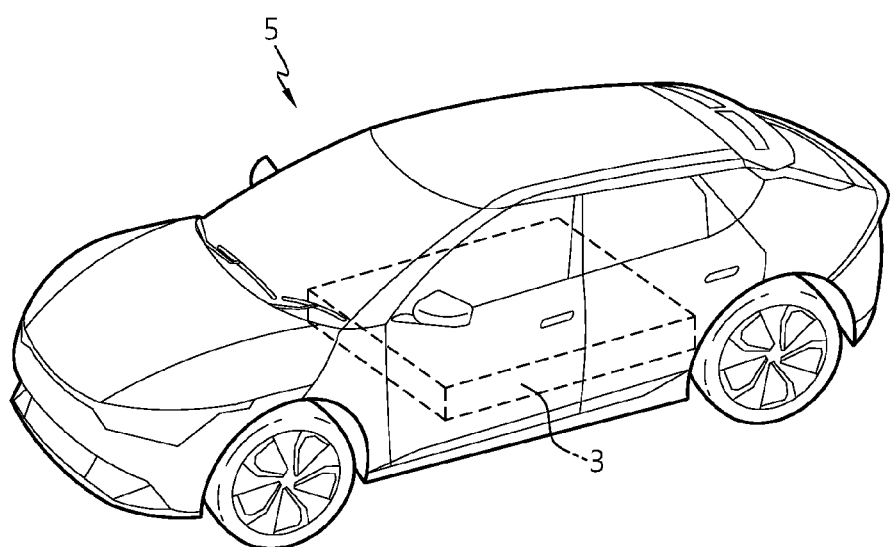
FIG. 32 is a diagram showing a schematic configuration of a vehicle including a battery pack according to an embodiment of the present disclosure.

Referring to FIG. 32, a vehicle 5 according to an embodiment of the present disclosure may be, for example, an electric vehicle, a hybrid electric vehicle or a plug-in vehicle, and includes the battery pack 3 according to an embodiment of the present disclosure. The vehicle 5 includes a four-wheeled vehicle and a two-wheeled vehicle. The vehicle 5 works using the power supplied from the battery pack 3 according to an embodiment of the present disclosure.

While the present disclosure has been hereinabove described with regard to a limited number of embodiments and drawings, the present disclosure is not limited thereto and it is obvious to those skilled in the art that a variety of modifications and changes may be made thereto within the technical aspects of the present disclosure and the appended claims and their equivalent scope.

What is claimed is:

1. A battery, comprising:
   an electrode assembly including a first electrode, a second electrode, and a separator between the first electrode and the second electrode, the first electrode, the second electrode, and the separator wound about an axis to define a core and an outer circumferential surface,
      wherein the first electrode includes a first region coated with an active material and a second region at a first side and adjacent to the first region, the second region being exposed beyond the separator, and
   at least part of the second region is an electrode tab;
   a housing including a first end with a first opening, the housing accommodating the electrode assembly;
   a first current collector including an edge portion on the electrode assembly, a second region coupling portion extending inward from the edge portion to end in a free end and coupled with the second region, and a terminal coupling portion spaced apart from the free end of the second region coupling portion so as to not be in direct contact with the free end of the second region coupling portion; and
   a terminal coupled with the terminal coupling portion.

2. The battery according to claim 1, wherein the edge portion has a rim shape having an inner space with an opening.

3. The battery according to claim 1, wherein the second region coupling portion and the terminal coupling portion are only electrically connected by the edge portion.

4. The battery according to claim 2, wherein the terminal coupling portion is at a center of the inner space of the edge portion.

5. The battery according to claim 1, wherein the first current collector further includes a connecting portion extending inward from the edge portion and connected to the terminal coupling portion.

6. The battery according to claim 5, comprising a plurality of the second region coupling portions.

7. The battery according to claim 6, wherein the terminal coupling portion is surrounded by the plurality of second region coupling portions.

8. The battery according to claim 6, comprising a plurality of the connecting portions.

9. The battery according to claim 5, wherein the connecting portion includes a current interruption portion having a smaller cross-sectional area than a remaining region of the connection portion.

10. The battery according to claim 9, wherein the current interruption portion includes a region having a smaller width or thickness than the remaining region of the connecting portion.

11. The battery according to claim 9, wherein the current interruption portion includes a notch, a groove, or a through-hole formed on at least one surface of the connecting portion.

12. The battery according to claim 1, wherein the terminal coupling portion is at a location corresponding to a hole formed at a winding center of the electrode assembly.

13. The battery according to claim 1, further comprising:
   an insulator between a second end of the housing opposite the first opening and the first current collector.

14. The battery according to claim 13, wherein the insulator has a thickness corresponding to a distance between an inner surface of the second end of the housing and the first current collector.

15. The battery according to claim 14, wherein the terminal is coupled with the terminal coupling portion of the first current collector through a hole formed in the insulator.

16. The battery according to claim 15, wherein a lower end of the terminal coupled with the terminal coupling portion is at a height that is substantially equal to or higher than a lower surface of the insulator.

17. The battery according to claim 1, wherein the second electrode further includes a third region coated with an active material and a fourth region at a second side and opposite to the third region,
   wherein the fourth region extends in a direction opposite to the second region and is exposed beyond the separator,
   wherein the battery further comprises a second current collector coupled to the fourth region and the housing to electrically connect the fourth region to the housing, the second current collector including:
   a fourth region coupling portion coupled with the fourth region; and
   a housing coupling portion coupled with the housing,
   wherein a distance from a center of the first current collector to an outermost side of the edge portion is longer than a distance from a center of the second current collector to an outermost side of the fourth region coupling portion.

18. The battery according to claim 1, wherein at least part of the second region includes a plurality of segments along a winding direction of the electrode assembly, and
   wherein the plurality of segments is bent along a radial direction of the electrode assembly,
   wherein the plurality of segments overlaps in multiple layers,
   wherein the electrode assembly has a welding target area including a uniform number of overlaps of the plurality of segments of the second region along the radial direction of the electrode assembly.

19. The battery according to claim 5, wherein the first current collector further includes a bridge portion connected according to at least one of the following: between adjacent second region coupling portions; between the second region coupling portion and the connecting portion adjacent to each other; and between adjacent connecting portions.

20. The battery according to claim 19, wherein the bridge portion is at an inner position relative to the edge portion.

21. The battery according to claim 20, wherein the first current collector has an impregnation hole between the edge portion and the bridge portion.

22. The battery according to claim 9, wherein the first current collector includes an additional connecting portion.

23. The battery according to claim 18, wherein the welding target area includes a maximum number of overlapping layers of the plurality of segments.

24. The battery according to claim 18, wherein the first current collector is welded to the second region in the welding target area.

25. The battery according to claim 9, wherein at least part of the second region includes a plurality of segments split along a winding direction of the electrode assembly, and the plurality of segments is bent along a radial direction of the electrode assembly and overlaps in multiple layers, and
   wherein the current interruption portion is in an area corresponding to a welding target area having a uniform number of overlaps of the plurality of segments along the radial direction of the electrode assembly.

26. The battery according to claim 9, wherein a tape is coupled to the current interruption portion.

27. The battery according to claim 26, wherein the tape surrounds the connecting portion at an area where the current interruption portion is formed.

28. The battery according to claim 18, wherein the following formula is satisfied:

$$JR-2*F \leq T < JR,$$

wherein an outer diameter of the first current collector is T, wherein an outer diameter of the electrode assembly is JR, and wherein a height of one of the plurality of segments disposed on an outermost side in the radial direction of the electrode assembly is F.

29. The battery according to claim 10, comprising a plurality of the current interruption portions being provided along a lengthwise direction of the connecting portion.

30. A current collector of a battery, comprising:
- an edge portion positioned on one surface of an electrode assembly of the battery;
- a coupling portion extending inward from the edge portion to have a free end and coupled with a region on an electrode of the electrode assembly; and
- a terminal coupling portion spaced apart from the free end of the coupling portion so as to not be in direct contact with the free end of the second region coupling portion and coupled with a terminal of the battery.

* * * * *